United States Patent
Aoyama

(10) Patent No.: US 7,720,302 B2
(45) Date of Patent: May 18, 2010

(54) METHOD, APPARATUS AND PROGRAM FOR IMAGE PROCESSING

(75) Inventor: Tatsuya Aoyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1633 days.

(21) Appl. No.: 10/949,745

(22) Filed: Sep. 27, 2004

(65) Prior Publication Data

US 2008/0309777 A1 Dec. 18, 2008

(30) Foreign Application Priority Data

Sep. 25, 2003 (JP) ............................. 2003-333381
Sep. 26, 2003 (JP) ............................. 2003-334607
Nov. 26, 2003 (JP) ............................. 2003-395533
Jun. 8, 2004 (JP) ............................. 2004-169699
Jun. 30, 2004 (JP) ............................. 2004-193389
Sep. 24, 2004 (JP) ............................. 2004-277586

(51) Int. Cl.
*G06K 9/40* (2006.01)
*G06K 9/48* (2006.01)

(52) U.S. Cl. ......................... 382/255; 382/199

(58) Field of Classification Search ......... 382/254–255, 382/261–266, 274–275, 199; 358/3.26–3.27; 348/208.99–208.6, 349, 344–346
See application file for complete search history.

(56) References Cited

U.S. PATENT DOCUMENTS 7,391,920 B2 * 6/2008 Abe ........................... 382/266
7,519,231 B2 * 4/2009 Li et al. ....................... 382/264
7,561,186 B2 * 7/2009 Poon ...................... 348/208.99
7,586,520 B2 * 9/2009 Igarashi ................... 348/208.6
7,596,273 B2 * 9/2009 Aoyama ..................... 382/199
7,616,254 B2 * 11/2009 Wong et al. ................. 348/349
2007/0071346 A1 * 3/2007 Li et al. ....................... 382/254
2009/0214121 A1 * 8/2009 Yokokawa et al. .......... 382/199

FOREIGN PATENT DOCUMENTS

| JP | 7-121703 A | 5/1995 |
| JP | 9-128547 A | 5/1997 |
| JP | 9-318988 A | 12/1997 |
| JP | 10-124665 A | 5/1998 |
| JP | 11-284944 A | 10/1999 |
| JP | 2002-112099 A | 4/2002 |

* cited by examiner

*Primary Examiner*—Sherali Ishrat
(74) *Attorney, Agent, or Firm*—Sughrue Mion, PLLC

(57) ABSTRACT

An analyzing means first calculates the blur direction and blur level of a digital photograph image based on edge widths and histograms of the edge widths obtained in each direction, and discriminates whether the image is a blurred image or a normal image. Then, it further calculates the camera shake level and blur width for the image discriminated to be a blurred image. A parameter setting means sets a one-dimensional correction mask and a two-dimensional correction mask based on the blur width. It also sets a correction level based on the blur level. It further makes an adjustment to the ratio between the one-dimensional and two-dimensional correction masks based on the camera shake level.

64 Claims, 43 Drawing Sheets

EDGE PROFILE

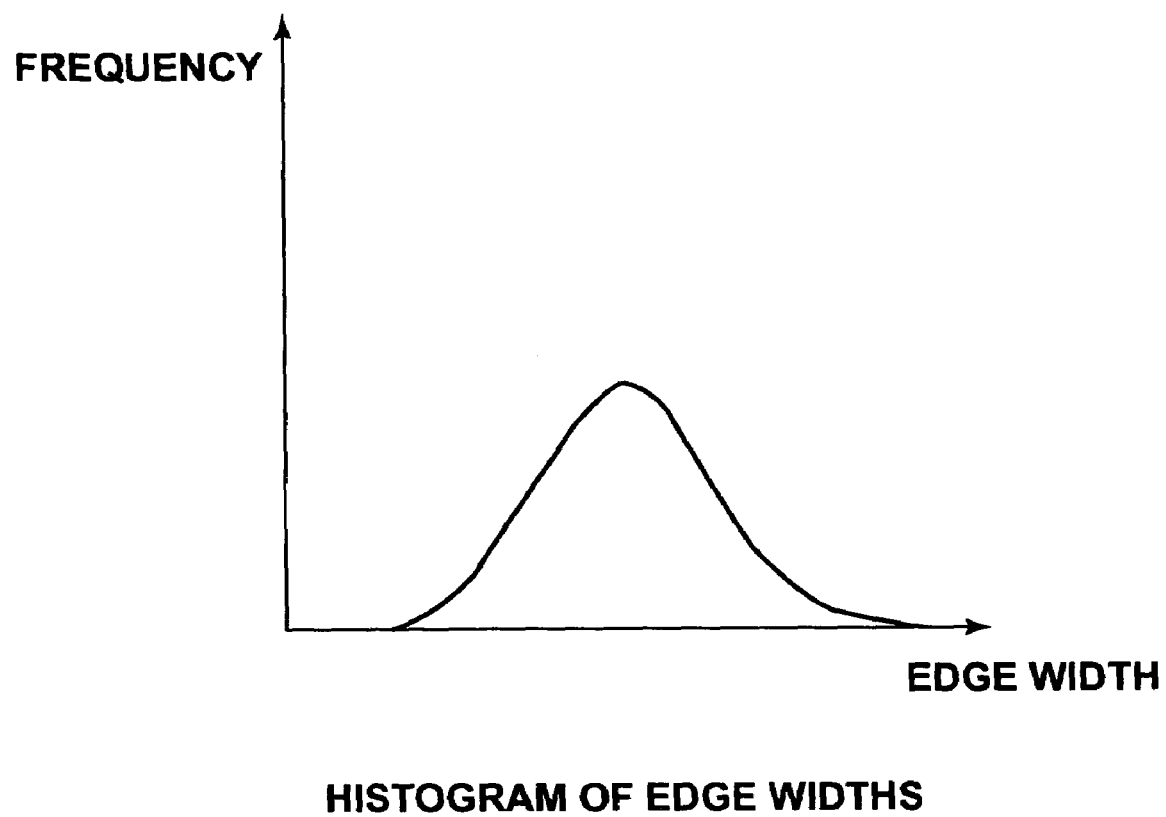

FIRST CAMERA SHAKE LEVEL K1

SECOND CAMERA SHAKE LEVEL K2

THIRD CAMERA SHAKE LEVEL K3

FIG.8
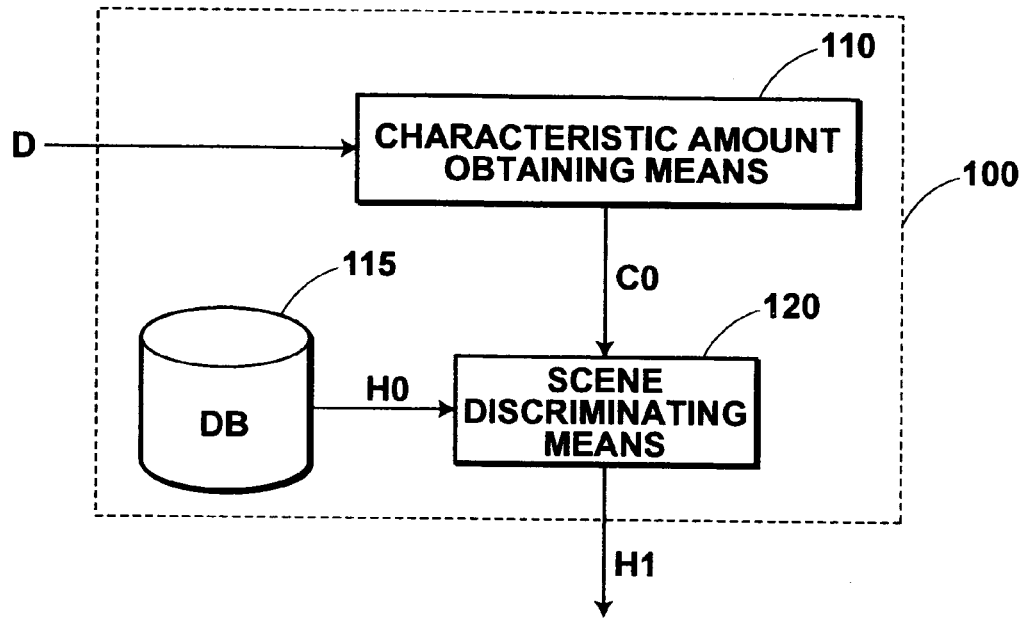
FIG.9A
| 1 | 1 | 1 |
|---|---|---|
| 0 | 0 | 0 |
| -1 | -1 | -1 |
FIG.9B
| 1 | 0 | -1 |
|---|---|---|
| 1 | 0 | -1 |
| 1 | 0 | -1 |
FIG.10
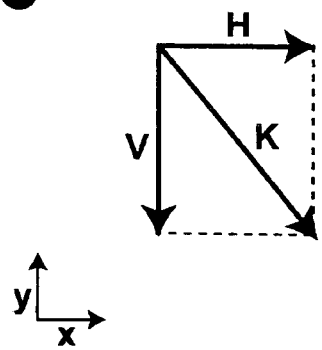

HISTOGRAM OF EDGE WIDTHS

EDGE PROFILE

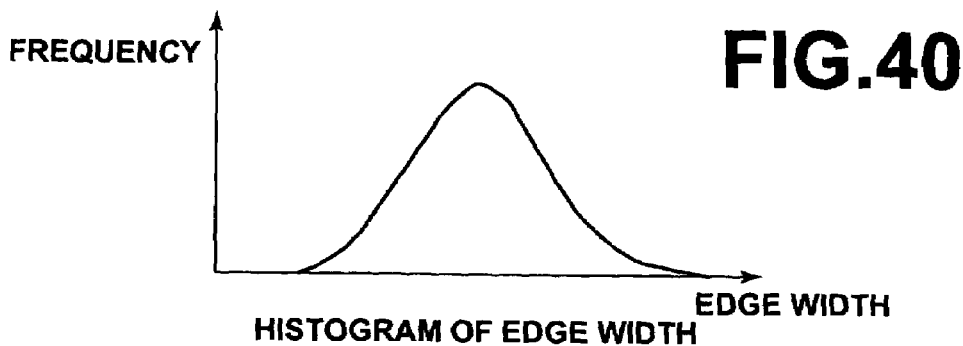
FIG.40 HISTOGRAM OF EDGE WIDTH
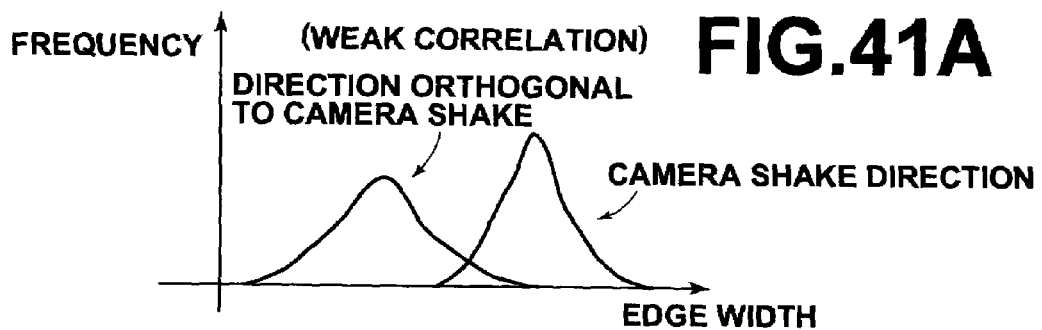
FIG.41A
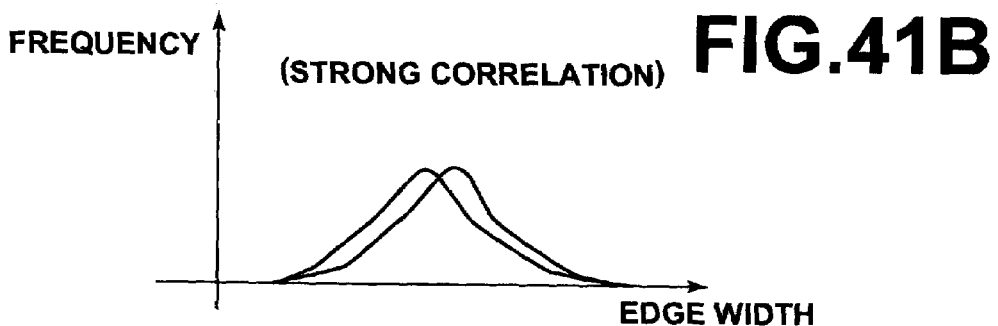
FIG.41B
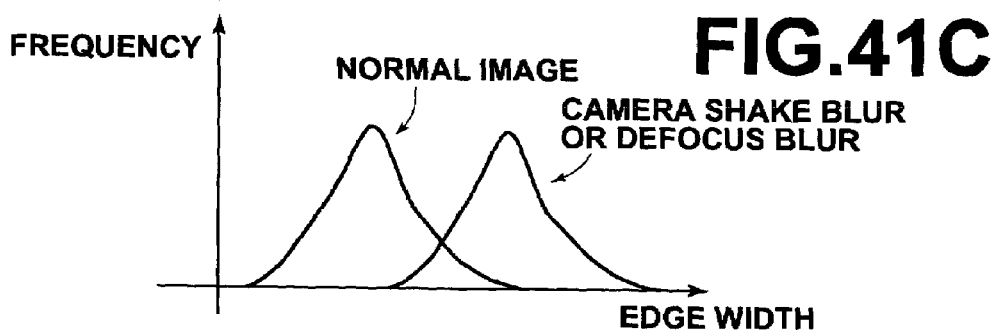
FIG.41C

FIG.44
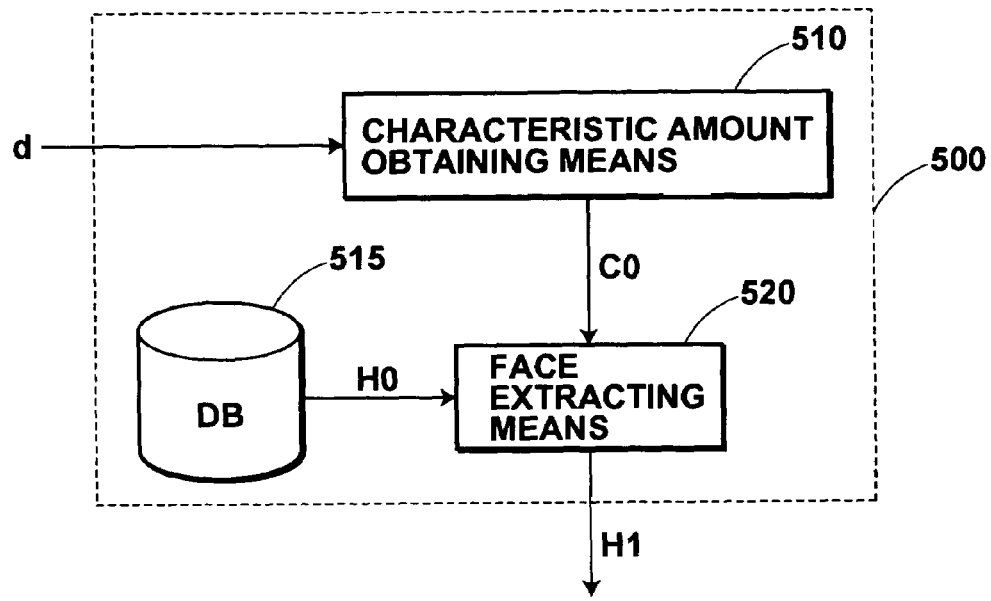
FIG.45A
| 1 | 1 | 1 |
|---|---|---|
| 0 | 0 | 0 |
| -1 | -1 | -1 |
FIG.45B
| 1 | 0 | -1 |
|---|---|---|
| 1 | 0 | -1 |
| 1 | 0 | -1 |
FIG.46
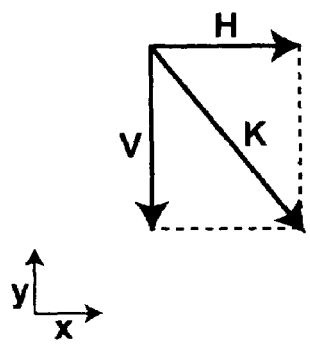

METHOD, APPARATUS AND PROGRAM FOR IMAGE PROCESSING

BACKGROUND OF THE INVENTION

1. Field of the Invention

The present invention relates to an image processing method and apparatus for obtaining information related to an image blur from a digital photograph image, in particular, from that obtained by the auxiliary digital camera of a mobile phone. The present invention also relates to a program that causes a computer to execute the method.

2. Description of the Related Art

Various image processing techniques are performed on digital photograph images obtained by reading devices, such as scanners, through photoelectrical reading from the photograph images recorded on camera films, such as negative films or color reversal films, or those obtained by digital still cameras (DSCs) before printing. Such image processing techniques include a blurred image restoration technique for removing blurs from blurred images.

Some of the photograph images obtained through imaging subjects may be blurred. Such a blurred image may result from the camera being out of focus at the time of imaging, which is known as the defocus blur. A blurred image may also result from the camera being shaken by the photographer at the time of imaging, which is known as the camera shake blur (or simply as "camera shake"). In the case of the defocus blur, a point image extends two-dimensionally, that is, the point images on the photograph extend nondirectionally, whereas in the case of the camera shake blur, the point image extends one-dimensionally leaving a certain trail, that is, the point images on the photograph extend to a certain direction.

Various methods for restoring blurred images have been proposed in the field of the digital photograph image. Blurred images may be restored by applying a restoration filter, such as the Wiener filter or inverted filter, if the information related to the direction and width of the camera shake at the time of imaging is available. Thus, such a restoration method is widely known as described, for example, in Japanese Unexamined Patent Publication No. 2002-112099, in which a device (e.g., acceleration sensor) capable of obtaining information related to the direction and width of the camera shake at the time of imaging is attached to the imaging system, and the information obtained through the device at the time of imaging is used for the image restoration.

Another blurred image restoration method is also known as described, for example, in Japanese Unexamined Patent Publication No. 7 (1995)-121703. The method performs the steps of setting a deterioration function for a blurred image (image having blurs), restoring the blurred image using a restoration filter corresponding to the deterioration function, evaluating the restored image, resetting the deterioration function, and repeating the steps of the image restoration, image evaluation and resetting of the deterioration function until a desirable image quality has been obtained.

In the mean time, the capability of the mobile phone has been improved along with the rapid spread of the phone. In particular, the improvement in the capability of the auxiliary digital camera of the mobile phone (mobile camera) has attracted a great deal of interest. Recently, the number of pixels of the mobile camera has reached millions digit and it is used in the same manner as an ordinary digital camera. Taking photographs of favorite entertainers, athletes, as well as commemorative photographs by mobile cameras has become a common sight. In this context, for example, more photograph images obtained by mobile cameras tend to be printed out in the same manner as those obtained by ordinary digital cameras, not just watched on the monitor of the mobile phones.

On the other hand, mobile cameras have a problem that it is difficult to hold them firmly at the time of imaging, since the body (mobile phone) is not designed for exclusive use for imaging. In addition, the mobile cameras have no photoflash, resulting in a slower shutter speeds than those of ordinary digital cameras. By the reasons described above, the camera shake blur is more likely to occur when imaging a subject with a mobile camera than with an ordinary digital camera. An extraordinary camera shake may be recognized by the photographer on the monitor of the mobile camera, but a small camera shake may not be recognized on the monitor. It is recognized only when the image is printed out, thus there is a higher likelihood that the photograph image obtained by the mobile camera requires image correction for the camera shake blur.

Attaching a device for obtaining the direction and width of the camera shake to the auxiliary camera of a mobile phone is unrealistic since the miniaturization of the mobile phone is one of the focal points of competition among the manufactures along with its capability and cost. Therefore, the method described in Japanese Unexamined Patent Publication No. 2002-112099 may not be applied for mobile cameras. Also, the method described in Japanese Unexamined Patent Publication No. 7 (1995)-121703 has a problem that it requires longer processing time, and hence inefficient, since the steps of deterioration function setting, image restoration, image evaluation, and resetting of the deterioration function need to be repeated.

SUMMARY OF THE INVENTION

The present invention has been developed in view of the circumstances described above. It is an object of the present invention to provide an image processing method, apparatus and program therefore capable of obtaining information related to image blurs from digital photograph images without requiring any special device attached to the imaging system and implementing image correction for blurs of the digital photograph images efficiently.

A first image processing method of the present invention comprises the steps of:

detecting edges in each direction of a plurality of different directions for a digital photograph image;

obtaining characteristic amount for the edges in each direction of the plurality of different directions; and obtaining blur information of a blur of the digital photograph image including blur direction information based on the edge characteristic amounts.

The blur causes point images on the photograph image to be extended, so that the edges are extended in proportion to the extension of the point images in the photograph image having the blur (blurred image). That is, the extended aspect of the edges on the image is directly related to the blur on the image. The present invention has been developed focusing attention on this fact, and the image processing method of the present invention is a method for detecting edges in each direction of a plurality of different directions and obtaining blur information based on the edge characteristic amounts.

Here, the referent of "edge characteristic amount" means the characteristic amount related to the extended aspect of the edges on a digital photograph image. For example, it may include sharpness of the edges and distributions of the edge sharpness.

Here, "sharpness of the edge" may be represented by any parameter as long as it is capable of representing the edge sharpness. For the edge represented by the edge profile shown in FIG. 3, the gradient of the edge profile curve, for example, may be used as the edge sharpness such that the greater the change in brightness (the gradient of the profile curve shown in FIG. 3), the greater the edge sharpness, as well as the edge width such that the greater the edge width, the smaller the edge sharpness.

Preferably, in the first image processing method of the present invention, the blur information includes the blur width of the blur.

Here, the referent of "a plurality of different directions" means the directions for identifying the direction of the blur on a digital photograph image, which need to include a direction close to the direction of the blur. Thus, the greater the number of the directions, the higher the accuracy of the identified direction, but an appropriate number taking into account the processing speed, for example, 8 directions as shown in FIG. 2 may be preferable.

Further, the referent of "blur information" as used herein means the information related to the blur required for correcting the blur of the digital photograph image. The image processing method of the present invention is a method for obtaining at least blur direction information, which is the information related to the direction of the blur as the blur information.

Still further, the image processing method of the present invention may further set a parameter for correcting the blur based on the blur information. Of course, the image correction for the blur may be implemented using the parameter obtained in this way.

"Blurs" may be categorized into the nondirectional blur or defocus blur and directional blur or camera shake blur. In the case of the camera shake blur, the direction of the blur corresponds to the direction of the camera shake, and in the case of the defocus blur, the "blur direction" is "nondirectional". The image processing method of the present invention may obtain information as the blur information that indicates whether the blur on the image is a nondirectional defocus blur or directional camera shake blur, and further the direction of the camera shake if it is the camera shake blur. With the information described above, the image processing method of the present invention may set an isotropic correction parameter for correcting the blur isotropically if it is a defocus blur, or a directional correction parameter for correcting the blur directionally if it is a camera shake blur.

Here, the referent of "isotropic correction" means image correction that will act on evenly on all directions, and "directional correction" means image correction that will act on only in a predetermined direction or image correction in which the effect differs from direction to direction. In the meantime, the blur appears on the image as extended edges, so that the conventional methods for increasing the sharpness of the image, such as USM (unsharpness masking) or the like, may be used as the image correction method for blurs. In setting the parameter for the image correction described above, the parameter will be set according to the required correction method. For example, when USM is to be used as the image correction, an isotropic correction mask (filter) may be set as the isotropic correction parameter, and a directional correction mask (filter) that will act on the blur direction may be set as the directional correction parameter. Further, if the blur width is also obtained, then the size of the correction mask may be set according to the blur width.

Here, the "blur width" means the width of the blur in the direction of the blur, and it may be, for example, the averaged width of the edges in the direction of the blur. If the blur is a nondirectional defocus blur, the width of the blur may preferably be represented by the edge width of an edge in any one direction, and more preferably it is represented by the averaged edge width of the edges in all directions included in the plurality of different directions.

Further, there may be cases where the blur is unable to be categorized into the defocus blur or camera shake blur from the blur information, or in other cases the blurred image may include both defocus and camera shake blurs. Preferably, in order to be prepared for such cases, the image processing method of the present invention is a method for further obtaining the information related to the camera shake level that indicates the magnitude of the camera shake in the blur direction as the blur information without discriminating if it is the defocus or camera shake blur, and setting the parameter through weighting addition of the isotropic correction parameter for correcting the blur isotropically and the directional correction parameter for correcting the blur directionally such that the greater the camera shake level, the heavier the weighting of the directional correction.

Preferably, the first image processing method of the present invention is a method for further obtaining information related to a blur level that indicates the magnitude of blurring of the blur as the blur information. In this case, it is preferable that the parameter is set such that the filter (mask) for correcting the blur employs a larger filter size, the higher the blur level.

Here, the image having a blur level smaller than a predetermined threshold value may be deemed as a normal image without any blur. Therefore, the method described above may be a method for setting the parameter that indicates "not to implement the correction" for such images. Alternatively, it may be a method for not setting the parameter for such images, and not implementing image correction for the images without the parameter in performing the image correction at a later time.

In performing image correction for the blur on digital photograph images, it is known that different image correction effects are preferred for different image scenes. For example, for the digital image of a portrait, it is preferred that the image correction be implemented with smaller sharpness, while for the digital image of a landscape, it is preferred that the image correction be implemented with greater sharpness than that for a portrait. Preferably, the first image processing method of the present invention is a method for analyzing the image scene and setting the correction parameter based on the type of the image scene obtained by the analysis in addition to the blur information in setting the image correction parameters.

A first image processing apparatus of the present invention comprises:

an edge detecting means for detecting edges in each direction of a plurality of different directions for a digital photograph image;

an edge characteristic amount obtaining means for obtaining characteristic amount for the edges in each direction of the plurality of different directions; and a blur information obtaining means for obtaining blur information of a blur of the digital photograph image including blur direction information of the blur based on the edge characteristic amounts.

Preferably, the edge characteristic amount includes the sharpness of the edge and distributions of the edge sharpness.

Preferably, the blur information obtaining means is a means for further obtaining the blur width of the blur as the blur information.

The first image processing apparatus of the present invention may further comprise a parameter setting means for setting a parameter for correcting the blur.

In the first image processing apparatus of the present invention, the blur information obtaining means may be a means for obtaining information that indicates whether the blur on the image is a nondirectional defocus blur or a directional camera shake blur, and further obtaining the direction of the camera shake if it is a camera shake blur as the blur information, and the parameter setting means may be a means for setting an isotropic correction parameter for correcting the blur isotropically if it is a defocus blur, or directional correction parameter for correcting the blur directionally if it is a camera shake blur.

Preferably, the blur information obtaining means of the first image processing apparatus of the present invention is a means for further obtaining information related to a camera shake level that indicates the magnitude of the camera shake of the blur without discriminating if it is a defocus or camera shake blur, and the parameter setting means is a means for setting the parameter through weighting addition of isotropic correction parameter for correcting the blur isotropically and the directional correction parameter for correcting the blur directionally such that the greater the camera shake level, the heavier the weighting of the directional correction.

Preferably, the blur information obtaining means of the first image processing apparatus of the present invention is a means for further obtaining information related to a blur level that indicates the magnitude of blurring of the blur as the blur information. In this case, it is preferable that the parameter is set such that the filter (mask) for correcting the blur employs a larger filter size, the higher the blur level.

More preferably, the parameter setting means of the first image processing apparatus of the present invention is a means for setting the parameter only for the digital photograph images having the blur levels greater than or equal to a predetermined threshold value.

Preferably, the first image processing apparatus of the present invention further comprises an image scene analyzing means for analyzing the type of the image scene of the digital photograph images, and the parameter setting means is a means for setting the parameter based on the type of the image scene obtained by the analysis in addition to the blur information.

Preferably, the first image processing apparatus of the present invention further comprises an image reducing means for reducing a digital photograph image to obtain a reduced image of the photograph image, and the edge detecting means is a means for detecting edges from the reduced image, since the edge may be detected more easily from the reduced image obtained by reducing a digital photograph image than from the original with less amounts of calculation.

Preferably, the edge detecting means of the first image processing apparatus of the present invention is a means for detecting only those edges having intensities greater than or equal to a predetermined threshold value, since most of the low intensity edges are likely to be noise, and people are likely to recognize the blur by the high intensity edges.

Preferably, the first image processing apparatus further comprises an invalid edge eliminating means for eliminating invalid edges from among the edges detected by the edge detecting means.

Here, the referent of "invalid edges" means the edges which seem to be irrelevant to the blur information or those that may make it difficult to obtain the blur information or lead to false blur information, such as those having complicated shapes or those exposed to direct light from a light source.

The first image processing apparatus of the present invention may further comprise a correcting means for correcting a digital photograph image to obtain a corrected image using the parameter set by the parameter setting means.

The parameter setting means of the first image processing apparatus may be a means for setting a plurality of parameters, and the correcting means may be a means for obtaining corrected images using the plurality of parameters set by the parameter setting means, each corresponding to each of the parameters, and the apparatus may further comprise a selecting means for having the user to select a desired image from among the corrected images, and an intended image determining means for determining the selected image by the user to be the intended image.

That is, in correcting blurs in digital photograph images, a different user has a different taste. Thus, the image correction that provides optimum correction effect in terms of the image quality is not always the one the most desired by the user. For this reason, while improving the image quality by correcting the blur, the first image processing apparatus may be an apparatus for setting an additional parameter taking into account the user preference in addition to the parameter which is set based on the blur information (i.e., the parameter that will bring about the optimum correction effect in terms of image quality) in obtaining blur information from a digital photograph image, and implementing correction using these parameters for the blur on the digital photograph image to obtain corrected images from which the intended image is selected by the user. Here, the referent of "plurality of parameters" may comprise the correction parameter which is set based on the blur information and that which is obtained by modifying the parameter to give a different trend. For example, if the correction parameter which is set based on the blur information consists of an isotropic mask of predetermined size for isotropic correction and the correction level that indicates the isotropic masking level, the parameter obtained by modifying the mask size to give a different trend (a trend toward increasing or decreasing), or the parameter obtained by modifying the correction level to give a different trend (a trend toward intensifying or lessening) may be set in addition to the original correction parameter. Further, for example, if the correction parameter which is set based on the blur information is a directional correction mask that will act on a certain direction, a directional correction mask of a different size or a directional correction mask that will act on a different direction from that of the original mask (e.g., slightly off to the right or left) may be set as a parameter in addition to the original parameter. Still further, if the original parameter is the one obtained through weighting addition of the isotropic correction parameter and directional correction parameter, the parameter obtained by changing the weighting factor (increasing or decreasing) may be set as an additional parameter.

Preferably, the parameter setting means of the first image processing apparatus of the present invention is a means for setting a plurality of parameters, and the correcting means is a means for obtaining corrected images using the plurality of parameters set by the parameter setting means, each corresponding to each of the parameters, wherein the apparatus further comprises an evaluating means for evaluating the correction effect for the corrected images and an intended image determining means for determining the corrected image having optimum correction effect as the intended image.

That is, the correction parameter which is set based on the blur information obtained from a digital photograph image does not always bring about the optimum correction effect since the blur information obtained may somewhat disagree with the actual state. The image processing apparatus of the present invention is an apparatus for setting additional parameters other than that which is set based on the blur information, evaluating the correction effect for each of the corrected images obtained by implementing corrections using these parameters, and determining one of the corrected images having the best correction effect to be the intended image, so that the apparatus may bring about the optimum correction effect, even if the blur information is slightly departed from the actual state. Again, the referent of "plurality of parameters" may comprise the correction parameter which is set based on the blur information and that which is obtained by modifying the parameter to give a different trend. The evaluation of the correction effect, for example, may be conducted through extracting edge feature quantities from the corrected images and based on these quantities.

The first image processing apparatus of the present invention may further comprise a confirming means for having the user to confirm whether the corrected image is to be determined to be the intended image by the user, and a correction control means for controlling the parameter setting means to repeat resetting the parameter, and the correcting means to repeat performing the correction until the corrected image has been determined to be the intended image.

The first image processing apparatus of the present invention may be applied to digital photograph images obtained by the auxiliary digital cameras of mobile phones. In this case, the image processing apparatus of the present invention may provide the most effective result.

A digital camera of the present invention comprises an imaging means for imaging a subject to obtain a digital photograph image of the subject, an image processing means for obtaining blur information of a blur of the digital photograph image including the direction information of the blur, wherein the image processing means is the first image processing apparatus of the present invention.

The digital camera of the present invention may further comprise an output means for outputting a digital photograph image with the blur information obtained by the image processing means attached thereto. Here, the referent of "outputting" includes outputting digital photograph images to the outside of the digital camera, such as an external storage device or a server on the network accessible by the digital camera, as well as to the storage means of the camera.

A second image processing method of the present invention comprises the steps of:

detecting edges for a digital photograph image based on predetermined edge detecting conditions;

obtaining edge characteristic amounts for the edges detected in the edge detecting step; and discriminating a blurred state of the digital photograph image based on predetermined discriminating conditions using the edge characteristic amounts obtained in the edge characteristic amount obtaining step, wherein the method further comprises the steps of:

obtaining imaging condition information that indicates imaging conditions of the digital photograph image; and setting the edge detecting conditions and/or the discriminating conditions based on the imaging condition information.

Preferably, the edge detection described above is performed in each direction of a plurality of different directions, and the edge characteristic amount is obtained in each direction of the plurality of different directions, and the blurred state includes at least the direction of the blur.

In the second image processing method of the present invention, a parameter for correcting the blur may be set based on the discrimination results described above, and the digital photograph image may be corrected using the parameter.

A second image processing apparatus comprises:

an edge detecting means for detecting edges for a digital photograph image based on predetermined edge detecting conditions;

an edge characteristic amount obtaining means for obtaining characteristic amounts for the edges; and a blur discriminating means for discriminating a blurred state of the digital photograph image based on predetermined discriminating conditions using the edge characteristic amounts, wherein the apparatus further comprises:

an imaging condition information obtaining means for obtaining imaging condition information that indicates the imaging conditions of the digital photograph image; and a condition setting means for setting the edge detecting conditions and/or the discriminating conditions based on the imaging condition information.

Preferably, the edge detecting means described above is a means for detecting edges in each direction of a plurality of different directions, the edge characteristic amount obtaining means is a means for obtaining the edge characteristic amount in each direction of the plurality of different directions, and the blurred state includes at least the direction of the blur.

The second image processing apparatus of the present invention may further comprise a parameter setting means for setting a parameter for correcting the blur based on the discrimination results provided by the blur discriminating means and a correcting means for correcting the digital photograph image using the parameter.

Here, the referent of "edge characteristic amount" means the characteristic amount related to the extended aspect of the edges on a digital photograph image. For example, it may include sharpness of the edges and distributions of the edge sharpness.

Here, "sharpness of the edge" may be represented by any parameter as long as it is capable of representing the sharpness of the edge. For the edge represented by the edge profile shown in FIG. 23 the gradient of the edge profile curve, for example, may be used as the edge sharpness such that the greater the change in brightness (the gradient of the profile curve shown in FIG. 23), the greater the edge sharpness, as well as the edge width such that the greater the edge width, the smaller the edge sharpness.

"Blurs" may be categorized into the nondirectional blur or defocus blur and directional blur or camera shake blur. In the case of the camera shake blur, the direction of the blur corresponds to the direction of the camera shake, and in the case of the defocus blur, the "blur direction" is "nondirectional". In the present invention, the "nondirectional" described above is included in the blur direction.

Here, the referent of "plurality of different directions" means the directions for identifying the direction of the blur on a digital photograph image, which need to include a direction close to the direction of the blur. Thus, the greater the number of the directions, the higher the accuracy of the identified direction, but an appropriate number of directions need to be used taking into account the processing speed.

The "edge detecting conditions" may include any condition as long as it is capable of defining the edge to be detected including the plurality of different directions for detecting the edges described above.

The direction of the blur is important information for correcting the blur on a digital photograph image. For example, once the direction of the blur (nondirectional or camera shake direction) has been known, the isotropic correction parameter for isotropic correction may be set for the defocus blur and the directional parameter for directional correction for the camera shake blur when setting the correction parameter. Here, the referent of "isotropic correction" means image correction that will act on evenly on all directions, and "directional correction" means image correction that will act on only in a predetermined direction or image correction in which the effect differs from direction to direction. In the meantime, the blur appears on the image as extended edges, so that the conventional methods for increasing the sharpness of the image, such as USM (unsharpness masking) or the like, may be used as the image correction method for blurs. In setting the parameter for the image correction described above, the parameter will be set according to the required correction method. For example, when USM is to be used as the image correction, an isotropic correction mask may be set as the isotropic correction parameter, and a directional correction mask that will act on the direction of the camera shake blur may be set as the directional correction parameter.

The referent of "discriminating conditions" as used herein means conditions required at least for discriminating the blur direction, which may include the condition for discriminating the blur level or camera shake level.

The referent of "imaging condition information" as used herein means the information that indicates conditions involving in discriminating and correcting the blur among the conditions at the time of imaging the digital photograph image. For example, it may include shakiness information that indicates likelihood of the camera shake to occur that causes a directional blur on the digital photograph image at the time of imaging and/or the camera shake inducing direction information that indicates the direction to which the camera shake is likely to occur. In this case, the condition setting means may be a means for setting the edge detecting conditions and/or the discriminating conditions based on the information related to the shakiness information and/or the camera shake inducing direction information.

Here, imaging condition information obtaining means may be a means for obtaining the shakiness and/or the camera shake inducing direction based on tag information attached to the digital photograph image.

When tag information is attached to a digital photograph image, most often it includes information representing the imaging conditions of the digital photograph image. The imaging condition information of the present invention may include, for example, the shutter speed, strobing, ISO sensitivity, EV value that indicates the brightness of the subject, zooming, and others among those included in the tag information.

For example, the shutter speed may be related to the shakiness such that the slower the shutter speed, the greater the shakiness, since the camera shake blur is more likely to occur when a slower shutter speed is selected.

Further, in the case where a strobe light is used, a slower shutter speed is likely to be selected and the shakiness becomes greater compared with the case where no strobe light is used.

Likewise, the IOS sensitivity and the brightness of the subject (EV value) region may also be related to the shutter speed, so that shakiness information may be obtained based on these conditions. For example, a smaller ISO sensitivity requires a slower shutter speed, so that the shakiness information may be obtain such that the smaller the ISO sensitivity, the greater the shakiness. Also, smaller brightness of the subject (smaller EV value) requires a slower shutter speed, so that shakiness information may be obtained such that the smaller the EV value, the greater the shakiness.

A greater blur level may result on the image obtained through imaging with a zooming function compared with that obtained through imaging without the zooming function even if the photographer makes the same levels of camera shake at the imaging. That is, the likelihood of the blur to occur on the image, which is not caused by the camera shake by the photographer, is related to the shakiness, and may be obtained such that the shakiness is set greater for the image obtained with the zooming function than for the image obtained without the zooming function.

Generally, the digital photograph images obtained by the auxiliary digital cameras of mobile phones (mobile cameras) have no tag information attached thereto, or only a little amount of information is available from the tag even if it is attached. However, the shakiness information and/or the camera shake inducing direction information may be obtained based on the model information of the mobile phone used for imaging the digital photograph image. For example, the relationship between the model of the mobile phone and the shakiness of the auxiliary digital camera may be stored in a database beforehand. Thereafter, the shakiness information for a digital photograph image may be obtained by obtaining the model information (information related to the model) of the mobile phone (more precisely, the auxiliary digital camera of the mobile phone) used to obtain the digital photograph image and referring to the database.

The model information may be inputted manually by the operator. However, most of the digital photograph images obtained by the mobile camera are transmitted directly from the camera. In this case, the model information may be obtained based on the phone number of the mobile phone.

In addition to obtaining the shakiness information based on the model information as described above, the camera shake inducing direction information that indicates the direction to which the camera shake is likely to occur may also be obtained based on the model information of the mobile phone. For example, the relationship between the model of the mobile phone and its usage at the time of imaging by the auxiliary digital camera, that is, whether it is held vertically (vertical imaging) or horizontally (horizontal imaging) at the time of imaging may be stored in a database beforehand. Then, the information that indicates whether the image is obtained by the vertical or horizontal imaging may be obtained by referring to the database based on the model information of the mobile phone used to obtain the digital photograph image, and the camera shake inducing direction information may be obtained by making use of the fact that the camera shake is likely to occur vertically when the image is obtained by the vertical imaging and obliquely between the vertical and horizontal directions when it is obtained by the horizontal imaging.

Preferably, the edge detecting means of the second image processing apparatus of the present invention is a means for detecting only those edges having intensities greater than or equal to a predetermined threshold value, since most of the low intensity edges are likely to be noise, and people are likely to recognize the blur by the high intensity edge. Here, the edge detecting conditions include the predetermined threshold value described above, and the condition setting means may be a means for setting the conditions such that the greater the shakiness, the smaller the threshold value. Preferably, the edge detecting conditions include the plurality of different directions for which edges are detected by the edge detecting means and predetermined threshold values of edge intensity, each corresponding to each of the different directions. Preferably, the edge detecting means is a means for detecting edges in each direction of the plurality of different directions only those having intensities greater than or equal to the predetermined threshold values, each corresponding to each direction of the plurality of different directions. Preferably, the condition setting means is a means for setting the threshold value such that the closer the direction is to the camera shake inducing direction, the smaller the threshold value.

Preferably, the edges which seem to be irrelevant for identifying the blur or those that may make it difficult to obtain the blur information or lead to false identification of the blur (e.g., those having complicated shapes or those exposed to direct light from a light source) are eliminated as invalid edges. Preferably, in the second image processing apparatus of the present invention, the edge detecting conditions include invalid edge discriminating conditions for discriminating invalid edges, and the edge detecting means comprises an invalid edge eliminating means for eliminating edges that satisfy the invalid edge discriminating conditions from among the detected edges, and the condition setting means is a means for setting the invalid edge discriminating conditions such that the greater the shakiness, the more stringent the invalid edge discriminating conditions.

Preferably, the edge detecting conditions include the plurality of different directions for which edges are detected by the edge detecting means and respective invalid edge discriminating conditions for respective directions of the plurality of different directions, for discriminating whether the edge detected by the edge detecting means is an invalid edge. Preferably, the edge detecting means comprises an edge eliminating means for eliminating edges detected in each direction that satisfy the invalid edge discriminating conditions corresponding to respective directions of the plurality of different directions as invalid edges. Preferably, the condition setting means is a means for setting the invalid edge discriminating conditions such that the closer the direction is to the camera shake inducing direction, the more stringent the invalid edge discriminating conditions corresponding to that direction.

Preferably, the condition setting means is a means for setting the number of the different directions for which the edges are detected such that the greater the shakiness, the greater the number of directions.

Preferably, the condition setting means is a means for setting the directions in setting the plurality of different directions such that closer a region is to the camera shake inducing direction, the greater the number of directions.

Preferably, the blur discriminating means of the second image processing apparatus is a means for further discriminating the camera shake level that indicates the magnitude of the directionality of the blur, the discriminating conditions include camera shake level discriminating conditions for discriminating the camera shake level, and the condition setting means is a means for setting the camera shake level discriminating conditions such that the greater the shakiness, the less stringent the camera shake level discriminating conditions.

Preferably, the blur discriminating means of the second image processing apparatus is a means for further discriminating a blur level that indicates the magnitude of blurring of the blur, the discriminating conditions include blur level discriminating conditions for discriminating the blur level, and the condition setting means is a means for setting the blur level discriminating conditions such that the greater the shakiness, the less stringent the blur level discriminating conditions.

Preferably, the parameter setting means and correcting means of the second image processing apparatus of the present invention are means for implementing the parameter setting and the correction only for the digital photograph images having the blur levels greater than or equal to a predetermined threshold value, and the condition setting means is a means for further setting the predetermined threshold value such that the greater the shakiness, the smaller the threshold value.

The imaging condition information of the present invention may include the F number of the lens of the imaging device used for obtaining the digital photograph image. Preferably, in this case, the edge detecting conditions include edge detecting region information that indicates the region of the digital photograph image for detecting edges, the edge detecting means is a means for detecting the edges only within the region, the condition setting means is a means for setting the region in the central region of the digital photograph images obtained with the F numbers smaller than or equal to a predetermined threshold value.

Digital photograph images include those with a shallow depth of field, such as a zoomed portrait. For such an image with a shallow depth of filed, all that is required is that the main subject is not blurred. If discrimination for blur is made to such a portrait which is blurry other than the main subject by detecting edges from the entire image, then the main subject is falsely judged as being blurred. Thus, it is preferable that the main subject region is used as the edge detecting region, and the discrimination of the blur is made by detecting edges from that region for the image with a shallow depth of field. In most cases, the main subject is placed at the center of the photograph image, so that the edge detecting region may be set in the central region of the photograph image for those with a shallow depth of field. The F number of the imaging device used for imaging the digital photograph image may be used as the indicator for indicating the depth of field of the photograph image, so that the photograph image imaged with an F number smaller than or equal to a predetermined threshold value (e.g., 5.6) may be discriminated to be the image with a shallow depth of field.

Also, from the view point of the depth of field, the depth of filed of a zoomed image is shallower than a nonzoomed image. Thus, if the use of zooming function is included in the imaging condition information, then the edge detecting region may preferably be set at the central region of such images with shallow depth of fields.

The referent of "imaging" as used herein means the process from the time when the shutter button is depressed until the image data has been outputted (recording to the internal memory or memory card, or transmitting to networks by a transmitting means), including compression at the time of outputting, and "imaging conditions" include the rate of compression (compression rate). For example, in the case of the digital camera, certain models are capable of selecting the compression rate from "fine", "normal", and "economy" as an imaging condition before imaging, which correspond to "small", "normal", and "great" in compression rate respectively. For the digital camera without such a compression rate setting capability, the compression rate is fixedly set. Preferably, in the second image processing apparatus of the present invention, such a compression rate is obtained as one of the imaging conditions of the digital photograph image, the blur discriminating means is a means for further discriminating the blur level that indicates the magnitude of the blurring, the discriminating conditions include a blur level discriminating conditions for discriminating the blur level, and the condition setting means is a means for setting the blur level discriminating conditions such that the greater the compression rate, the more stringent the discriminating conditions.

The second image processing apparatus of the present invention may further comprise a parameter setting means for setting a parameter for correcting the blur based on the discrimination results provided by the blur discriminating means, and a correcting means for correcting the digital photograph image using the parameter, wherein the blur discriminating means is a means for further discriminating the blur level that indicates the magnitude of blurring of the blur, the parameter setting means and correcting means are means for implementing the parameter setting and the correction only for the digital photograph images having the blur levels greater than or equal to a predetermined threshold value, and the condition setting means is a means for further setting the predetermined threshold value such that the greater the compression rate, the greater the threshold value.

A third image processing method of the present invention is an image processing method for correcting a blur on a digital photograph image comprising the steps of:

extracting a main subject region from the digital photograph image;

setting a parameter for correcting the blur using the image of the main subject region; and correcting the digital photograph image using the parameter provided in the parameter setting step.

A fourth image processing method of the present invention is an image processing method for correcting a blur of a digital photograph image comprising the steps of:

discriminating whether the digital photograph image is an image with a shallow depth of field;

setting a parameter for correcting the blur for the digital photograph image discriminated to be an image with a shallow depth of field by extracting a main subject region from the digital photograph image and using the image of the main subject region, or setting the parameter for correcting the blur for the digital photograph image discriminated to be an image other than the image with a shallow depth of field using the entire region of the digital photograph image; and correcting the digital photograph image using the parameter provided in the parameter setting step.

A fifth image processing method of the present invention is an image processing method for correcting a blur of a digital photograph image comprising the steps of:

extracting a main subject region from the digital photograph image;

setting a first parameter for correcting the blur using the image of the main subject region, and setting a second parameter for correcting the blur using the entire region or the region other than the main subject region;

obtaining a certainty factor that indicates likelihood that the digital photograph image is an image with a shallow depth of field;

obtaining a parameter for correcting the blur through weighting addition of the first and second parameters such that the greater the certainty factor, the heavier the weighting of the first parameter; and correcting the digital photograph image using the parameter obtained in said parameter obtaining step.

If information including the F number of the lens of the imaging device used to obtain the digital photograph image is attached to the image as tag information, the image processing method of the present invention may be a method for obtaining the F number by reading the tag information, and discriminating whether the digital photograph image is an image with a shallow depth of field, or obtaining the certainty factor based on the F number.

Here, in discriminating whether the digital photograph image is the image with a shallow depth of field, for example, if the F number included in the attached information is smaller than or equal to a predetermined threshold value (e.g., 5.6), then the image may be discriminated to be the image with a shallow depth of field, or it is discriminated to be the image other than that with a shallow depth of field if the F number is greater than the predetermined threshold value.

Further, in obtaining the certainty factor that indicates likelihood that the digital photograph image is the image with a shallow depth of field based on the F number, the certainty factor may be set, for example, by defining the maximum certainty factor as 100% to be allocated to the digital photograph image with an F number smaller than or equal to a first predetermined threshold value (e.g., 2.8), and the minimum certainty factor as 0% to be allocated to the digital photograph image with an F number greater than a second predetermined threshold value which is greater than the first threshold value (e.g., 11) as 0%, then allocating the certainty factor to the digital photograph images having F numbers between the two threshold values (e.g., from 2.8 to 11 excluding 2.8 and 11) such that greater the F number, the greater the certainty factor within the range from 100% to 0%, excluding 100% and 0%.

The image processing method of the present invention may be a method for detecting edges in each direction of a plurality of different directions for the image of the main subject region extracted from the digital photograph image and the image of the region other than the main subject region to obtain a characteristic amount of the edges in each direction of the plurality of different directions; obtaining blur information for each of the images based on the edge characteristic amounts, and comparing the blur information obtained from the image of the main subject region with that obtained from the image of the region other than the main subject region to discriminate whether the digital photograph image has a shallow depth of field, or to obtain the certainty factor.

The blur causes point images on the photograph image to be extended, so that the edges are extended in proportion to the extension of the point images in the image having a blur (burred image). That is, the extended aspect of the edges on the image is directly related to the blur on the image. The blur information obtaining method of the present invention has been developed by focusing attention on this fact, and the blur information obtaining method is a method for detecting edges in each direction of a plurality of different directions, and obtaining the blur information based on the edge characteristic amounts.

Here, the referent of "edge characteristic amount" means the characteristic amount related to the extended aspect of the edges on the object image (here, the image of the main subject region or that of the region other than the main subject region of the digital photograph image). For example, it may include sharpness of the edges and distributions of the edge sharpness.

Here, the "sharpness of the edge" may be represented by any parameter as long as it is capable of representing the sharpness of the edge. For the edge represented by the edge profile shown in FIG. 39 the gradient of the edge profile curve, for example, may be used as the edge sharpness such that the greater the change in brightness (the gradient of the profile curve shown in FIG. 3) the greater the edge sharpness, as well as the edge width such that the greater the edge width, the smaller the edge sharpness.

Further, the referent of "blur information" as used herein means the information capable of representing the aspect of the blur in the object image, and may include blur direction information related to the direction of the blur and blur width. "Blurs" may be categorized into the nondirectional blur or defocus blur and directional blur or camera shake blur. In the case of the camera shake blur, the direction of the blur corresponds to the direction of the camera shake, and in the case of the defocus blur, the "blur direction" is "nondirectional".

The referent of "blur width" as used herein means the width of the blur in the direction of the blur, and it may be, for example, the averaged width of the edges in the direction of the blur. If the blur is a nondirectional defocus blur, the width of the blur may preferably be represented by the width of the edge in any one direction, and more preferably it is represented by the averaged edge width of edges in all directions included in the plurality of different directions.

The images of the intended regions of the present invention may include not only a blurred image but also a normal image without any defocus or camera shake blur (the image of the main subject region is a normal image and the image of the region other than the main subject region is a blurred image in the digital photograph image with a shallow depth of field without any defocus or camera shake blur). Such a normal image is assumed to have blurless information or the information comprising "nondirectional" blur direction information and the blur width of "less than a predetermined value".

The referent of "plurality of different directions" as used herein means the directions for identifying the direction of the blur on the objective image, which need to include a direction close to the direction of the blur. Thus, the greater the number of the directions the higher the accuracy of the identified direction, but an appropriate number taking into account the processing speed, for example, 8 directions as shown in FIG. 4 may be preferable.

In the image processing method of the present invention, when discriminating whether the digital photograph image is an image with a shallow depth of field by comparing the blur information obtained from the image of the main subject region with the blur information obtained from the image of the region other than the main subject region, if the blur information obtained from the image of the main subject region indicates "nondirectional" and "blur width of smaller than or equal to a predetermined third threshold value" and the blur information obtained from the image of the region other than the main subject region indicates "nondirectional" and "blur width of greater than or equal to the predetermined third threshold value", for example, the digital photograph image may be discriminated to be the image with a shallow depth of field. In this case, the digital photograph image may be deemed to be an image without any defocus or camera shake blur. For a defocused digital photograph image with a shallow depth of field, the blur information obtained from the image of the main subject region indicates "nonodirectional" and "blur width of greater than or equal to the predetermined third threshold value", and the blur information obtained from the image of the region other than the main subject region indicates "nondirectional" and "blur width of greater than that of the image of the main subject region". For a digital photograph image with a shallow depth of field having a camera shake blur, the blur information obtained from the image of the main subject region and that obtained from the image of the region other than the main subject region indicate "directional", but they indicate different blur widths with each other as expected. Conversely, for a digital photograph image other than the image with a shallow depth of field, the blur information obtained from the image of the main subject region and that obtained from the image of the region other than the main subject region of the digital photograph image may not differ with each other significantly. The image processing method of the present invention has been developed focusing attention on this trend, and the method may determine whether the digital photograph image is an image with a shallow depth of field by comparing the blur information obtained from the image of the main subject region with that obtained from the image of the region other than the main subject region of the digital photograph image. Further, in the image processing method of the present invention, when calculating the certainty factor that indicates likelihood that the digital photograph image is an image with a shallow depth of field by comparing the blur information obtained from the image of the main subject region with that obtained from the image of the region other than the main subject region of the digital photograph image, it may be calculated such that the greater the difference between the blur information obtained from the image of the main subject region and that obtained from the image of the region other than the main subject region, the greater the certainty factor, not just discriminating whether the image has a shallow depth of field.

Further, the image processing method of the present invention may be a method for dividing the digital photograph image into a plurality of segments, detecting edges in each direction of a plurality of different directions for each image in each of the segments to obtain a characteristic amount of the edges in each direction of the plurality of different directions, obtaining blur information for each image in each of the segments based on the edge characteristic amounts for each image in each of the segments, comparing the blur information obtained from each image in each of the segments to determine whether the digital photograph image has a shallow depth of field or to obtain the certainty factor.

For the image with a shallow depth of field, or the image with a high certainty factor indicating that the image is highly likely the image with a shallow depth of field, each of the segments may be grouped into two or more groups, wherein the difference in the blur information among the groups is greater than or equal to a predetermined threshold value, and difference among the segments in each group is very small. These groups are deemed to correspond to the image of the main subject region and the image in the region other than the main subject region. Thus, by focusing attention on this, the image processing method of the present invention may be a method for comparing the blur information obtained from each image in each of the segments to determine whether the image has a shallow depth of field or to calculate the certainty factor.

In the image processing method of the present invention, as for the method of setting the parameter for correcting the blur, any method (e.g., method described in Japanese unexamined Patent Publication No. 7 (1995)-121703)) may be employed as long as it is capable of setting the parameter using the image to be used for setting the parameter (image of the main subject region in the third image processing method, image of the main subject region and the entire digital photograph image in the fourth image processing method, image of the main subject region and the entire digital photograph image or the image of the region other than the main subject region in the fifth image processing method). Preferably, the image processing method of the present invention is a method for setting the parameter through the steps of: detecting edges in each direction of a plurality of different directions to obtain a characteristic amount for the edges in each direction of the plurality of different directions; obtaining blur information based on the edge characteristic amounts; and setting the parameter based on the blur information.

As described above, "blurs" may be categorized into the nondirectional blur or defocus blur and directional blur or camera shake blur. In the case of the camera shake blur, the direction of the blur corresponds to the direction of the camera shake, and in the case of the defocus blur, the "blur direction" is "nondirectional". The image processing method of the present invention may obtain information that indicates whether the blur on the image is a nondirectional defocus blur or directional camera shake blur as the blur information, and also the direction of the camera shake if it is a camera shake blur. With the information described above, the image processing method of the present invention may set an isotropic correction parameter for correcting the blur isotropically if it is a defocus blur, or a directional correction parameter for correcting the blur directionally if it is a camera shake blur.

Here, the referent of "isotropic correction" means image correction that will act on evenly on all directions, and "directional correction" means image correction that will act on only in a predetermined direction or image correction in which the effect differs from direction to direction. In the meantime, the blur appears on the image as extended edges, so that the conventional methods for increasing the sharpness of the image, such as USM (unsharpness masking) or the like, may be used as the image correction method for blurs. In setting the parameter for the image correction described above, the parameter will be set according to the required correction method. For example, when USM is to be used as the image correction, an isotropic correction mask may be set as the isotropic correction parameter, and a directional correction mask that will act on the direction of the blur may be set as the directional correction parameter. Further, the size of the correction mask may be set according to the blur width included in the blur information.

Further, there may be cases where the blur is unable to be categorized clearly into the defocus or camera shake blur from the blur information or in other cases the blurred image may include both defocus and camera shake blurs. Preferably, in order to be prepared for such cases, the image processing method of the present invention is a method for further obtaining information related to a camera shake level that indicates the magnitude of camera shake in the direction of the blur as the blur information without discriminating if it is a defocus or camera shake blur, and setting the parameter through weighting addition of the isotropic correction parameter for correcting the blur isotropically and the directional correction parameter for correcting the blur directionally such that the greater the camera shake level, the heavier the weighting of the directional correction.

Preferably, the image processing method of the present invention is a method for further obtaining information related to a blur level that indicates the magnitude of blurring of the blur as the blur information, and setting the parameter such that the greater the blur level, the greater the correction level.

Here, the image having a blur level smaller than a predetermined threshold value may be deemed as a normal image without any blur. Therefore, the method described above may be a method for setting the correction parameter that indicates "not to implement the correction", and implementing the correction for such images (the result is that the corrected image is the same as the original one). Preferably, however, the method described above is a method for setting the parameter and implementing the correction only those digital photograph images having blur levels greater than a predetermined threshold value, in which neither the parameter setting nor the correction is implemented for the images having blur levels smaller than the predetermined value in order to improve the processing efficiency.

Preferably, in the present invention, edges are detected from a reduced image obtained by reducing the object image, since the edge may be detected more easily from the reduced image than from the original with less amounts of calculation.

Preferably, in the present invention, only those edges having intensities greater than or equal to a predetermined threshold value are detected from the object image, since most of the low intensity edges are likely to be noise, and people are likely to recognize the blur by the high intensity edges.

Preferably, the invalid edges are eliminated from those detected from the object image. Here, the referent of "invalid edges" means the edges which seem to be irrelevant to the blur information or those that may make it difficult to obtain the blur information or lead to false blur information, such as those having complicated shapes or those exposed to direct light from a light source.

A third image processing apparatus of the present invention is an image processing apparatus for correcting a blur of a digital photograph image, comprising:

a main subject region extracting means for extracting a main subject region from the digital photograph image;

a parameter setting means for setting a parameter for correcting the blur using the image of the main subject region; and a correcting means for correcting the digital photograph image using the parameter provided by the parameter setting means.

A fourth image processing apparatus of the present invention is an image processing apparatus for correcting a blur of a digital photograph image, comprising:

a main subject region extracting means for extracting a main subject region from the digital photograph image;

a discriminating means for discriminating whether the digital photograph image is an image with a shallow depth of field;

a parameter setting means for setting a parameter for correcting the blur of the digital photograph image discriminated to be an image with a shallow depth of field by the discriminating means using the image of the main subject region of the digital photograph image extracted by the main subject region extracting means, or for setting a parameter for correcting the blur of the digital photograph image discriminated to be an image other than the image with a shallow depth of field using the entire region of the digital photograph image; and a correcting means for correcting the digital photograph image using the parameter provided by the parameter setting means.

A fifth image processing apparatus of the present invention is an image processing apparatus for correcting a blur of a digital photograph image, comprising:

a main subject region extracting means for extracting a main subject region from the digital photograph image;

a certainty factor calculating means for calculating a certainty factor that indicates likelihood that the digital photograph image is an image with a shallow depth of field;

a first parameter setting means for setting a parameter for correcting the blur using the image of the main subject region extracted by the main subject region extracting means;

a second parameter setting means for setting a parameter for correcting the blur using the entire region of the digital photograph image or the image of the region other than the main subject region;

a combined parameter obtaining means for obtaining a combined parameter through weighting addition of the parameter provided by the first parameter setting means and the parameter provided by the second parameter setting means such that the greater the certainty factor obtained by the certainty factor calculating means, the heavier the weighting of the parameter provided by the first parameter setting means; and a correcting means for correcting the digital photograph image using the combined parameter obtained by the combined parameter obtaining means.

The image processing apparatus of the present invention may comprise an tag information reading means for reading out tag information including the F number of the lens of the imaging device used for obtaining the digital photograph image attached to the digital photograph image to obtain the F number, and the discriminating means or the certainty factor calculating means may be a means for discriminating whether the digital photograph image is an image with a shallow depth of field or a means for calculating the certainty factor based on the F number.

The image processing apparatus of the present invention may comprise a blur information obtaining means for obtaining blur information by detecting edges in each direction of a plurality of different directions for an object image, obtaining characteristic amount for the edges in each direction of the plurality of different directions, and obtaining the blur information based on the edge characteristic amounts, and the discriminating means or the certainty factor calculating means may be a means for discriminating whether the digital photograph image is an image with a shallow depth of field or a means for calculating the certainty factor by comparing each of the blur information obtained by the blur information obtaining means from the image of the main subject region and the image of the region other than the main subject region, with the images deemed to be the object images.

The image processing apparatus of the present invention may comprise a segmenting means for dividing the digital photograph image into a plurality of segments and a blur information obtaining means for obtaining blur information for an object image by detecting edges in each direction of a plurality of different directions, obtaining a characteristic amount for the edges in each direction of the plurality of different directions, and obtaining the blur information based on the edge characteristic amounts, and the discriminating means or certainty factor calculating means may be a means for discriminating whether the digital photograph image is an image with a shallow depth of field, or a means for calculating the certainty factor by comparing each of the blur information obtained by the blur information obtaining means from each image of each of the plurality of segments, with the images deemed to be the object images. Preferably, in the image processing apparatus of the present invention, the parameter setting means comprises a blur information obtaining means for obtaining blur information by detecting edges in each direction of a plurality of different directions, obtaining characteristic amount for the edges in each direction of the plurality of different directions, and obtaining the blur information based on the edge characteristic amounts for the image used for setting the parameter for correcting the blur, wherein the parameter setting means is a means for setting the parameter based on the blur information obtained by the blur information obtaining means.

The digital photograph image often includes two or more main subjects. For example, a single image including a plurality of people has the number of facial portions corresponding to the number of people as long as any two facial portions are not overlapped with each other. From such a digital photograph image, two or more main subjects are extracted. The parameter setting means that uses the image of the main subject region (the parameter setting means of the third image processing apparatus, the parameter setting means of the fourth image processing apparatus, the third parameter setting means of the fifth image processing apparatus) may be a means for setting the parameter using all the images extracted from the main subject region. Preferably, however, the image processing apparatus of the present invention is a means for setting the parameter by selecting a single main subject from two or more subjects extracted from the main subject region and using the selected main subject. That is, the main subject extracting means of the image processing apparatus of the present invention preferably comprises a main subject candidate extracting means for extracting candidates for a main subject region from the digital photograph image, and a main subject selecting means for selecting the main subject region from a plurality of candidates for the main subject region extracted by the main subject candidate extracting means.

More specifically, the main subject selecting means may be a means for selecting the main subject candidate which is deemed most critical in setting the parameter for image correction including blur information analysis, or that which is deemed to be the most important to the photographer as the main subject. For example, it may be a means for selecting one of the main subject candidates having the largest size from among the plurality of main subject candidates as the main subject, or it may be a means for selecting the main subject candidate located at the place closest to the center of the digital photograph image as the main subject.

Further, the main subject selecting means may be a means for selecting the main subject candidate designated by the user as the main subject from among the plurality of the main subject candidates.

The size of the image used by the parameter setting means (the digital photograph image itself, image of the main subject region, image of the region other than the main subject region) varies from image to image. Preferably, these images are used after being reduced, since the use of these images for the parameter setting without reducing requires longer processing time, and is inefficient. However, if the same reduction ratio is used for reducing large and small sized images, for example, in the edge extraction process for setting the parameter, the number of edges to be extracted may become too many for the large sized image, requiring longer time for the subsequent processes including the analysis for setting the parameter, resulting in inefficiency. On the other hand, if the small sized image is reduced using a reduction ratio which is appropriate for the large sized image in order to reduce the processing time, then the reduced image becomes too small to make an appropriate analysis, which may bring about the problem that the appropriate parameter may not be set. Preferably, the image processing apparatus of the present invention comprises a reducing means for reducing the image to be used by the parameter setting means to obtain a reduced image, and the parameter setting means is a means for setting the parameter using the reduced image, wherein the reducing means is a means for performing the image reduction in accordance with the size of the image of the main subject region to be used by the parameter setting means such that the greater the size, the greater the reduction ratio applied to the image (conversely, the smaller the size of the image, the smaller the reduction ratio of the image, including the zero reduction ration, i.e., not reduced).

Here, the reducing means is a means for reducing the image of the main subject region in accordance with its size by taking special note of the large variations in size of the image of the main subject region extracted from the digital photograph image. Of course, the image reducing operation described above may be applied to the other images to be used by the parameter setting means (entire digital photograph image, image of the region other than the main subject region).

The image size, for example, may be expressed by the number of pixels of the image data representing the image.

Further, the image processing method of the present invention may be provided as a program for use with a computer.

According to the first image processing method, apparatus, program, and digital camera, the blur information is obtained from a digital photograph image, so that no device is required for obtaining information related to the camera shake at the time of imaging for correcting the camera shake blur. This allows the blur information to be obtained with the size of the imaging device kept small, which is especially advantageous for the auxiliary digital cameras of mobile phones for which the miniaturization is the mandatory requirement.

According to the image processing method, apparatus and program, the blur information is obtained based on the characteristic amount of the edges detected in each direction of a plurality of different directions, and the blur is corrected based on the blur information, so that less amount of calculation is required, allowing more rapid processing and higher efficiency compared with the method in which the correcting process is repeated without blur information.

According to the second image processing method and apparatus, in discriminating the blurred state of a digital photograph image, the imaging condition information at the time of imaging is obtained, and edge detecting conditions for discriminating the blur, conditions for discriminating whether the image in question is a normal image or a blurred image, and conditions for discriminating the camera shake blur are adjusted based on the imaging conditions using the fact that the imaging conditions will reflect the shakiness and camera shake inducing direction of the digital photograph image, so that the accuracy of the discrimination may be improved.

Further, the discrimination accuracy of the blur may be improved also for the image with a shallow depth of field by limiting the central region of a digital photograph image, which is more likely to be the main subject region, as the region for detecting the edges for the image with a shallow depth of field based on the depth of field reflected by the imaging condition information.

The blur discrimination accuracy may be improved for the images obtained by the auxiliary digital cameras of mobile phones, by obtaining the model information of the mobile phone, obtaining the shakiness and camera shake inducing direction of the image based on the model information, and adjusting the edge detecting conditions such that the greater the shakiness, the greater the number of directions for detecting edges, or closer the region is to the camera shake inducing direction, the greater the number of directions for detecting edges.

According to the third image processing method and apparatus, the image correction for the digital photograph image is implemented by extracting the main subject region from the digital photograph image, and setting the parameter for correcting the blur using the image of the main subject region, so that no user involvement is required for determining the region for setting the parameter. In particular, for the image with a shallow depth of field, the accuracy of the image correction may be improved by setting the correction parameter using only the image of the main subject region to which the image correction is required the most. Further, the correction parameter is obtained using the image of the main subject region, so that no additional device is required for obtaining the information related to the camera shake at the time of imaging, thereby the size of the imaging device may be kept small, which is especially advantageous for the auxiliary digital cameras of mobile phones for which the miniaturization is the mandatory requirement.

According to the fourth image processing method and apparatus of the present invention, the image correction for the digital photograph image is implemented by discriminating if it is an image with a shallow depth of field, and setting the correction parameter using the image of the main subject region for the digital photograph image with a shallow depth of field, so that the similar effect as that of the third image processing method and apparatus may be obtained. In addition, the image correction for the images other than those with shallow depth of fields is implemented by setting the correction parameter using the entire digital photograph image, so that the accuracy of the image correction may be improved for the images other than those with shallow depth of fields.

According to the fifth image processing method and apparatus of the present invention, the image correction for the digital photograph image is implemented by calculating the certainty factor that indicates likelihood that the digital photograph image is an image with a shallow depth of field, and using the parameter obtained through a weighting addition of the parameter which has been set using the image of the main subject region (a first parameter) and the parameter which has been set using the entire digital photograph image or the image of the region other than the main subject region (a second parameter) such that the greater the certainty factor, the heavier the weighting of the first parameter, so that the similar effect as that of the fourth image processing method and apparatus may be obtained. In addition, a good correction effect may be obtained even when there is a slight difference in the discrimination of the depth of field of the digital photograph image.

BRIEF DESCRIPTION OF THE DRAWINGS

FIG. 4 is a drawing illustrating a histogram of edge widths.

FIG. 8 is a block diagram illustrating the configuration of a scene analyzing means 100.

FIG. 9A is a drawing illustrating a horizontal direction edge detecting filter.

FIG. 9B is a drawing illustrating a vertical direction edge detecting filter.

FIG. 10 is a drawing for describing how to calculate a gradient vector.

FIG. 26A is a drawing for describing the operation of an analyzing means 220a.

FIG. 26B is a drawing for describing the operation of an analyzing means 220a.

FIG. 26C is a drawing for describing the operation of an analyzing means 220a.

FIG. 40 is a drawing illustrating a histogram of edge widths.

FIG. 41A is a drawing for describing the operation of an analyzing means 420.

FIG. 41B is a drawing for describing the operation of an analyzing means 420.

FIG. 41C is a drawing for describing the operation of an analyzing means 420.

FIG. 44 is a block diagram illustrating a face extracting means 500.

FIG. 45A is a drawing illustrating an edge detecting filter for horizontal direction.

FIG. 45B is a drawing illustrating an edge detecting filter for vertical direction.

FIG. 46 is a drawing for describing how to calculate a gradient vector.

DESCRIPTION OF THE PREFERRED EMBODIMENTS

Hereinafter, embodiments of the present invention will be described with reference to the accompanying drawings.

Figure 1:
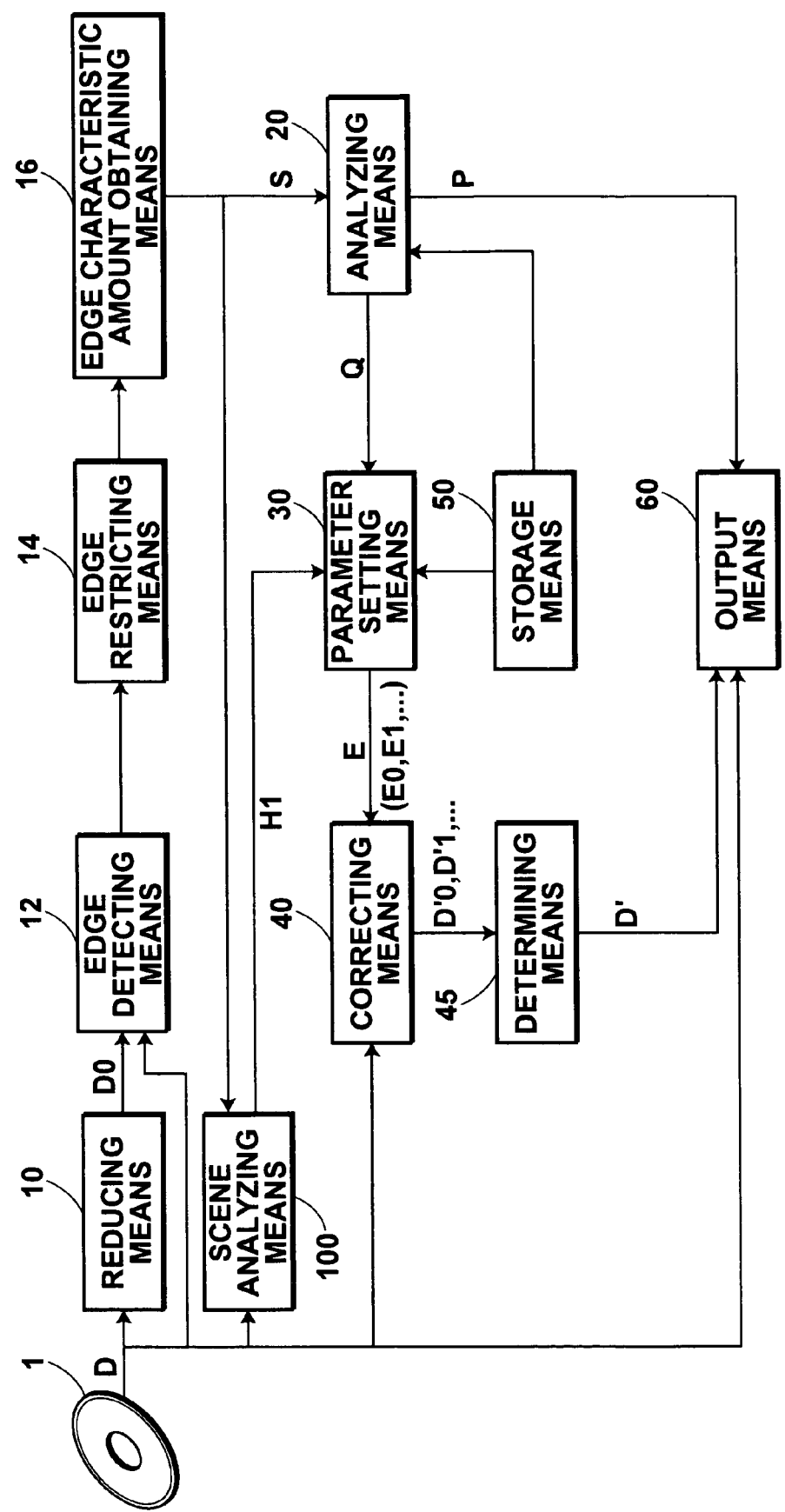
FIG. 1 is a block diagram illustrating the configuration of an image processing system according to a first embodiment of the present invention.

FIG. 1 is a block diagram of an image processing system according to a first embodiment of the present invention. The image processing system shown in FIG. 1 is a system for implementing the image processing by reading out photograph images (images) from a recording medium 1 that contains images obtained by auxiliary digital cameras of mobile phones (mobile cameras). The recording medium 1 contains groups of images, each comprising a number of images. Here, the description will be made taking a single image D as an example.

Figure 2:
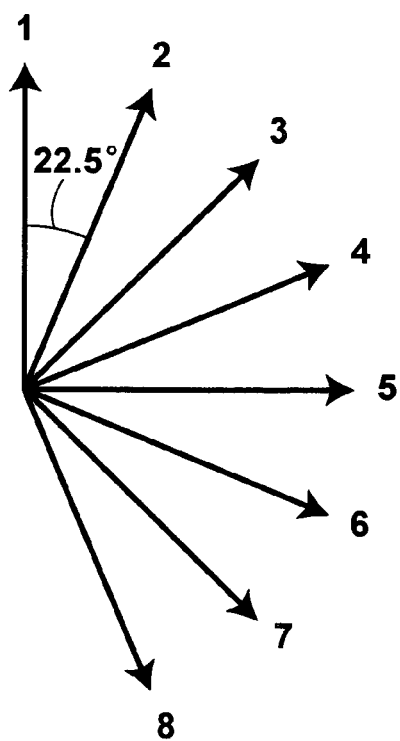
FIG. 2 is a drawing illustrating directions used for detecting edges.

As shown in the drawing, the image processing system according to the present embodiment comprises: a reducing means 10 for reducing the image D read out from the recording medium 1 to obtain a reduced image D0 of the image D; an edge detecting means 12 for detecting edges in each direction of 8 directions shown in FIG. 2 using the image D and reduced image D0; an edge restricting means 14 for eliminating invalid edges from among those detected by the edge detecting means 12; an edge characteristic amount obtaining means 16 for obtaining characteristic amounts S for the edges obtained by the edge restricting means 14; an analyzing means 20 for discriminating whether the image D is a blurred image or a normal image by calculating a bur direction and blur level N using the edge characteristic amounts S, and transmitting information P indicating that the image D is a normal image to an output means 60, to be described later if the image D is discriminated to be a normal image and thereafter terminating the step, or transmitting information indicating that the image D is a blurred image to a scene analyzing means 100, to be described later if the image D is discriminated to be a blurred image, calculating a camera shake level K and blur width L, and transmitting them with the blur level N and blur direction as blur information Q to a parameter setting means 30, to be described later; a scene analyzing means 100 for analyzing the image D to obtain scene information H1 (here, information indicating whether the image is a portrait or an image other than a portrait as an example) and transmitting the information to the parameter setting means 30 when the information indicating that the image D is a blurred image is received from the analyzing means 20; a parameter setting means 30 for setting a plurality of parameters E (E0, E1, E2 and so on) for correcting the blurred image D based on the blur information Q from the analyzing means 20 and the scene information H1 from the scene analyzing means 100; a correcting means 40 for correcting the image D using the parameters E0, E1, E2 and so on to obtain corrected images D'0, D'1, D'2 and so on, each corresponding to each correction parameter; a discriminating means 45 for discriminating the intended image D' from among the corrected images D'0, D'1, D'2 and so on, and outputting the intended image D' to the output means 60; a storage means 50 containing various databases for the analyzing means 20 and parameter setting means 30; and an output means 60 for outputting image D when the information P indicating that the image D is a normal image is received from the analyzing means 20, or outputting the intended image D' when the intended image D' is received from the discriminating means 45.

Hereinafter the configuration of each component of the image processing system shown in FIG. 1 will be described.

The edge detecting means 12 detects edges having intensity greater than or equal to a predetermined threshold value in each direction of the 8 directions as shown in FIG. 2 using the reduced image D0 to obtain the coordinates of the edges. Then, it creates an edge profile for each of the edges as shown in FIG. 3 using the image D based on the coordinates of each of the edges detected in each direction, and outputs the profiles to the edge restricting means 14.

The edge restricting means 14 eliminates invalid edges such as those having complicated shapes or those exposed to direct light from a light source (e.g., the edge with brightness greater than or equal to a certain value) based on the edge profiles outputted from the edge detecting means 12, and outputs the profiles of the remaining edges to the edge characteristic amount obtaining means 16.

Figure 3:
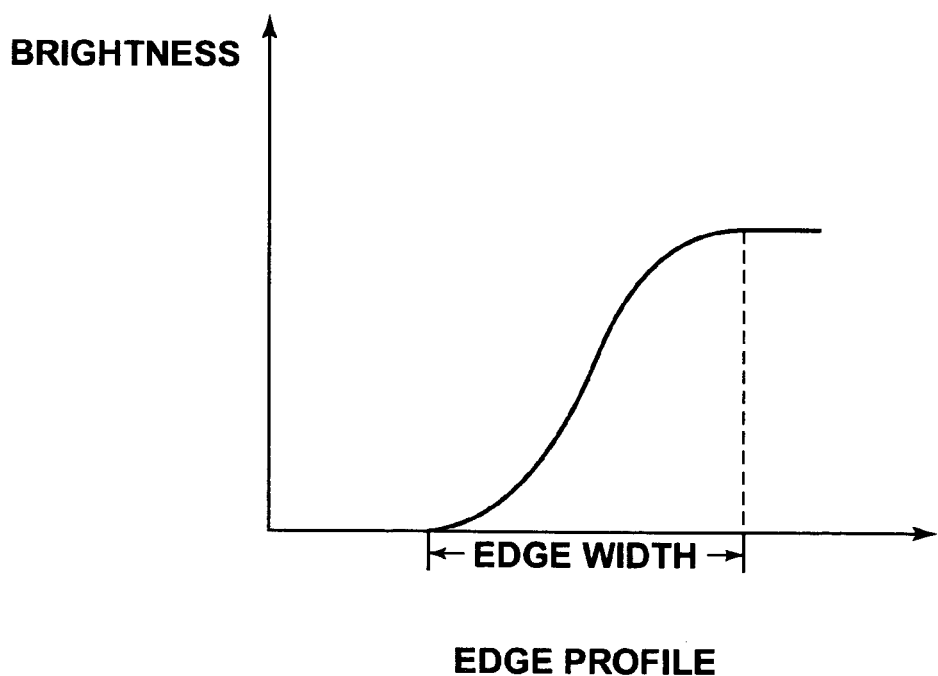
FIG. 3 is a drawing illustrating an edge profile.

The edge characteristic amount obtaining means 16 obtains an edge width as shown in FIG. 3 for each of the edges based on the edge profiles outputted from the edge restricting means 14, creates a histogram of edge widths as shown in FIG. 4 for each direction of the 8 directions shown in FIG. 2, and outputs the histograms together with the edge widths as edge characteristic amounts S to the analyzing means 20.

The analyzing means 20 mainly performs the following two processes.

1. Discriminates whether the image D is a blurred image or a normal image by calculating the blur direction and blur level N of the image D.

2. Calculates blur width L and camera shake level K if the image D is discriminated to be a blurred image.

Here, the first process will be described first.

Figure 5A:
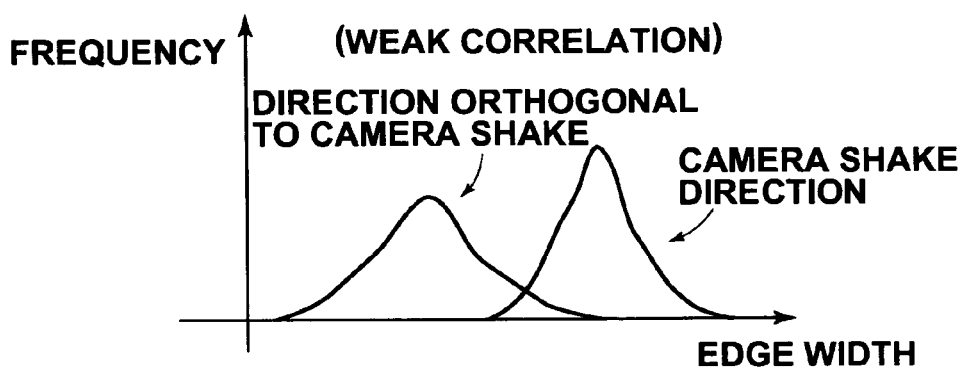
FIG. 5A is a drawing for describing the operation of an analyzing means 20.
Figure 5B:
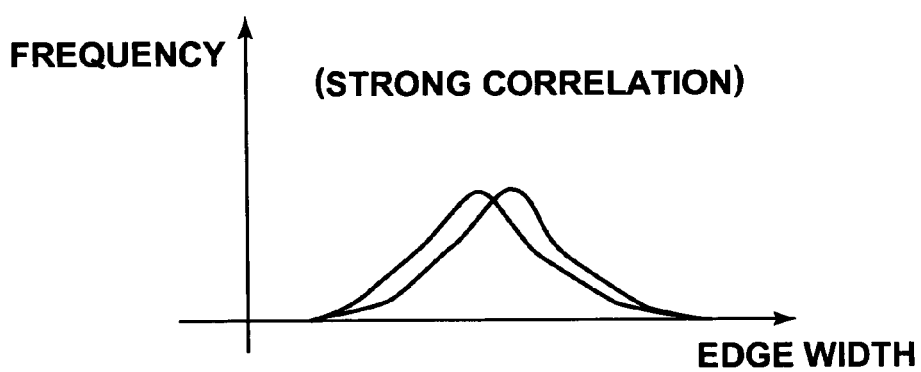
FIG. 5B is a drawing for describing the operation of an analyzing means 20.

The analyzing means 20 obtains a correlation value between the two histograms of edge widths (histograms) in each pair of directions which are orthogonal to each other in the 8 directions shown in FIG. 2 (1-5, 2-6, 3-7, 4-8) in order to obtain a blur direction on the image D. A variety of correlation values may be available depending on the method. They may be roughly categorized into two types: one in which the greater the correlation value, the less the strength of the correlation, and the other in which the correlation value is proportional to the strength of the correlation, that is, the greater the correlation value, the greater the strength of the correlation. In the present embodiment, a correlation value which is proportional to the strength of the correlation is used as an example. As shown in FIG. 5A, for the image with a camera shake blur, the correlation between the histogram of the direction of the camera shake blur and that of the direction which is orthogonal to the direction of the camera shake blur is small, whereas the correlation between the histograms of a set of orthogonal directions having no relation to the camera shake or between those of a set of orthogonal directions for an image without any camera shake blur (image without any blur or with defocus blur) is large as shown in FIG. 5B. Based on this fact, the analyzing means 20 of the image processing system according to the present embodiment is adapted to obtain the correlation value between the histograms in each of the four direction pairs to find out two directions of the direction pair having the smallest correlation value between the two histograms thereof. If the image D has a camera shake blur, one of these two directions may be regarded as the direction which is closest to the direction of the camera shake blur among the 8 directions shown in FIG. 2.

Figure 5C:
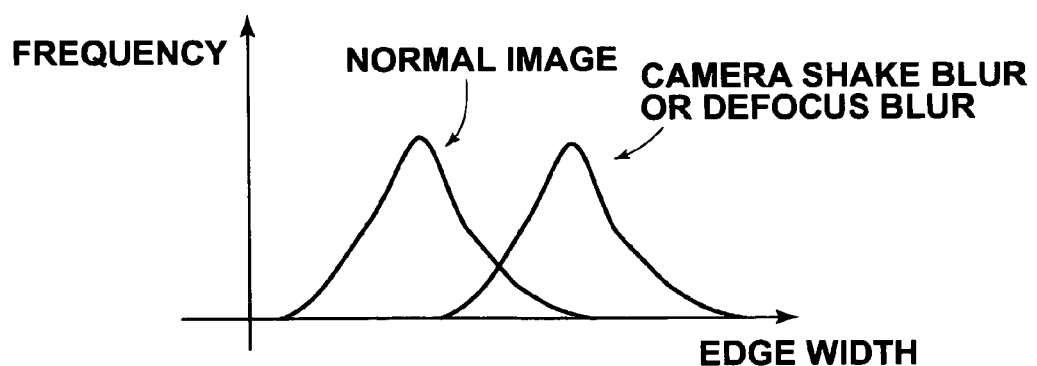
FIG. 5C is a drawing for describing the operation of an analyzing means 20.

FIG. 5C is a histogram of edge widths in the camera shake direction for the images of the same subject with a camera shake blur, with a defocus blur, and without any blur (defocus and camera shake blurs). As shown in FIG. 5C, the normal image without any blur has the smallest averaged edge width, that is, one of the two directions having a greater averaged edge width should be the direction closest to the direction of the camera shake.

In this way, the analyzing means 20 finds out a pair of directions having the smallest correlation, and discriminates one of the directions having a greater averaged edge width to be the blur direction.

Figure 6:
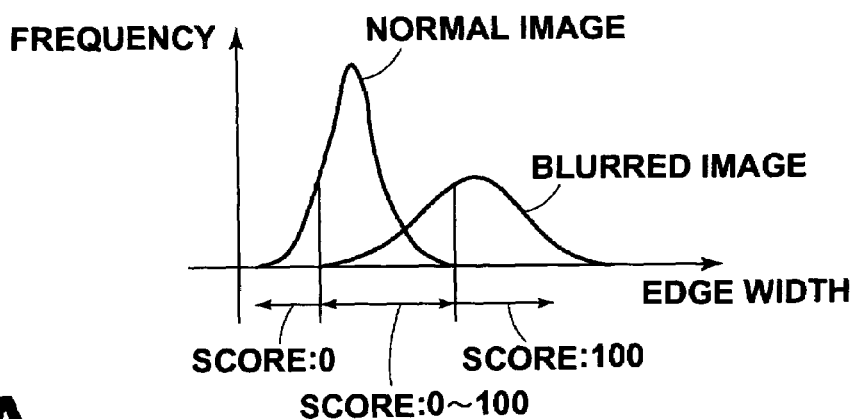
FIG. 6 is a drawing for describing how to calculate a blur level.

Then, the analyzing means 20 obtains the blur level N of the image D. The blur level of an image indicates the levels of blurring in the image. For example, the averaged edge width in the most heavily blurred direction (here, the blur direction obtained by the analyzing means 20 described above) may be used. Here, in the present embodiment, however, the blur level N is obtained more accurately by using each edge width of each of the edges in the blur direction and the database which is based on the FIG. 6. FIG. 6 shows the histograms of edge width distributions of blurred and normal images in the most heavily blurred direction (for the normal image, the direction corresponding to this direction is desirable, but any direction may be used) created based on a database of normal images for learning and that of blurred images, with the ratio of frequency (vertical axis in the FIG. 6) between the blurred and normal images for each edge width illustrated as the evaluated value (score in FIG. 6). A database of correlated edge widths with scores (score database) is created and stored in the storage means 50.

The analyzing means 20 obtains the score for each of the edges in the blur direction based on the edge width by referring to the database created based on FIG. 6 and stored in the storage means 50, and calculates the blur level N of the image D by averaging the scores of all the edges in the blur direction. If the blur level N so obtained is smaller than a predetermined threshold value T, the analyzing means 20 discriminates the image D to be a normal image and terminates its process after outputting information P indicating that the image D is a normal image to the output means 60.

On the other hand, if the blur level N is greater than or equal to the predetermined threshold value T, the analyzing means 20 discriminates the image D to be a blurred image, and initiates the second process described above after sending the information indicating that the image D is a blurred image to the scene analyzing means 100.

As the second process, the analyzing means 20 first obtains a camera shake level K of the image D. The camera shake level K that indicates the magnitude of the camera shake of the blur of the blurred image may be obtained based on the following elements.

1. The correlation value of the direction pair having the smallest correlation (the least correlated pair): the smaller the correlation value, the greater the camera shake level.

Figure 7A:
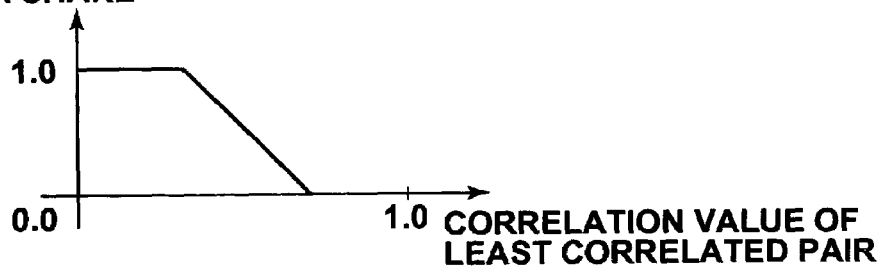
FIG. 7A is a drawing for describing how to calculate a camera shake level.

Focusing attention on this, the analyzing means 20 obtains a first camera shake level K1 based on the curve shown in FIG. 7A. Here, a loop-up table (LUT) based on the curve shown in FIG. 7A has already been stored in the storage means 50, and the analyzing means 20 obtains the first camera shake level K1 corresponding to the correlation value of the least correlated pair by reading it out from the storage means 50.

2. Averaged edge width in one of the directions having a greater averaged edge width in the least correlated pair: the greater the averaged edge width, the greater the levels of camera shake.

Figure 7B:
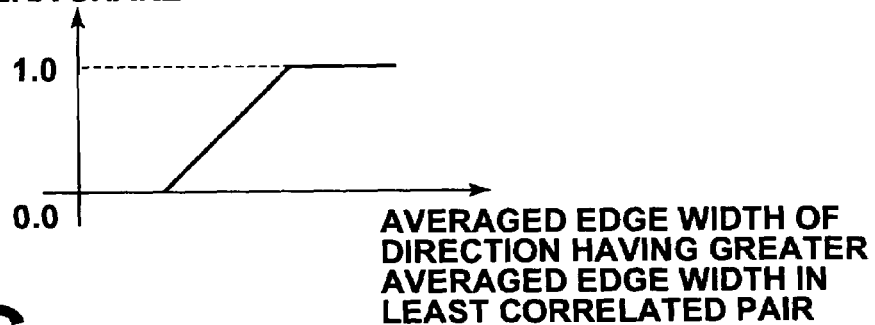
FIG. 7B is a drawing for describing how to calculate a camera shake level.

Focusing attention on this, the analyzing means 20 obtains a second camera shake level K2 based on the curve shown in FIG. 7B. Here, a loop-up table (LUT) based on the curve shown in FIG. 7B has already been stored in the storage means 50, and the analyzing means 20 obtains the second camera shake level K2 corresponding to the averaged edge width in one of the directions having a greater averaged edge width in the least correlated pair by reading it out from the storage means 50.

3. Difference in averaged edge width between the two directions in the least correlated pair: the greater the difference, the greater the camera shake level.

Figure 7C:
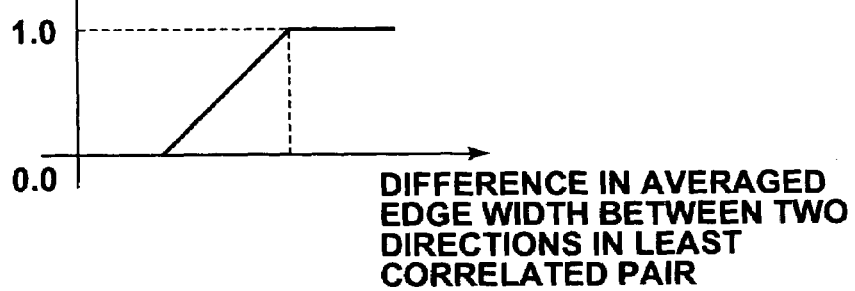
FIG. 7C is a drawing for describing how to calculate a camera shake level.

Focusing attention on this, the analyzing means 20 obtains a third camera shake level K3 based on the curve shown in FIG. 7C. Here, a loop-up table (LUT) based on the curve shown in FIG. 7C has already been stored in the storage means 50, and the analyzing means 20 obtains the third camera shake level K3 corresponding to the difference in averaged edge width between the two directions of the least correlated pair by reading it out from the storage means 50.

The analyzing means 20 obtains the first camera shake level K1, second camera shake level K2, and third camera shake level K3 in this way, and then obtains the camera shake level K of the blurred image D in accordance with the following formula using the values o fK1, K2 and K3.

$$K = K1 \times K2 \times K3 \qquad (1)$$

Where,
K: camera shake level
K1: first camera shake level
K2: second camera shake level
K3: third camera shake level Then, the analyzing means 20 obtains the blur width L of the blurred image D. Here, the analyzing means 20 may be adapted to obtain the averaged edge width in the blur direction or to obtain the averaged edge width in the 8 directions shown in FIG. 2 as the blur width L regardless of camera shake level K.

The analyzing means 20 obtains the camera shake level K and blur width L in this way, and transmits them with the blur level N and blur direction as the blur information Q to the parameter setting means 30.

The scene analyzing means 100 is a means for obtaining scene information H1 related to the image-scene of the image D. Here, the scene information H1 indicates whether the image D is a portrait or other than a portrait as an example. In order to determine if an image is a portrait or other than a portrait, the image needs to be analyzed if it contains the face of a person. If it contains the face of a person, the image scene may be discriminated to be a portrait, and if not, it may be discriminated to be other than a portrait. The scene analyzing means 100 of the present embodiment is adapted to analyze the image D to see if it contains the face of a person to obtain the scene information H1.

FIG. 8 is a block diagram illustrating the detailed configuration of the scene analyzing means 100 of the present embodiment. As shown in the Figure, the scene analyzing means 100 comprises: a characteristic amount calculating means 110 for calculating a characteristic amount C0 from the image D; a database 115 comprising reference data H0, to be described later; and a scene discriminating means 120 for discriminating whether the image D contains the face of a person, and outputting the scene information H1 indicating the image scene of the image D (portrait if it contains a face, and other than a portrait if not) to the parameter setting means 30.

The characteristic amount calculating means 110 of the scene analyzing means 100 calculates the characteristic amount C0 used for identifying the face of a person from the image D. More specifically, it calculates gradient vectors (i.e., changing direction in the density and magnitude for each of the pixels on the image D) as the characteristic amounts C0. Hereinafter, calculation of the gradient vectors will be described. First, the characteristic amount calculating means 110 detects edges in the horizontal direction within the image D by administering a filtering process with a horizontal edge detecting filter as shown in FIG. 9A. The characteristic amount calculating means 110 also detects edges in the vertical direction within the image D by administering a filtering process with a vertical edge detecting filter as shown in FIG. 9B. Then, gradient vector K for each pixel of the image D is calculated from the size H of horizontal edge and the size V of the vertical edge as illustrated in FIG. 10.

Figure 11A:
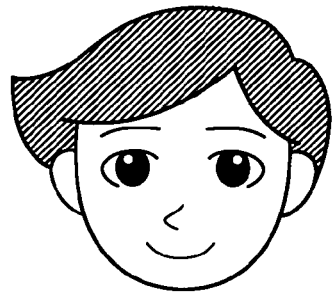
FIG. 11A is a drawing illustrating a human face.
Figure 11B:
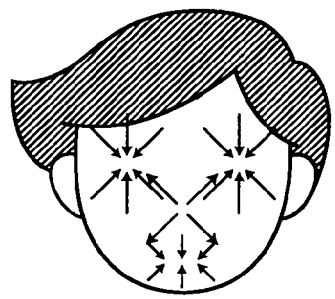
FIG. 11B is a drawing illustrating gradient vectors in the vicinity of the eyes and mouth of the human face shown in FIG. 11A.

In the case that an image pictures a human face therein such as that illustrated in FIG. 11A, the gradient vectors K, which are calculated in the manner described above, are directed toward the centers of eyes and mouths, which are dark, and are directed away from noses, which are bright, as illustrated in FIG. 11B. In addition, the magnitudes of the gradient vectors K are greater for the mouth than for the eyes, because changes in density are greater for the mouth than for the eyes.

The direction and magnitude of the gradient vector K is defined as the characteristic amount C0. The direction of the gradient vector K may form an angle between 0° and 359° with a predetermined direction (e.g. X direction in FIG. 10).

Figure 12A:
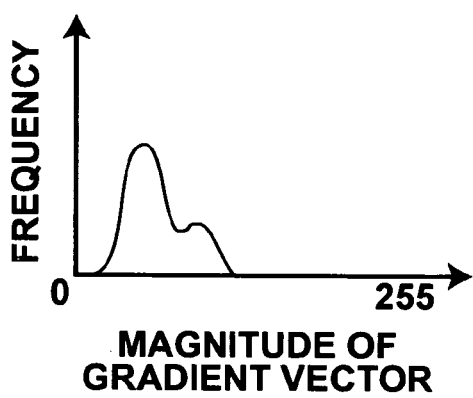
FIG. 12A is a drawing illustrating a histogram of magnitudes of gradient vectors before normalization.
Figure 12B:
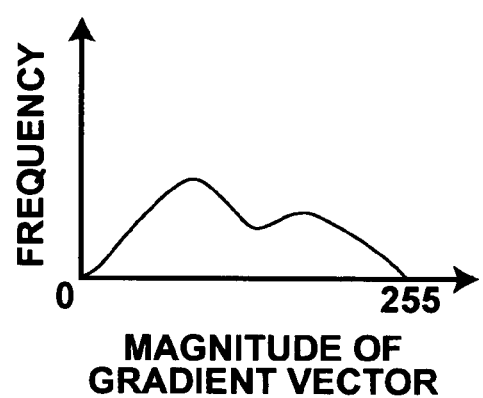
FIG. 12B is a drawing illustrating a histogram of magnitudes of gradient vectors after normalization.
Figure 12C:
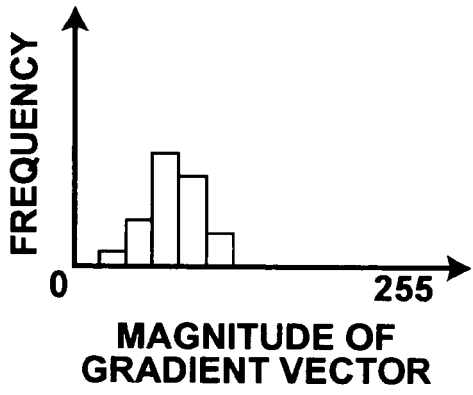
FIG. 12C is a drawing illustrating a histogram of quinarized magnitudes of gradient vectors.

Here, the magnitudes of the gradient vectors K are normalized. The normalization is performed in the following manner. First, a histogram that represents the magnitudes of the gradient vectors K of all of the pixels within the image D is derived. Then, the magnitudes of the gradient vectors K are corrected, by flattening the histogram so that the distribution of the magnitudes is evenly distributed across the range of values assumable by each pixel of the image D (0 through 255 in the case that the image data is 8 bit data). For example, in the case that the magnitudes of the gradient vectors K are small and concentrated at the low value side of the histogram as illustrated in FIG. 12A, the histogram is redistributed so that the magnitudes are distributed across the entire range from 0 through 255, as illustrated in FIG. 12B. Note that, in order to reduce the amount of calculations, it is preferable that the distribution range of the gradient vectors K in a histogram be divided, for example, into five as illustrated in FIG. 12C.

Figure 12D:
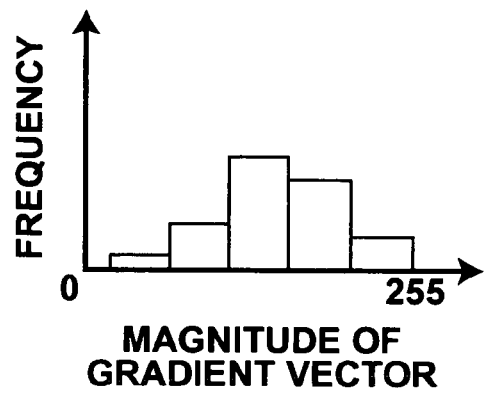
FIG. 12D is a drawing illustrating a histogram of quinarized magnitudes of gradient vectors after normalization.

Then, the gradient vectors K are normalized by redistributing the histogram such that the frequency distribution, which has been divided into five, is distributed across the entire range of values from 0 through 255, as illustrated in FIG. 12D.

The reference data H0 stored in the database 115 defines discriminating conditions for the combination of the characteristic amounts C0 for each of the pixels comprising each of a plurality of types of pixel groups, each comprising combination of a plurality of pixels selected from sample images, to be described later.

The combinations of characteristic amounts C0 for each of the pixels comprising each group of pixels and discriminating conditions are predetermined through learning from a group of sample images comprising a plurality of sample images, which are known to be of faces, and a plurality of sample images, which are known to not be of faces.

Figure 13:
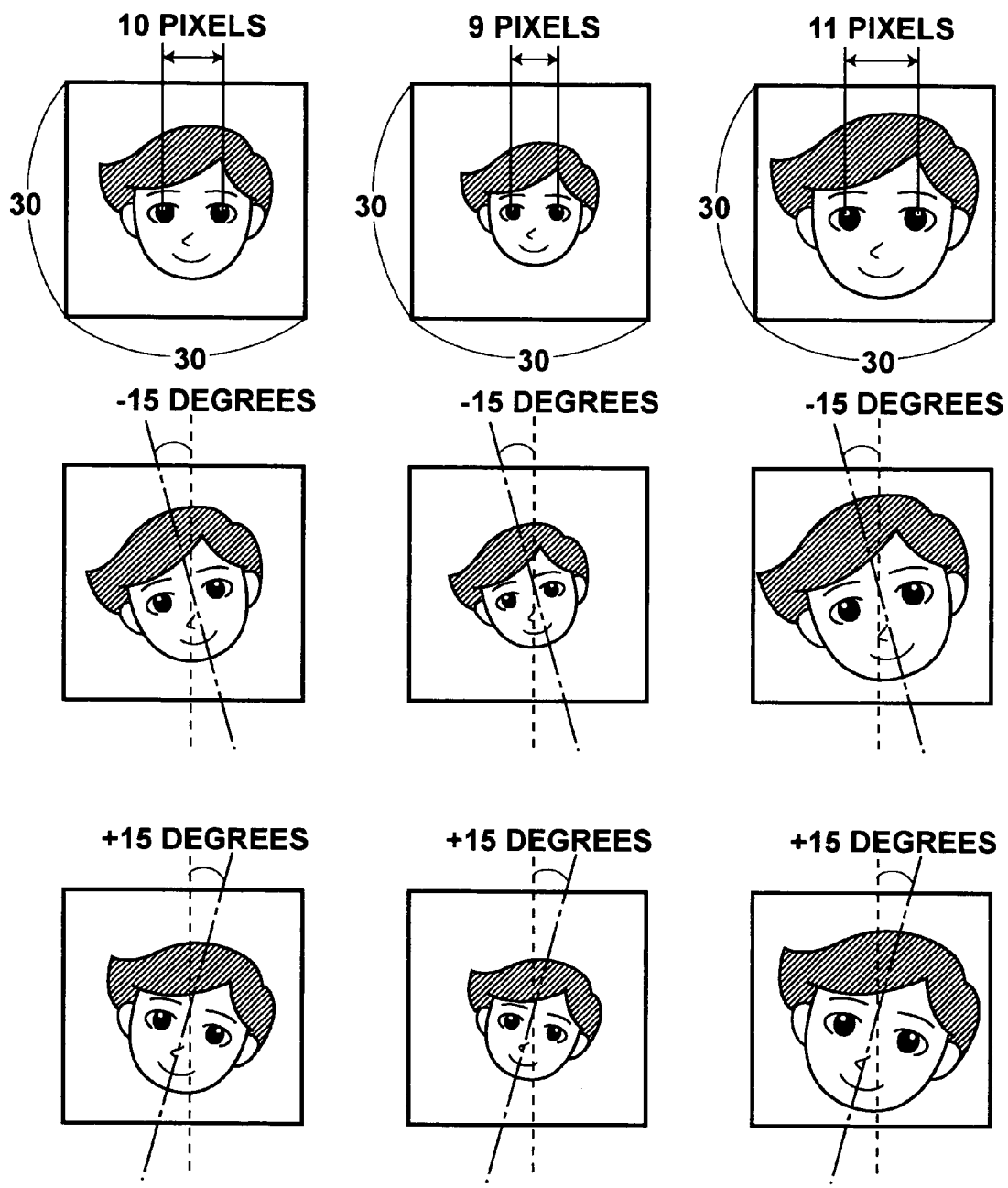
FIG. 13 is a drawing illustrating examples of sample images which are known to be of faces used for learning reference data.

Note that in the present embodiment, the sample images, which are known to be of faces, have the following specifications. That is, the sample images are of a 30×30 pixel size, the distances between the centers of the eyes of each face within the images are one of 9, 10, or 11 pixels, and the faces are rotated stepwise in three level increments within the range of ±15 levels from the vertical (i.e., the rotational angles of −15°, −12°, −9°, −6°, −3°, 0°, +3°, +6°, +9°, +12°, +15°) as shown in FIG. 13. Accordingly, 33 sample images (3×11) are prepared for each face. Note that only sample images which are rotated −15°, 0°, and 15° are illustrated in FIG. 13. Here, in the sample images with the distance of 10 pixels between the centers of the eyes, the center locations of the eyes are the same, which are defined as (x1, y1) and (x2, y2) in the coordinates with the coordinate origin at the upper left corner of the sample images. The positions of the eyes in the vertical direction (i.e., y1, y2), in the state that the face is vertically oriented are the same for all of the sample images.

Arbitrary images of a size of 30×30 pixels are employed as the sample images which are known to not be of faces.

Consider a case in which sample images, in which the distance between the eyes are 10 pixels and the rotational angle is 0 levels (that is, the faces are in the vertical orientation) are employed exclusively to perform learning. In this case, only those faces, in which the distance between the eyes are 10 pixels and which are not rotated at all, would be discriminated by referring to the reference data H0. The sizes of the faces, which are possibly included in the images D are not uniform in size. Therefore, during discrimination regarding whether a face is included in the image D, the image D is enlarged or reduced to enable discrimination of a face of a size that matches that of the sample images. However, in order to maintain the distance between the centers of the eyes accurately at ten pixels, it is necessary to enlarge or reduce the image D in a stepwise manner with magnification rates in 1.1 units, thereby causing the amount of calculations to be great.

Figure 14A:
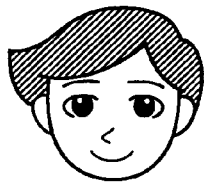
FIG. 14A is a drawing for describing the rotation of a human face.
Figure 14B:
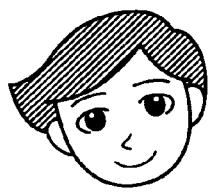
FIG. 14B is a drawing for describing the rotation of a human face.
Figure 14C:
FIG. 14C is a drawing for describing the rotation of a human face.

In addition, faces, which are possibly included in the images D, are not only those which have rotational angles of 0°, as that illustrated in FIG. 14A. There are cases in which the faces in the images D are rotated, as illustrated in FIGS. 14B and 14C. However, in the case that sample images, in which the distance between the eyes is 10 pixels and the rotational angle is 0°, are employed exclusively to perform learning, rotated faces such as those illustrated in FIGS. 14B and 14C would not be discriminated as faces.

For these reasons, the present embodiment imparts an allowable range to the reference data H0. This is accomplished by employing sample images, which are known to be of faces, in which the distances between the centers of the eyes are 9, 10, and 11 pixels, and which are rotated in a stepwise manner in three level increments within the range of ±15 levels. Thereby, at the scene discriminating means 120, to be described later, the image D may be enlarged or reduced in a stepwise manner with magnification rates in 11/9 units, which enables reduction of the time required for calculations, compared with a case in which the intended image S0 is enlarged or reduced with magnification rates in 1.1 units. In addition, rotated faces, such as those illustrated in FIGS. 14B and 14C, are also enabled to be discriminated.

Figure 15:
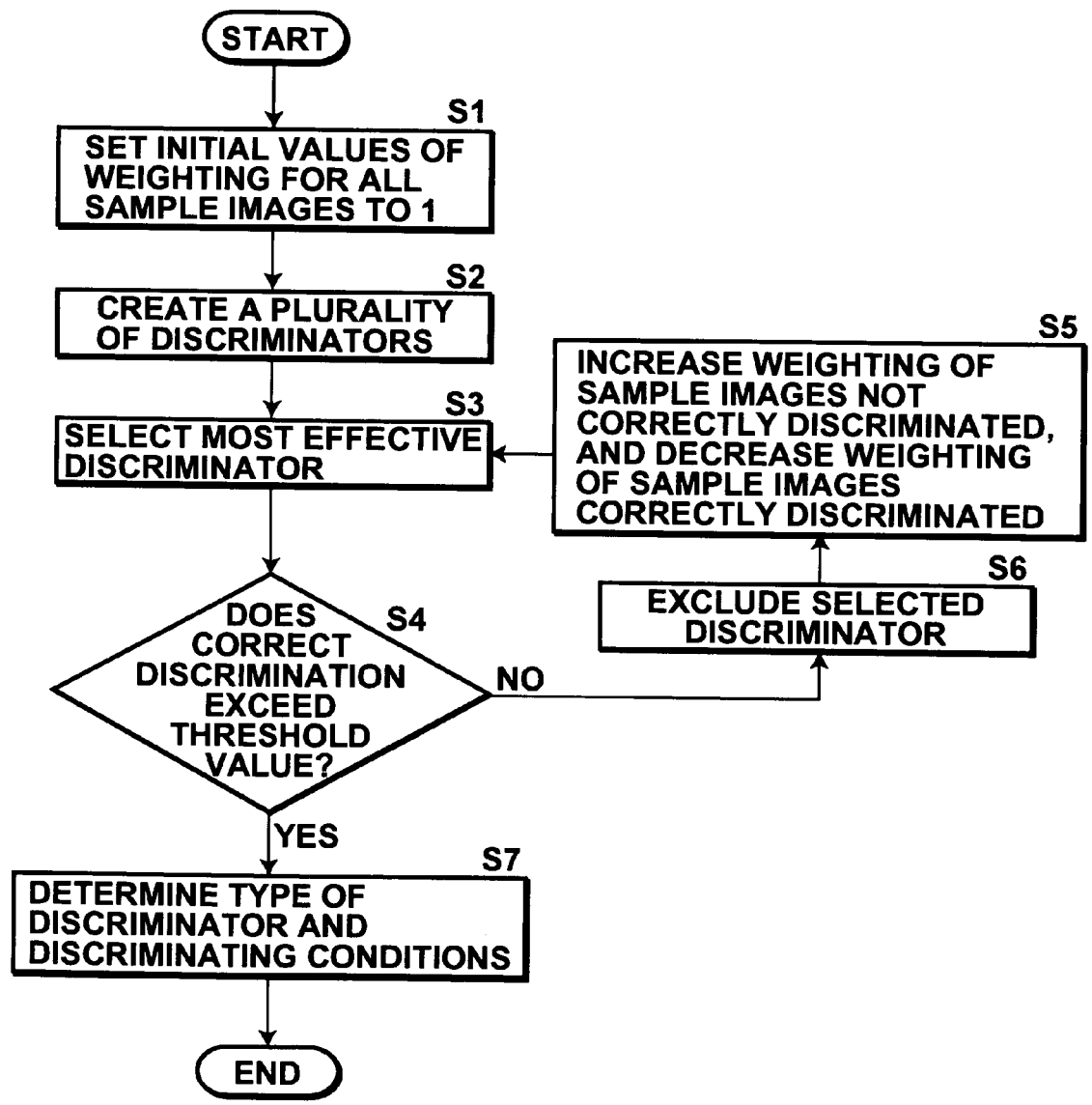
FIG. 15 is a flow chart illustrating a learning process of reference data.

Hereinafter, an example of a learning technique employing the sample images will be described with reference to the flow chart of FIG. 15.

The sample images, which are the subject of learning, comprise a plurality of sample images which are known to be of faces, and a plurality of sample images which are known to not be of faces. Note that the in sample images, which are known to be of faces, the distances between the centers of the eyes of each face within the images are one of 9, 10, or 11 pixels, and the faces are rotated stepwise in three level increments within the range of ±15° from the vertical. Each sample image is weighted, that is, is assigned a level of importance. First, the initial values of weighting for all the sample images are set equally to 1 (step S1).

Next, discriminators are generated for each of the different types of pixel groups of the sample images (step S2). Here, each discriminator has a function of providing a reference to discriminate images of faces from those not of faces, by employing combinations of the characteristic amounts C0 for each pixel that constitutes a single pixel group. In the present embodiment, histograms of combinations of the characteristic amounts C0 for each pixel that constitutes a single pixel group are utilized as the discriminators.

Figure 16:
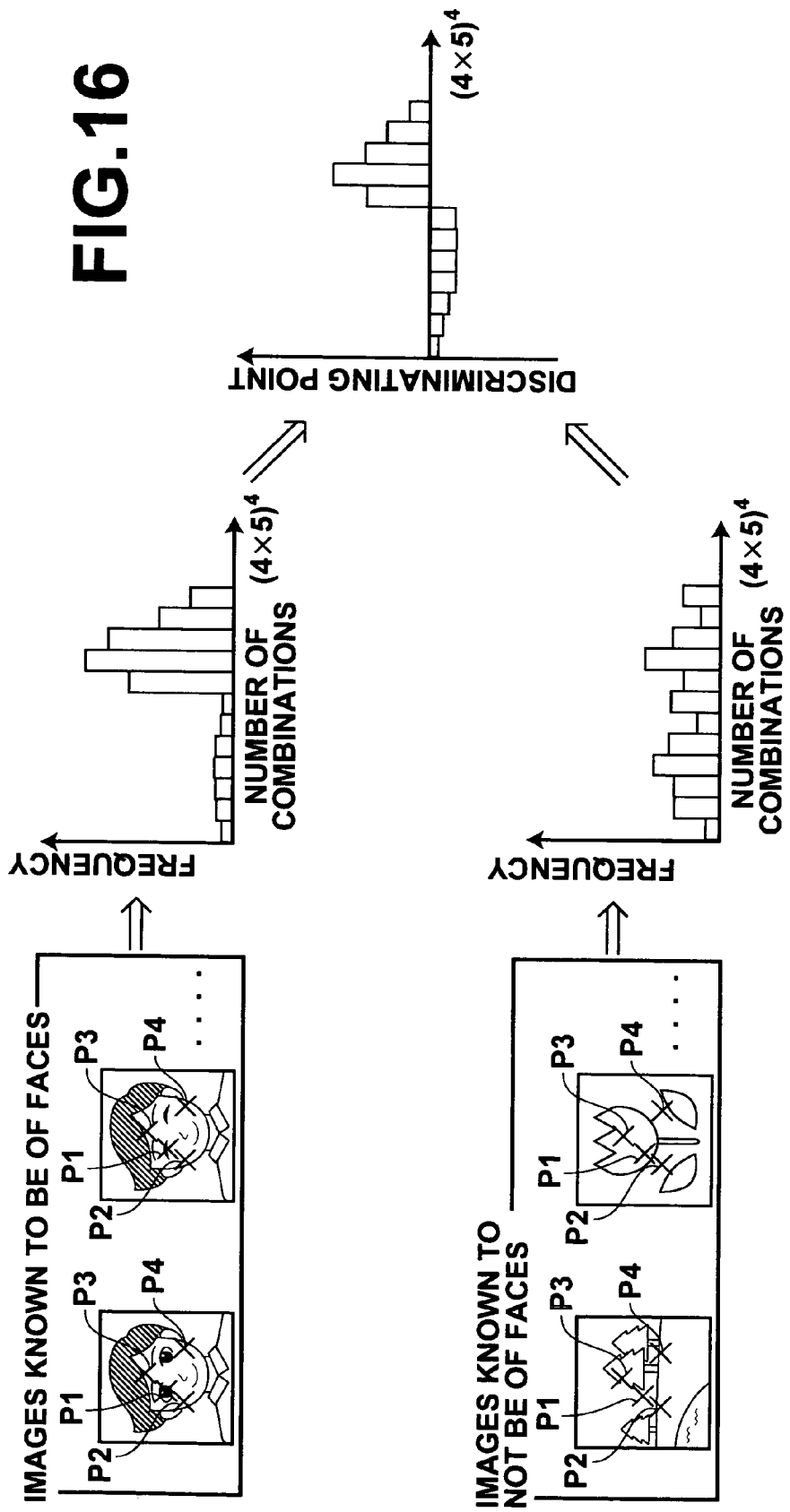
FIG. 16 is a drawing for describing the extraction method of a discriminator.

The generation of a discriminator will be described with reference to FIG. 16. As illustrated in the sample images at the left side of FIG. 16, the pixels that constitute the pixel group for generating the discriminator are: a pixel P1 at the center of the right eye; a pixel P2 within the right cheek; a pixel P3 within the forehead; and a pixel P4 within the left cheek, of the sample images which are known to be of faces. Combinations of the characteristic amounts C0 for the pixels P1 through P4 are obtained for all of the sample images, which are known to be of faces, and histograms thereof are generated. Here, the characteristic amounts C0 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360\times256)^4$, which would require a huge amount of time for the learning. For this reason, in the present embodiment, directions of the gradient vector are quaternarized, that is, set so that values of 0 through 89 are converted to the right direction, values of 90 through 179 are converted to the downward direction, values of 180 to 269 are converted to the left direction, and values of 270 to 359 are converted to the upward direction, and the magnitudes of the gradient vector are quinarized to reduce the amount of data related to the characteristic amounts C0 to $(4\times5)^4$.

In a similar manner, histograms are generated for the plurality of sample images, which are known to not be of faces. Note that in the sample images, which are known to not be of faces, pixels (denoted by the same reference numerals P1 through P4) at positions corresponding to the pixels P1 through P4 of the sample images, which are known to be of faces, are employed. Logarithms of the ratios of the frequencies in the two histograms are represented by the rightmost histogram illustrated in FIG. 16, which is employed as the discriminator. Hereinafter, the each of the values indicated by the vertical axis is referred to as the discriminating point. According to the discriminator, images that have distributions of the characteristic amounts corresponding to positive discriminating points therein are highly likely to be of faces. The likelihood that an image is of a face increases with an increase in the absolute values of the discriminating points. On the other hand, images that have distributions of the characteristic amounts corresponding to negative discriminating points of the discriminator are highly likely to not be of faces. Again, the likelihood that an image is not of a face increases with an increase in the absolute values of the negative discriminating points. In step S2, a plurality of discriminators in histogram format regarding combinations of the characteristic amounts of each pixel of the plurality of types of pixel groups, which are utilized during discrimination are generated.

Thereafter, a discriminator, which is most effective in discriminating whether an image is of a face, is selected from the plurality of discriminators generated in step S2. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step S3). At the first step S1, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step S5, to be described later. Thereafter, the process returns to step S3. Therefore, at the second step S3, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S3's, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step S4). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is completed. In the case that the percentage of correct discriminations is less than or equal to the predetermined threshold value, the process proceeds to step S6, to select an additional discriminator, to be employed in combination with the discriminators which have been selected thus far.

The discriminator, which has been selected at the immediately preceding step S3, is excluded from selection in step S6, so that it is not selected again.

Next, the weighting of sample images, which were not correctly discriminated by the discriminator selected at the immediately preceding step S3, is increased, and the weighting of sample images, which were correctly discriminated, is decreased (step S5). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step S3, and another effective discriminator is selected, using the weighted percentages of correct discriminations as a reference.

The above steps S3 through S6 are repeated to select discriminators corresponding to combinations of the characteristic amounts C0 for each pixel that constitutes specific pixel groups, which are suited for discriminating whether faces are included in images. If the percentages of correct discriminations, which are evaluated at step S4, exceed the threshold value, the type of discriminator and discriminating conditions, which are to be employed in discrimination regarding whether images include faces, are discriminated (step S7), and the learning of the reference data H0 is completed.

Note that in the case that the learning technique described above is applied, the discriminators are not limited to those in the histogram format. The discriminators may be of any format, as long as they provide references to discriminate between images of faces and other images by employing combinations of the characteristic amounts C0 for each pixel that constitutes specific pixel groups. Examples of alternative discriminators are: binary data, threshold values, functions, and the like. As a further alternative, a histogram that represents the distribution of difference values between the two histograms illustrated in the center of FIG. 16 may be employed, in the case that the discriminators are of the histogram format.

The learning technique is not limited to that which has been described above. Other machine learning techniques, such as a neural network technique, may be employed.

The scene discriminating means 120 obtains each discriminating point of the combination of characteristic amounts C0 for each pixel constituting each group of pixels by referring to the discriminating conditions which have been learned by the reference data H0 for all of the combinations of the characteristic amounts for each pixel constituting the plurality of types of pixel groups. Then it integrates all the discriminating points to determine whether the image D contains a face. In this case, the directions of the gradient vectors K and the magnitudes thereof, which constitute characteristic amounts C0, are quaternarize and quinarized respectively. In the present embodiment, discrimination is performed based on whether the sum of all of the discriminating points is positive or negative. For example, in the case that the total sum of the discriminating points is positive, it is judged that a face is contained in the image D. In the case that the total sum of the discriminating points is negative, it is judged that a face is not contained in the image D.

Figure 17:
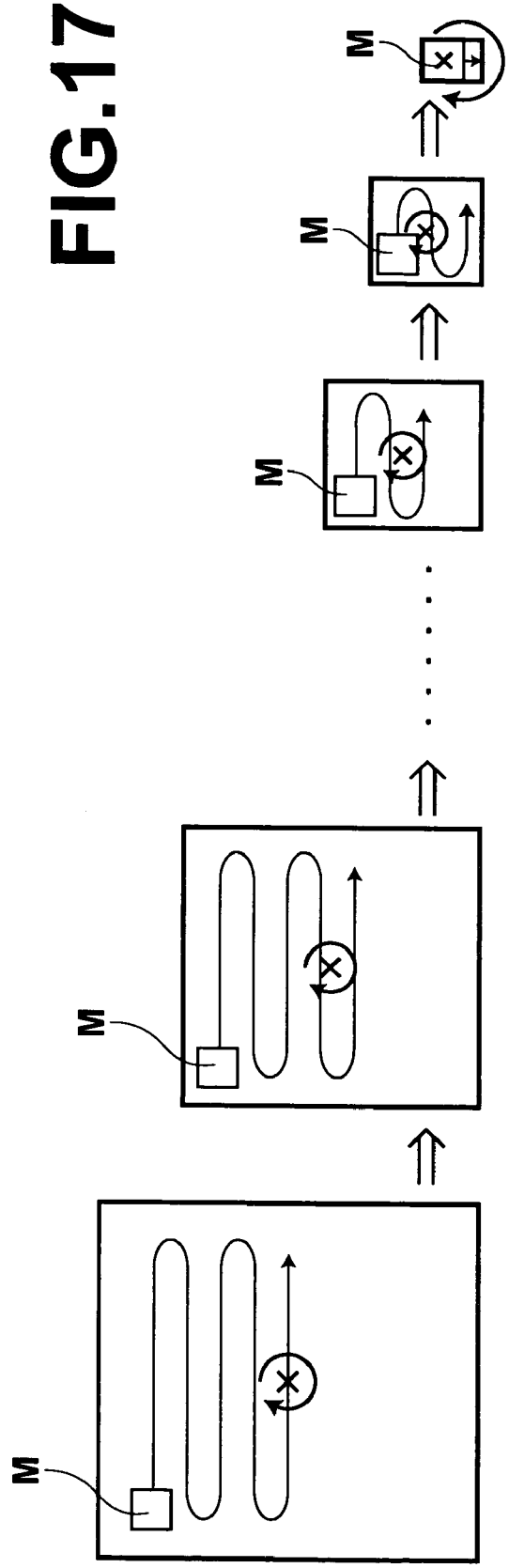
FIG. 17 is a drawing for describing the gradual transformation of a subject image for discrimination.

Here, the sizes of the image D are varied, unlike the sample images, which are 30×30 pixels. In addition, in the case that a face is included in the image D, the face is not necessarily in the vertical orientation. For these reasons, the scene discriminating means 120 enlarges/reduces the image D in a stepwise manner (FIG. 17 illustrates a reduction process), so that the size thereof becomes 30 pixels either in the vertical or horizontal direction. In addition, the image D is rotated in a stepwise manner over 360 levels. A mask M, which is 30×30 pixels large, is set on the image D, at every stepwise increment of the enlargement or reduction. The mask M is moved one pixel at a time on the image D, and whether a face is included in the image D is discriminated by discriminating whether the image within the mask is that of a face.

Note that during learning of the reference data H0, sample images are utilized, in which the distances between the centers of the eyes are one of 9, 10, and 11 pixels. Therefore, the magnification rate during enlargement or reduction of the image D may be set to be 11/9. In addition, during learning of the reference data H0, sample images are utilized, in which faces are rotated within a range of ±15°. Therefore, the image D may be rotated over 360° in 30 level increments.

Here, the characteristic amount calculating means 110 calculates the characteristic amounts C0 from the image D at each step of their stepwise enlargement or reduction and rotational deformation.

Discrimination regarding whether a face is included in the image D is performed at every step in the stepwise enlargement or reduction and rotational deformation thereof. In the case that a face is discriminated once, the image D is discriminated to include a face.

In the manner described above, the scene analyzing means 100 performs discrimination whether a face is included in the image D and outputs the scene information H1 of the image D to the parameter setting means 30.

The image processing system according to the present embodiment is a system for implementing image correction according to the unsharpness masking method (USM). The parameter setting means 30 sets a one-dimensional correction mask M1 that will act on the bur direction based on the blur width L and blur direction such that the greater the blur width L, the greater the size of the correction mask, and a two-dimensional correction mask M2 for isotropic correction based on the blur width L such that the greater the blur width L, the greater the size of the correction mask. Here, the two-dimensional masks corresponding to respective blur widths and one-dimensional mask corresponding to respective blur widths and directions are stored in the storage means 50 as a database (mask database). The parameter setting means 30 obtains a one-dimensional correction mask M1 based on the blur width L and direction, and two-dimensional correction mask M2 based on the blur width L from the mask database. The storage means 50 further contains coefficients which correspond to the types of image scenes. The parameter setting means 30 obtains an appropriate coefficient α from the storage means 50 based on the scene information H1 supplied from the scene analyzing means 100. The coefficient α is greater for the image D with the image scene of other than a portrait than for the image D with the image scene of a portrait.

Next, the parameter setting means 30 sets a one-dimensional correction parameter W1 for directional correction and two-dimensional correction parameter W2 for isotropic correction based on the following formula.

$$W1 = \alpha \times N \times K \times M1$$

$$W2 = \alpha \times N \times (1-K) \times M2 \qquad (2)$$

where,
W1: one-dimensional correction parameter
W2: two-dimensional correction parameter
N: blur level
K: camera shake level
M1: one-dimensional correction mask
M2: two-dimensional correction mask
α: coefficient according to type of image scene That is, the parameter setting means 30 sets the correction parameters W1 and W2 (collectively referred to as parameter E0) in such manner as to greater isotropic and directional correction levels are allocated to the image scene of other than a portrait than that of a portrait. In addition, the parameter setting means 30 sets the parameter E0 such that the greater the blur level N, the greater the isotropic and directional correction levels, and the greater the camera shake level K, the heavier the weighting of the directional correction.

Here, the parameter setting means 30 performs adjustments to the blur level N, camera shake level K, correction masks M1 and M2 for the parameter E0. Then, it obtains a plurality of correction parameters E1, E2, and so on, which are different from the correction parameter E0, in accordance with the formula (2) using the adjusted blur levels N, camera shake levels K, correction masks M1 and M2.

Thereafter, the parameter setting means 30 outputs correction parameters E (E0, E1, E2 and so on) so obtained to the correcting means 40.

The correcting means 40 performs image correction on the image D by applying each of the parameters E0, E1, E2 and so on to obtain the corrected images D'0, D'1, D'2 and so on, each corresponding to each of the correction parameters E0, E1, E2 and so on.

The determining means 45 comprises a display means (not shown) for displaying each of the corrected images obtained by the correcting means 40 and an input means (not shown) for having the user to select a corrected image desired by the user among the corrected images displayed. It determines the image selected by the user from the corrected images D'0, D'1, D'2 and so on as the intended image D', and outputs it to the output means 60.

The output means 60 outputs the image D when the information P indicating that the image D is a normal image is received from the analyzing means 20, or outputs the intended image D' when it is received from the determining means 45. In the present embodiment, "outputting" by the output means 60 means printing. The output means 60 obtains a printed image by printing out a normal image D and desired image D' obtained through correcting a blurred image D. However, The output means 60 may be a means for recording the normal image D and desired image D' on a recording medium, or transmitting them to an image storage server on the network or to the address on the network designated by the user who has made a request for the image correction.

Figure 18:
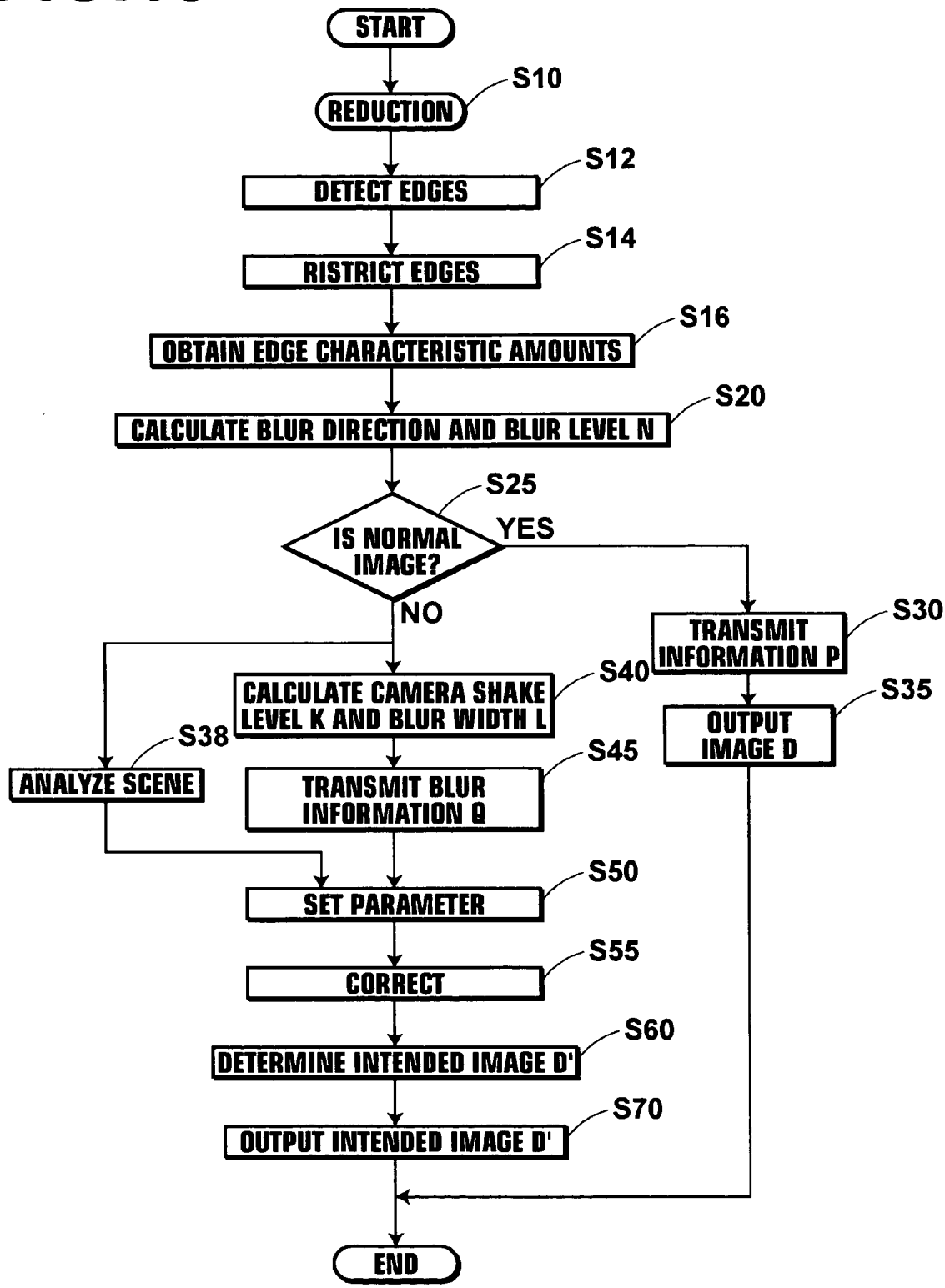
FIG. 18 is a flow chart illustrating the operation of the image processing system according to the embodiment shown in FIG. 1.

FIG. 18 is a flow chart illustrating the operation of the image processing system according to the present embodiment. As shown in the drawing, the image D read out from the recording medium 1 is reduced to a reduced image D0 by the reducing means 10 (S10). The edge detecting means 12 detects edges having intensity greater or equal to a predetermined value in each direction of 8 different directions shown in FIG. 2 for the reduced image D0 to obtain the coordinates of each of the edges detected. Then, based on these coordinates, the edge detecting means 12 creates an edge profile as shown in FIG. 3 for each of the edges using the image D, and outputs them to the edge restricting means 14 (S12). The edge restricting means 14 eliminates invalid edges based on the edge profiles sent from the edge detecting means 12 and outputs the profiles of the remaining edges to the edge characteristic amount obtaining means 16 (S14). The edge characteristic amount obtaining means 16 obtains the width of each edge based on the profile of each edge transmitted from the edge restricting means 14 and creates the histogram of edge widths in each direction of the different directions shown in FIG. 2. Then, it outputs the width of each edge and the histogram of edge widths of each direction as the edge characteristic amount S for the image D to the analyzing means 20 (S16). The analyzing means 20 calculates the direction and blur level N of the image D using the edge characteristic amounts S (S20), and discriminates whether the image D is a blurred image or a normal image (S25). If the image D is a normal image (S25=YES), the analyzing means 20 outputs information P indicating that the image D is a normal image to the output means 60 (S30), and the output means 60 obtains a printed image by printing out the image D when the information P is received (S35).

On the other hand, if the image D is discriminated to be a blurred image in step 25 (S25=NO), the analyzing means 20 transmits information that indicates that the image D is a blurred image to the scene analyzing means 100 to have the scene analyzing means to analyze the type of the scene (S38). In addition, the analyzing means 20 further calculates the camera shake level K and blur width L of the image D (S40), and outputs them to the parameter setting means 30 together with the blur level N and blur direction that have been obtained in step 20 as the blur information Q (S45). The parameter setting means 30 obtains a one-dimensional correction parameter W1 and two-dimensional parameter W2 based on the blur information Q from the analyzing means 20 and scene information H0 from the scene analyzing means 100. Here, the pair of correction parameters W1 and W2 so obtained is referred to as the correction parameter E0. The parameter setting means 30 further performs adjustments to the blur level N, camera shake level K, mask size of the correction masks M1 and M2, and the like to obtain a plurality of correction parameters E1, E2 and so on, and outputs them to the correcting means 40 (S50).

The correcting means 40 performs image correction on the image D by applying each of the correction parameters E0, E1, E2 and so on to obtain corrected images D'0, D'1, D'2 and so on, each corresponding to each of the correction parameters (S55).

The determining means 45 controls the display means (not shown) to display each of the corrected images obtained by the correcting means 40, and determines one of the corrected images selected by the user through the input means (not shown) as the intended image D' and outputs it to the output means 60 (S60).

The output means 60 obtains a printed image by printing out the intended image D' sent from the determining means 45 (S70).

In this way, according to the image processing system of the present embodiment, image blurs are corrected by obtaining the blur information from a digital photograph image, so that the image blurs may be corrected without requiring any special device for obtaining the blur information at the time of imaging.

Further, image blurs are corrected by setting correction parameters based on the blur information, so that no cut and try process of repeating parameter setting, image correction, image valuation, and parameter resetting is required, so that the image processing system according to the present embodiment provides a high efficiency in performing the image correction.

Figure 19:
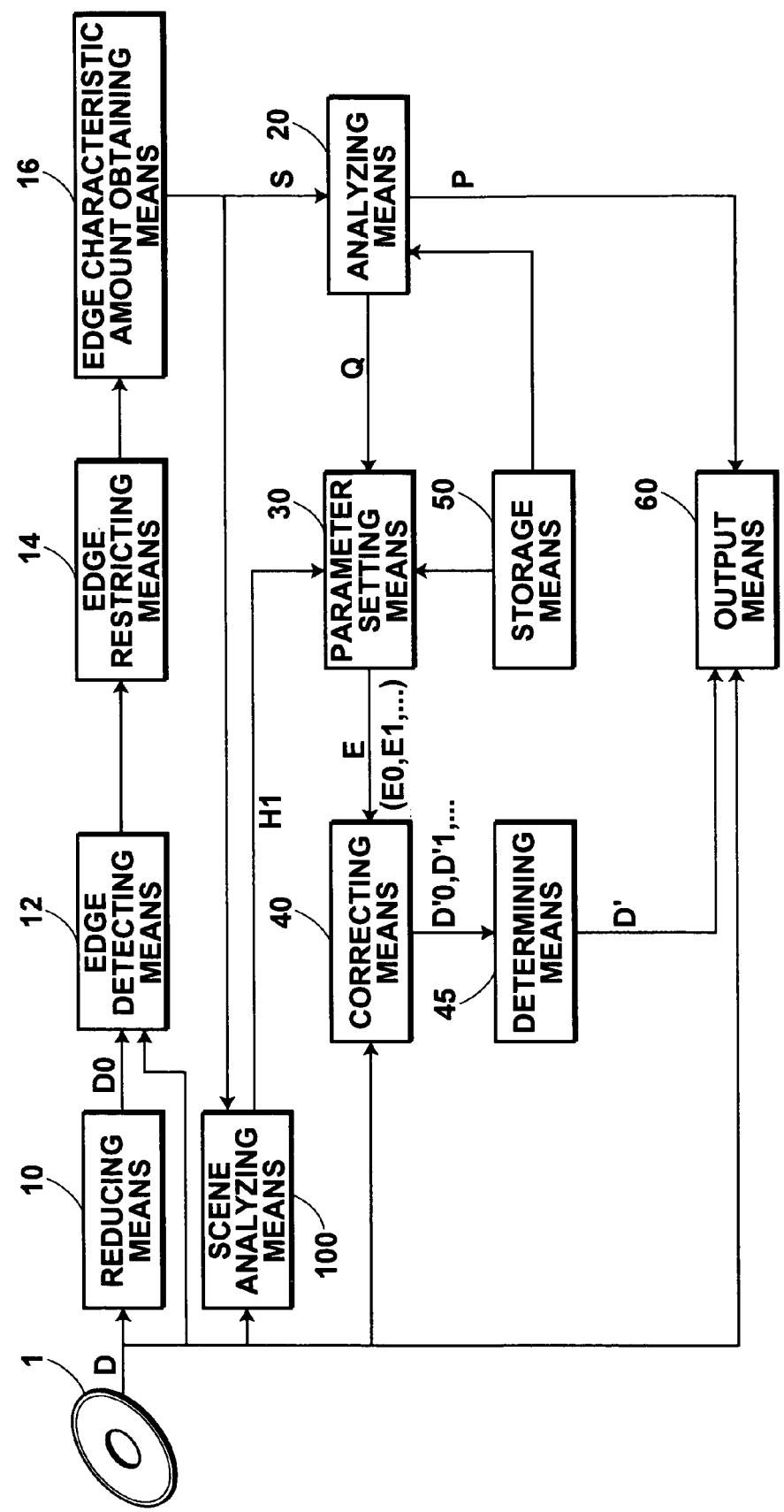
FIG. 19 is a block diagram illustrating the configuration of an image processing system according to a second embodiment of the present invention.

FIG. 19 is a block diagram illustrating the configuration of an image processing system according to a second embodiment of the present invention. The configuration of the image processing system according to the present embodiment is similar to that of the image processing system according to the embodiment shown in FIG. 1, and components identical to those used in the embodiment shown in FIG. 1 are given the same numerals. The image processing system of the present invention differs from that of the embodiment shown in FIG. 1 only in the determining means which is given a reference numeral of 45' instead of 45. Hence, the description will be made only for the determining means 45'.

The determining means 45' of the image processing system according to the embodiment shown in FIG. 19 comprises an evaluating means (not shown) for evaluating the correction effect for each of the corrected images obtained by the correcting means 40. It determines one of the corrected images having the best correction effect among the corrected images D'1, D'2 and so on to be the intended image D', and outputs it to the output means 60.

The evaluating means (now shown) evaluates the correction effect of each of the corrected images in the following manner. First, the evaluating means (now shown) detects edges in each direction of the 8 directions shown in FIG. 2 to obtain the edge width of the edges detected, and obtains histograms of the edge widths for the 8 directions. The histograms of the edge widths for 8 directions so obtained are grouped into 4 pairs, each pair consisting of the histograms for two directions which are orthogonal to each other (1-5, 2-6, 3-7 and 4-8). The evaluating means obtains the correlation value for each pair to find out the pair having the smallest correlation among the 4 pairs. Then, the evaluating means calculates averaged edge width for each of the two directions of the direction pair having the smallest correlation to obtain the greater averaged edge width of the two as the evaluation value.

The determining means 45' determines the corrected image having the smallest evaluation value to be the intended image based on the evaluation value obtained by the evaluating means (not shown) for each of the corrected images.

So far, the preferred embodiments of the present invention have been described. But the image processing method, apparatus, and program therefore is not limited to the embodiments described above, and additions, subtractions, or modifications may be made to these embodiments as long as they are within the spirit of the present invention.

For example, in the image processing system shown in FIG. 19, the determining means 45' evaluates the corrected images using the greater averaged edge width of the two obtained from the two directions of the direction pair having the smallest correlation. However, the evaluation value may be the value, for example, obtained in the following manner. Obtain a score for the edge width of each of the edges in the direction having a greater averaged edge width of the two directions in the least correlated pair by referring to the score database that has been created based on FIG. 6 and stored in storage means 50, and obtain an averaged score by averaging the scores of all of the edges.

Also, the method of discriminating whether a face is included in a photograph image is not limited to that described above, and various known techniques may be used.

Further, the type of image scenes is not limited to if it is a portrait or other than a portrait. A night scene, for example, may also be included therein. When the type of the image scene is a night scene, the correction parameter may be set such that it increases the correction level, since less noise is noticeable for night scenes.

Of course, the type of the image scene is not necessarily considered in setting the correction parameter. The correction parameter may be set based only on the edge characteristic amounts without regarding the type of the image scene.

Further, in the image processing system shown in FIG. 1, a plurality of correction parameters are set by the parameter setting means 30, then a plurality of corrected images are obtained by the correcting means 40 based on the plurality of correction parameters, and the corrected image selected by the user from among the plurality of corrected images are determined to be the intended image by the determining means 45. However, the image processing system may further comprise the correction control means and confirming means, and the intended image may be determined in the following manner. A single parameter is set by the parameter setting means, then a single corrected image is obtained by the correcting means at a time, and the corrected image is confirmed by the user through the confirming means. Thereafter, the correction control means controls the parameter setting means, correcting means and confirming means to repeat the process of resetting the parameter, obtaining the corrected image by correcting the image using the parameter which has been reset by the parameter setting means, and having the user to confirm the image until the corrected image has been determined to be the intended image by the user.

Further, the intended image may be obtained in the following alternative manner. Obtaining a single corrected image by setting a single parameter, and the corrected image is confirmed by the user. If the user is satisfied with the image, then the referent of "implement correction" is designated by the user. If the user is not satisfied with the corrected image, then the referent of "not implement correction" is designated by the user. When the referent of "not implement correction" is designated by the user, the original image before correction that corresponds to the corrected image is outputted as the intended image.

Still further, in the image processing system according to the embodiments described above, the blur direction is deemed to be one of the two directions having a greater averaged edge width than the other in the least correlated pair. Alternatively, however, the blur direction may be obtained, for example, in the following manner. Calculate each of the camera shake levels for the least correlated pair (direction pair having the smallest correlation value) and the pair having the second smallest correlation value. Obtain two blur direction candidates, each having a greater averaged edge width than the other in each of the two direction pairs. Then, based on the two blur direction candidates, obtain the blur direction by weighting the two candidates such that the greater the levels of camera shake of the candidate, the heavier the weighting of that candidate. In this case, the blur width may also be obtained by weighting the two averaged edge widths of the two blur direction candidates such that the greater the camera shake level of the candidate, the heavier the weighting of the averaged edge width of that candidate.

Further, in the image processing system according to the embodiments described above, one of the two directions having a greater averaged edge width than the other in the least correlated pair is deemed to be the blur direction regardless of whether or not a blur is included in the image, then calculates the blur level based on the blur direction and discriminates whether the image is a normal image or a blurred image based on the blur level, and further obtains the camera shake level for the image discriminated to be a blurred image for setting the correction parameter. Alternatively, the system may be, for example, a system in which the blur level of an image having a "nondirectional" blur is obtained, wherein the blur is deemed to be "nondirectional" (i.e., a normal image or defocused image) if the correlation value for the least correlated pair is greater than or equal to a predetermined threshold value T1, and the image having the blur level smaller than a predetermined threshold value T2 is deemed to be a normal image to which no correction is implemented, and the image having the blur level greater than or equal to the predetermined threshold value T2 is deemed to be an image having a defocus blur to which image correction is implemented using only the isotropic correction parameter, while the image with a correlation value for the least correlated pair which is smaller than the predetermined threshold value T1 is deemed to be an image with a camera shake blur and one of the directions of the least correlated pair is discriminated to be the blur direction. In setting the correction parameter for the image with camera shake blur, the system may be adapted to set only the directional correction parameter that will act on the blur direction, or to further obtain the camera shake level and set the correction parameter through the weighting addition of the isotropic correction parameter and directional correction parameter based on the camera shake level.

Figure 20:
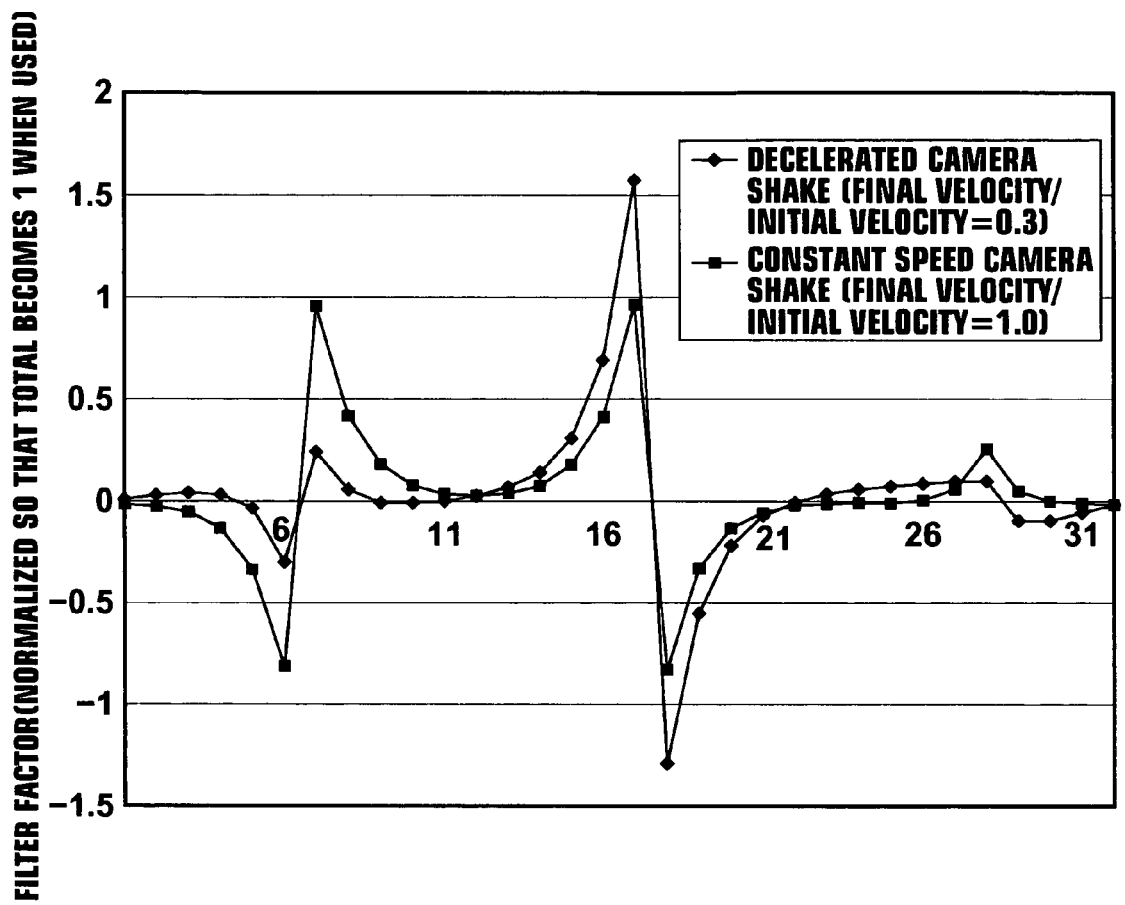
FIG. 20 is a drawing illustrating an example of correction parameter according to the type of camera shake blur.

For the image with a camera shake blur, the direction obtained by the analyzing means 20 of the embodiment described above is a vertical direction indicated by the direction 1, horizontal direction indicated by the direction 5 shown in FIG. 2, and the like. It does not include the orientation of the camera shake, such as "from bottom to top", "from left to right", and the like. Application of the directional correction parameter that will act on the direction obtained by the analyzing means 20 may narrow the extended edges in that direction and correct the camera shake, thereby a high quality image may be obtained. If the orientation of the camera shake, such as "from bottom to top" or "from left to right" (vector information), is obtained in addition to the blur direction, such as "vertical direction" or "horizontal direction", and blur width, and the correction parameter is set based on these elements to implement the image correction, more accurate correction effect may be obtained. More specifically, for example, the system may further comprises an input means for inputting the "orientation of the camera shake" by the user for the image judged as the image with a camera shake blur by the analysis result, and the correction parameter may be set based on the camera shake direction and width obtained by the analysis, and the orientation of the camera shake inputted by the user through the input means. Preferably, in this case, the orientation of the camera shake inputted by the user is used only for identifying the orientation of the camera shake for the camera shake direction obtained through the analysis without changing the camera shake direction resulted from the analysis. That is, if the camera shake direction resulted from the analysis is, for example, the direction 2 shown in FIG. 2, and the orientation of the camera shake is "from bottom to top", the direction and orientation of the camera shake are judged as the direction and orientation indicated by the arrow 2, not to change the camera shake direction to the direction 1. For the user, it may be easy to judge whether the orientation of the camera shake is "from bottom to top" or "from top to bottom", but difficult to judge the direction accurately. For example, for the two directions and orientations of camera shake indicated by the arrows 1 and 2 shown in FIG. 2, user may readily judge that both of the orientations are from "bottom to top", but it is difficult for the user to judge whether the camera shake direction is direction 1 or 2. By obtaining the direction of the camera shake through the analysis and the orientation of the camera shake from the user through the input means, not only the direction of the camera shake but also the orientation thereof may be obtained efficiently, thereby the image correction may be implemented more accurately. The camera shake may be categorized into several types including the constant speed camera shake, accelerated camera shake, in which the speed of the camera shake is gradually increased and decelerated camera shake, in which the speed of the camera shake is gradually decreased. By obtaining the type of the camera shaking described above from the user through the input means, the image correction may be implemented more accurately. FIG. 20 illustrates examples of the filters (correction parameter) used for the constant speed camera shake and decelerated camera shake respectively when the camera shake width is 11 pixels. By applying different filters for the images having the same direction and orientation of the camera shake in accordance with the camera shake type, the more satisfactory correction result may be obtained. Instead of obtaining all of the information necessary for image correction including the blur width and blur direction only through the image analysis, some of the information which is obtainable readily from the user may be obtained by providing the input means, and other information may be obtained through the image analysis. For example, in the case of the camera shake, the direction information may be obtained more easily than the amount of shaking (camera shake width), so that the direction information is received from the user through the input means, and the camera shake width (e.g., averaged width of the edges) may be calculated only in the direction specified by the user. By doing so, the burden on the user may be reduced and the camera shake width may be obtained accurately in an efficient manner.

Further, in the image processing system according to the embodiments described above, the digital photograph image is first discriminated whether it is a normal image or a blurred image, and the parameter setting and image correction are implemented by calculating the camera shake level and camera shake width only for the images discriminated to be blurred images in order to improve the efficiency of the processing. Alternatively, the system may be adapted to calculate the blur level, blur width, and camera shake level as the blur information for all of the images to be processed, and image correction is implemented by setting the parameter based on the blur information without discriminating whether the image is a normal image or a blurred image. In this case, the correction parameter set for a normal image is a parameter for small correction or not to implement the correction, since the normal image has a small blur level, and the weighting of the directional correction parameter is small or zero in obtaining the correction parameter for a defocused image through the weighting addition of the isotropic correction parameter and directional correction parameter in accordance with the camera shake level, since camera shake level of the defocused image is small.

Further, in the embodiment described above, the analyzing means 20 obtains the camera shake level based on the three elements described above (FIGS. 7A, 7B and 7C), but the number of elements for obtaining the camera shake level may be varied. For example, only the two elements among the three elements described above may be used, or the number of the elements may be increased to include the difference in correlation value between the least correlated pair and the pair shifted the most from the least correlated pair (for the direction pairs shown in FIG. 2, the pairs shifted 45° with each other) for obtaining the camera shake level.

Further, in the image processing system according to the embodiment described above, the analyzing means 20 obtains the camera shake level for the image D, which has been discriminated to be a blurred image, without discriminating whether the blur is a defocus blur or camera shake blur, and the image correction is implemented by obtaining the correction parameter through the weighting addition of the isotropic correction parameter and directional correction parameter using the weighting factor which corresponds to the camera shake level (the camera shake level itself for the image processing system according to the present embodiment). The system may be adapted to discriminate the blurred image having the camera shake level smaller than a predetermined threshold value to be a defocused image, and to set only the isotropic correction parameter and implement the correction for the defocused image.

Further, the image processing system according to the embodiment described above discriminates all the digital photograph images to be processed whether each of the images is a normal image or a blurred image on the assumption that each of the images to be processed is not known whether it is a normal image or a blurred image. However, in the image processing system intended for use only for blurred images, such as those for implementing image correction only for the images designated as blurred images by the customers or operators, the discrimination whether the image is a normal image or a blurred image is not necessarily required.

Further, the system may be adapted to make judge whether or not the correction is required by obtaining and using the imaging conditions of the digital photograph image from the attached information thereto, including tag information of the digital photograph images to be processed, and to implement processes required for the correction, such as the process for obtaining the blur information only for the digital photograph images that have been discriminated to be the images requiring the image correction. For example, some digital cameras have the focus lock capability, and the digital photograph images obtained with the focus lock capability have practically no possibility of defocus blur. Thus, the system may be adapted to read out the tag information of the digital photograph image to judge whether or not the digital photograph image is obtained with the focus lock capability, and to exclude the image obtained with the focus lock capability from the defocus blur correction process. Also, if the shutter speed used for imaging the digital photograph image is greater than or equal to a predetermined threshold value, no camera shake blur may be present on the image, so that the system may be adapted to exclude the photograph images that have been obtained with the shutter speeds greater than or equal to the predetermined threshold value from the camera shake blur correction process.

Further, in the image processing system according to the embodiment described above, all of the processes from the image reduction to the outputting of the intended image are implemented in a single unit, but the present invention is not limited to this. For example, the image processing system may be divided into an analyzing unit and a processing unit. The analyzing unit may be adapted to implement the processes from the beginning to the correction parameter setting, and to record the correction parameter on a recording medium as the tag information attached to the image. The processing unit may be adapted to read out the image from the recording medium, and to implement the image correction using the correction parameter, which is the tag information attached to the image.

Still further, in such an embodiment, the analyzing unit may be adapted to implement the processes from the beginning to the obtaining of the blur information, and to record the blur information on a recording medium as the tag information attached to the image. The processing unit may be adapted to read out the blur information from the recording medium, and to set the correction parameter or implement correction based on the blur information, which is the tag information attached to the image.

Further, the analyzing unit may be a dedicated unit for analyzing the digital photograph images inputted thereto, or it may be, for example, provided on a digital camera itself. That is, the digital camera having such an analyzing unit may obtain a digital photograph image through imaging the subject and output the image after the blur information has been obtained from the image. Preferably, when outputting the image, the blur information is attached to the image by writing it in the tag information of the corresponding image.

Further, the image processing system according to the embodiment described above may further comprise a correction instructing means, wherein the processes are implemented until the process for obtaining the blur information or for setting the correction parameter, but the correction is not implemented until the instruction to implement the correction is given by the correction instructing means, and the correction is implemented after the instruction to implement the correction has been given. For example, the correction parameter is calculated when the index of an electronic photo album is displayed (images in the index are not yet corrected) and written into the tag of a corresponding image. Thereafter, the correction process may be performed using the correction parameter that has been obtained before only when an instruction is given to display a relevant image or to correct all of the images at the same time.

Still further, the image processing system according to the embodiment described above is intended for digital photograph images obtained by mobile cameras. The image processing method, apparatus and program therefore is not limited to the images obtained by the mobile cameras, but it may be applied to any digital photograph images, such as those obtained by digital cameras, or those obtained by reading the photograph images printed on printing media using reading devices including scanners.

Figure 21:
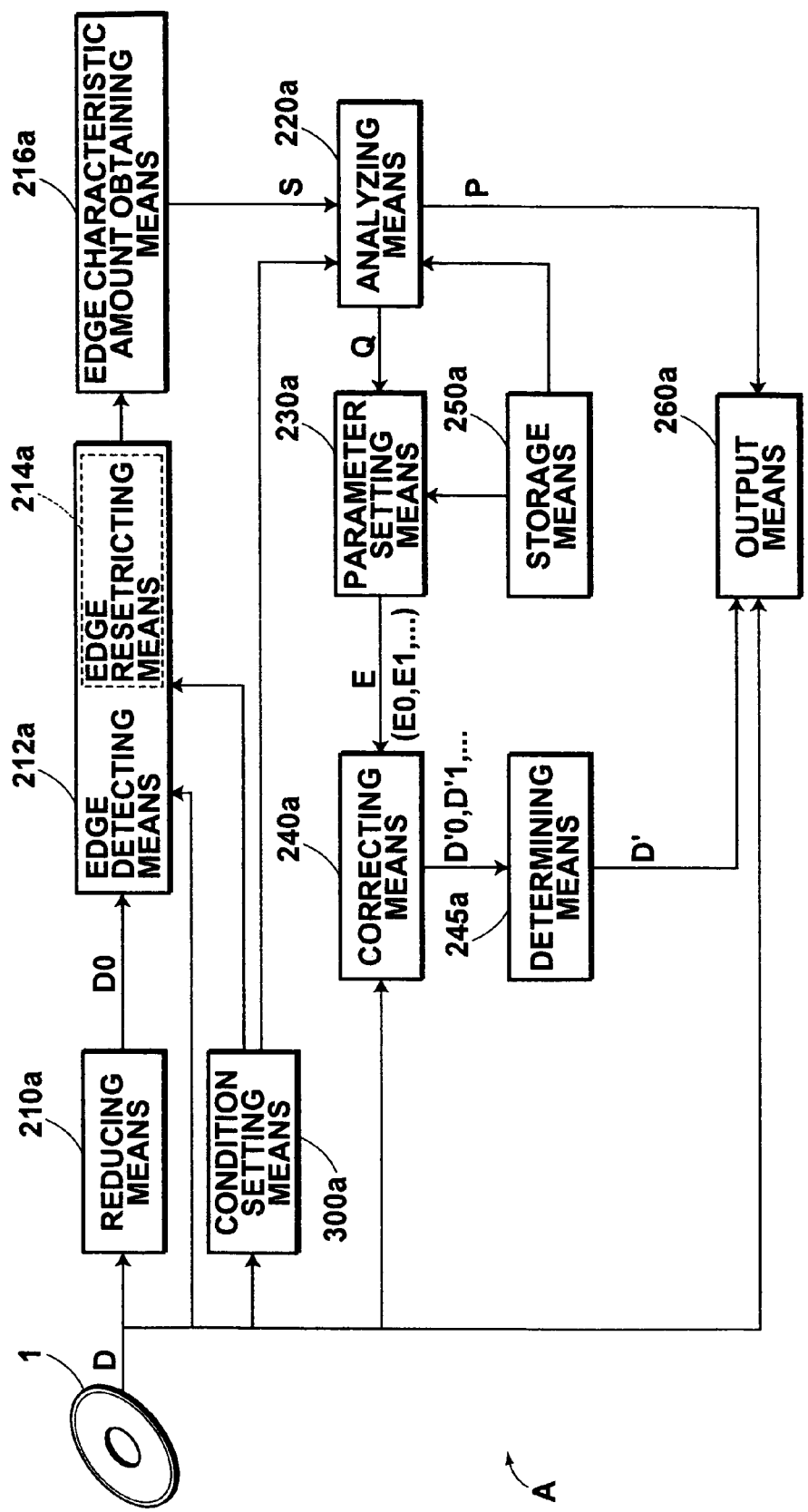
FIG. 21 is a block diagram illustrating the configuration of an image processing system A according to a third embodiment of the present invention.

FIG. 21 is a block diagram illustrating the configuration of an image processing system A according to a third embodiment of the present invention. The image processing system A shown in FIG. 21 is adapted to implement image processing by reading out the photograph images (images) from a recording medium 1 storing images obtained by digital cameras. The recording medium 1 contains groups of images, each comprising a number of images. Here, the description will be made taking up a single image D as an example.

As shown in FIG. 21, the image processing system A of the present embodiment comprises: a condition setting means 300a for setting edge detecting conditions and discriminating conditions, and transmitting them respectively to an edge detecting means 212a and analyzing means, to be described later; a reducing means 210a for reducing the image D read out from the recording medium 1 to obtain a reduced image D0 of the image D; an edge detecting means 212a for detecting edges in each direction of a plurality of different directions included in the edge detecting conditions set by the condition setting means 300a using the reduced image D0 and image D; an edge characteristic amount obtaining means 216a for obtaining characteristic amounts S for the edges obtained by the edge detecting means 212a; an analyzing means 220a for discriminating whether the image D is a blurred image or a normal image by calculating the bur direction and blur level N using the edge characteristic amounts S, and transmitting information P indicating that the image D is a normal image to an output means 260a, to be described later, if the image D is discriminated to be a normal image and thereafter terminating the step, or further calculating a camera shake level K and a blur width L if the image D is discriminated to be a blurred image, and transmitting them with the blur level N and blur direction as blur information Q to a parameter setting means 230a, to be described later; a parameter setting means 230a for setting a plurality of parameters E (E0, E1, E2 and so on) for correcting the blurred image D based on the blur information Q from the analyzing means 220a; a correcting means 240a for correcting the image D using the parameters E0, E1, E2 and so on to obtain corrected images D'0, D'1, D'2 and so on, each corresponding to each correction parameter; a determining means 245a for determining the intended image D' from among the corrected images D'0, D'1, D'2 and so on, and outputting the intended image D' to the output means 260a; a storage means 250a containing various databases for the analyzing means 220a and parameter setting means 230a; and an output means 260a for outputting image D when the information P indicating that the image D is a normal image is received from the analyzing means 220a, or outputting the intended image D' when the intended image D' is received from the determining means 245a. The edge detecting means 212a comprises an edge restricting means 214a for eliminating invalid edges.

Figure 29:
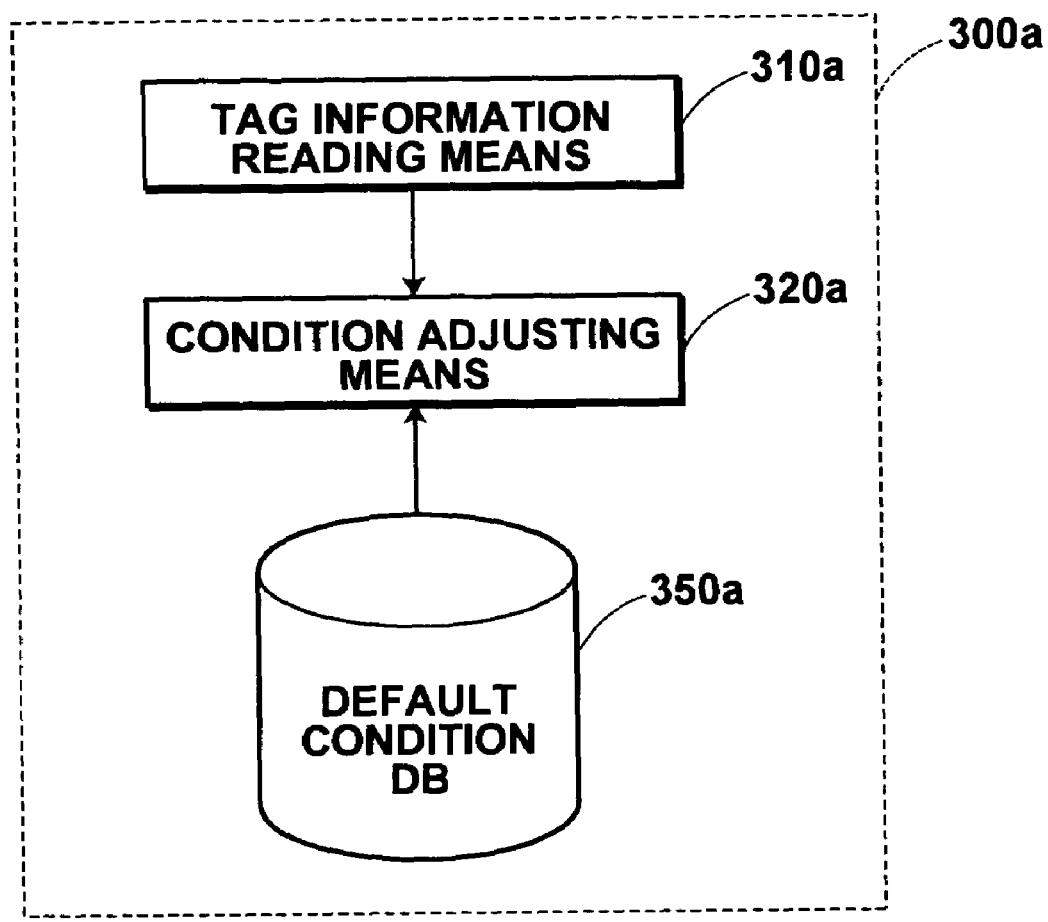
FIG. 29 is a block diagram illustrating the configuration of a condition setting means 300a of the image processing system A.

FIG. 29 is a block diagram illustrating the configuration of the condition setting means 300a of the image processing system A according to the embodiment shown in FIG. 21. As shown in the drawing, the condition setting means 300a comprises: a default condition DB 350a having default conditions of the edge detecting conditions for the edge detecting means 212a and default conditions of the discriminating conditions for the analyzing means 220a stored therein; a tag information reading means 310a for reading out the tag information attached to the image D; and condition adjusting means 320a for setting the edge detecting conditions and discriminating conditions by adjusting the default conditions stored in the DB 350a based on the imaging conditions included in the tag information obtained by the tag information reading means 310a, and transmitting them to the edge detecting means 212a and analyzing means 220a respectively. If no tag information is attached to the image D, or if no imaging condition information is included in the tag information of the image D required for setting the edge detecting conditions or discriminating conditions, the condition setting means 320a will transmit the default conditions.

The details of the condition setting means 300a will be described later. Here, the configuration of the image processing system A without the condition setting means 300a will be described under the default conditions (default edge detecting conditions and default discriminating conditions) as an example.

In the present embodiment, the edge detecting conditions include the region for detecting edges, direction for detecting edges, threshold value of edge intensity, and invalid edge discriminating conditions. The default edge detecting conditions include the entire image as for the edge detecting region, 8 directions indicated in solid lines shown in FIG. 22 as for the edge detecting directions, the threshold value T1 as for the threshold value of edge intensity, and a threshold value of the edge complexity (e.g., 4) as for the invalid edge discriminating conditions. First, the edge detecting means 212a detects edges having an intensity level which is greater than or equal to the threshold value T1 in each direction of 8 directions indicated in solid lines shown in FIG. 22 using the reduced image D0 to obtain the coordinates of the edges. Then, it creates an edge profile as shown in FIG. 23 for each of the edges using the image D based on the coordinates of each of the edges detected in each direction.

Figure 24:
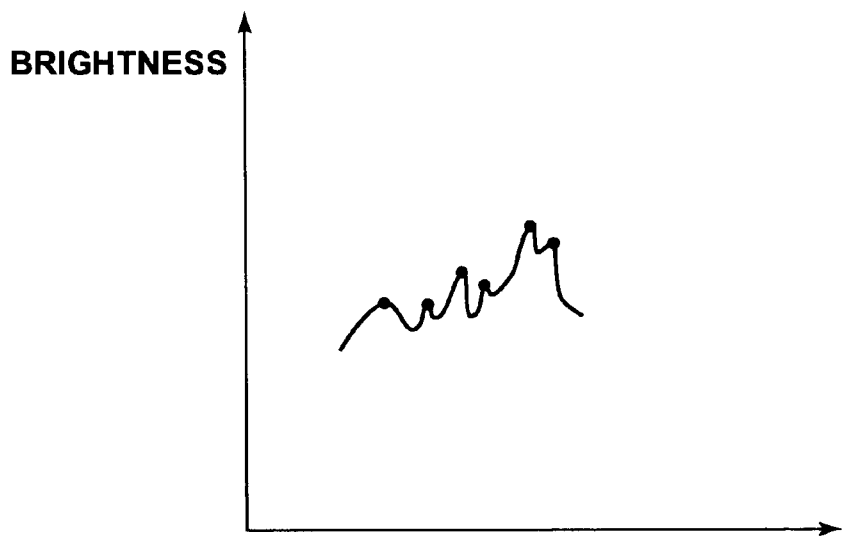
FIG. 24 is a drawing illustrating an example of invalid edge.

The edge restricting means 214a of the edge detecting means 212a eliminates edges having complicated shapes based on the edge profiles created before and outputs the profiles of the remaining edges to the edge characteristic amount obtaining means 216a. More specifically, it obtains the number of peak positions in the edge profile obtained (in an example shown FIG. 24, the number is six indicated by the six bullets). If the bullet count is 1, the complexity level is defined as 1, and if it is 2, the complexity level is defined as 2 and so on, and edges with complexity level greater than or equal to 4 are eliminated as invalid edges.

Figure 22:
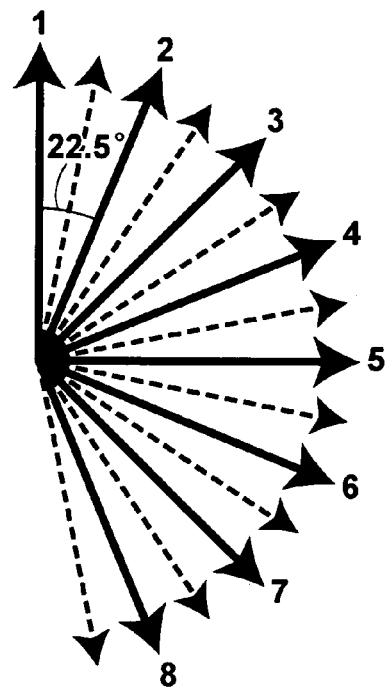
FIG. 22 is a drawing illustrating directions used for detecting edges.
Figure 23:
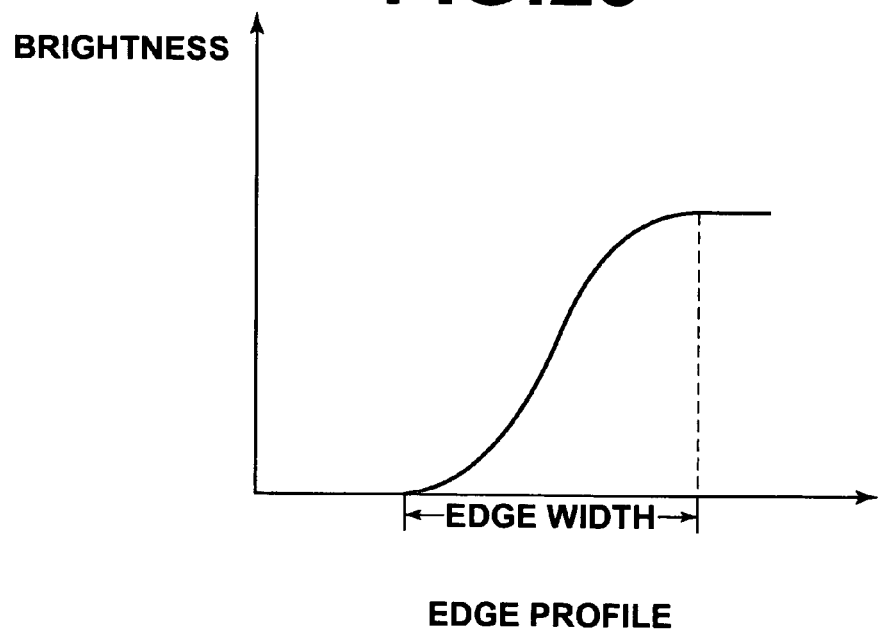
FIG. 23 is a drawing illustrating an edge profile.
Figure 25:
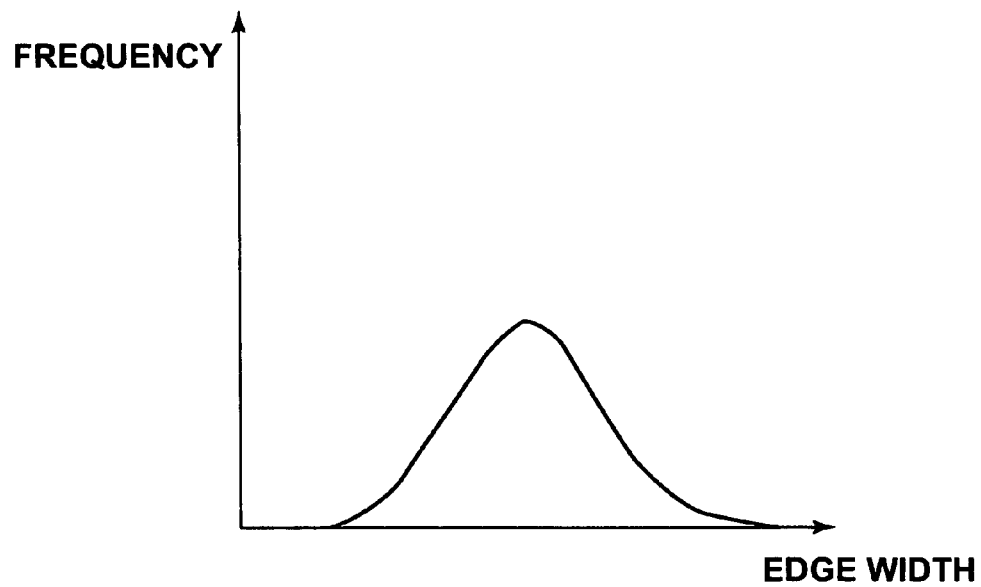
FIG. 25 is a drawing illustrating a histogram of edge widths.

The edge characteristic amount obtaining means 216a obtains an edge width as shown in FIG. 23 for each of the edges based on the edge profiles outputted from the edge restricting means 214a, creates a histogram of edge widths as shown in FIG. 25 for each direction of the 8 directions shown in FIG. 22, and outputs the histograms together with the edge widths as edge characteristic amounts S to the analyzing means 220a.

The analyzing means 220a mainly performs the following two processes.

1. Discriminates whether the image D is a blurred image or a normal image by calculating the blur direction and blur level N of the image D.

2. Calculates blur width L and camera shake level K if the image D is discriminated to be a blurred image.

Here, the first process will be described first.

Figure 26A:
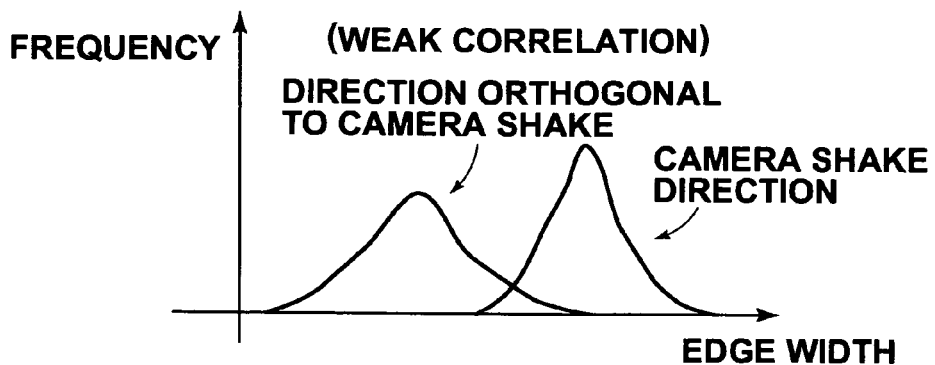
Figure 26B:
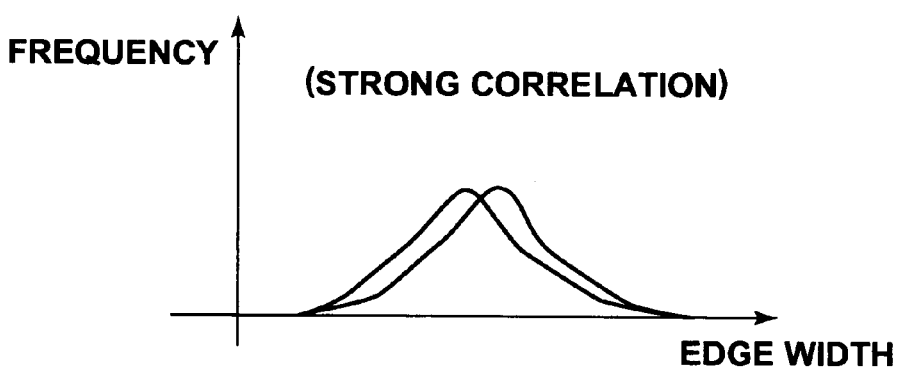

The analyzing means 220a obtains a correlation value between the two histograms of edge widths (histograms) in each pair of directions which are orthogonal to each other in the 8 directions indicated by the solid lines in FIG. 22 (1-5, 2-6, 3-7, 4-8) in order to obtain a blur direction on the image D. A variety of correlation values may be available depending on the method. They may be roughly categorized into two types: one in which the greater the correlation value, the less the strength of the correlation, and the other in which the correlation value is proportional to the strength of the correlation, that is, the greater the correlation value, the greater the strength of the correlation. In the present embodiment, a correlation value which is proportional to the strength of the correlation is used as an example. As shown in FIG. 26A, for the image with a camera shake blur, the correlation between the histogram of the direction of the camera shake blur and that of the direction which is orthogonal to the direction of the camera shake blur is small, whereas the correlation between the histograms of a set of orthogonal directions having no relation to the camera shake blur or between those of a set of orthogonal directions for an image without any camera shake blur (image without any blur or with defocus blur) is large as shown in FIG. 26B. Based on this fact, the analyzing means 220a of the image processing system A according to the present embodiment is adapted to obtain the correlation value between the two histograms in each of the four direction pairs to find out two directions of the direction pair having the smallest correlation value between the two histograms thereof. If the image D has a camera shake blur, one of these two directions may be regarded as the direction which is closest to the direction of the camera shake blur among the 8 directions indicated by the solid lines in FIG. 22.

Figure 26C:
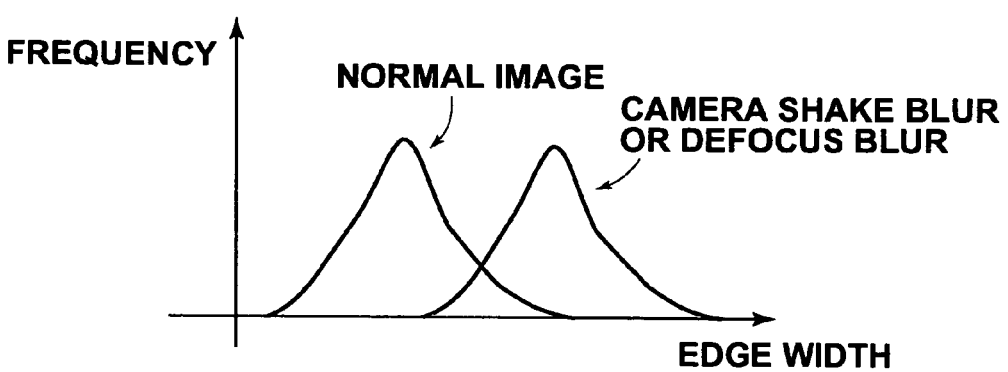

FIG. 26C is a histogram of edge widths in the camera shake direction for the images of the same subject with a camera shake blur, with a defocus blur, and without any blur (defocus and camera shake blurs). As shown in FIG. 26C, the normal image without any blur has the smallest averaged edge width, that is, one of the two directions described above having a greater averaged edge width should be the direction closest to the direction of the camera shake.

In this way, the analyzing means 220a finds out a pair of directions having the smallest correlation, and discriminates one of the directions having a greater averaged edge width to be the blur direction.

Figure 27:
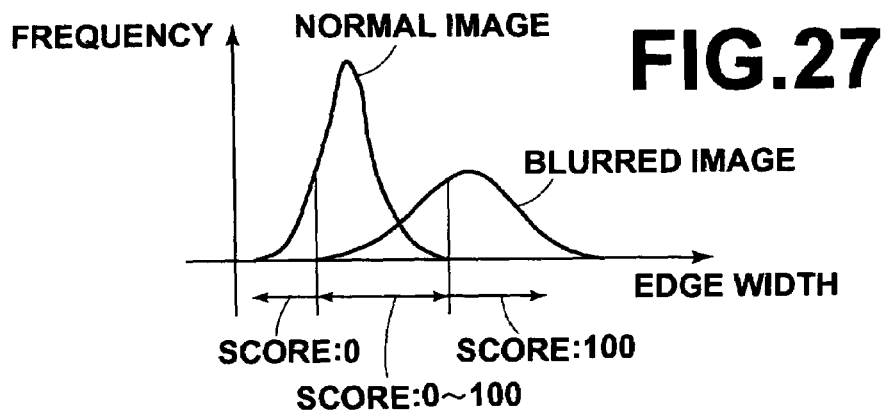
FIG. 27 is a drawing for describing how to calculate a blur level.

Then, the analyzing means 220a obtains the blur level N of the image D. The blur level of an image indicates the blurred level in the image. For example, the averaged edge width in the most heavily blurred direction (here, the blur direction obtained by the analyzing means 220a described above) may be used. Here, in the present embodiment, however, the blur level N is obtained more accurately by using each edge width of each of the edges in the blur direction and the database which is based on the FIG. 27. FIG. 27 shows the histograms of edge width distributions of blurred and normal images in the most heavily blurred direction (for the normal image, the direction corresponding to this direction is desirable, but any direction may be used) created based on a database of normal images for learning and that of blurred images, with the ratio of frequency (vertical axis in the Figure) between the blurred and normal images for each edge width illustrated as the evaluated value (score in FIG. 27). A database of correlated edge widths with scores (score database) is created and stored in the storage means 250.

The analyzing means 220a obtains the score for each of the edges in the blur direction based on the edge width by referring to the database created based on FIG. 27 and stored in the storage means 250, and calculates the blur level N of the image D by averaging the scores of all the edges in the blur direction. If the blur level N so obtained is smaller than a threshold value T2, which is one of the default discriminating conditions stored in the DB 350a of the condition setting means 300a, the analyzing means 220a discriminates the image D to be a normal image and terminates its process after outputting information P indicating that the image D is a normal image to the output means 260a.

On the other hand, if the blur level N is greater than or equal to the threshold value T2, the analyzing means 220a discriminates the image D to be a blurred image, and initiates the second process described above.

As the second process, the analyzing means 220a first obtains a camera shake level K of the image D. The camera shake level K that indicates the magnitude of the camera shake of the blur of the blurred image may be obtained based on the following elements.

1. The correlation value of the direction pair having the smallest correlation (least correlated pair): the smaller the correlation value, the greater the camera shake level.

Figure 28A:
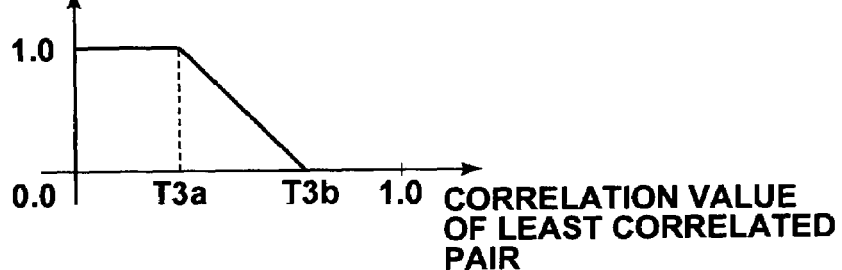
FIG. 28A is a drawing for describing how to calculate a camera shake level.

Focusing attention on this, the analyzing means 220a obtains a first camera shake level K1 corresponding to the correlation value of the least correlated pair based on the curve shown in FIG. 28A. Here, the default values for the threshold values T3a and T3b in FIG. 28A are also stored in the DB 350a of the condition setting means 300a as the default discriminating conditions.

2. Averaged edge width in one of the two directions having a greater averaged edge width in the least correlated pair: the greater the averaged edge width, the greater the levels of camera shake.

Figure 28B:
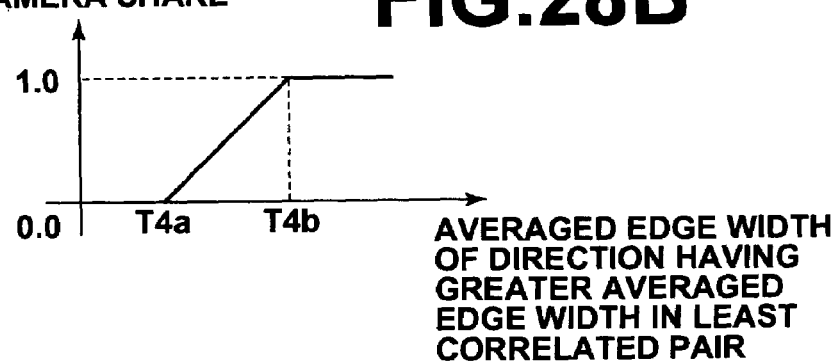
FIG. 28B is a drawing for describing how to calculate a camera shake level.

Focusing attention on this, the analyzing means 220a obtains a second camera shake level K2 corresponding to the averaged edge width in one of the directions having a greater edge width in the least correlated pair based on the curve shown in FIG. 28B. Here, the default values for the threshold values T4a and T4b in FIG. 28B are also stored in the DB 350a of the condition setting means 300a as the default discriminating conditions.

3. Difference in averaged edge width between the two directions in the least correlated pair: The greater the difference, the greater the camera shake level.

Figure 28C:
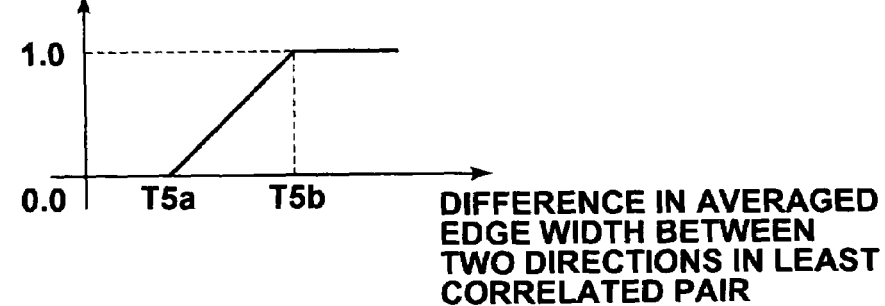
FIG. 28C is a drawing for describing how to calculate a camera shake level.

Focusing attention on this, the analyzing means 220a obtains a third camera shake level K3 corresponding to the difference in averaged edge width between the two directions in the least correlated pair based on the curve shown in FIG. 28C. Here, the default values for the threshold T5a and T5b in FIG. 28c are also stored in the DB 350a of the condition setting means 300a as the default discriminating conditions.

The analyzing means 220 obtains the first camera shake level K1, second camera shake level K2, and third camera shake level K3 in this way, and then obtains the camera shake level K of the blurred image D in accordance with the following formula using the values of K1, K2 and K3.

$$K = K1 \times K2 \times K3 \tag{3}$$

Where,
K: camera shake level
K1: first camera shake level
K2: second camera shake level
K3: third camera shake level Then, the analyzing means 220a obtains the blur width L of the blurred image D. Here, the analyzing means 220a may obtain the averaged edge width in the blur direction or averaged edge widths in the 8 directions indicated by the solid lines in FIG. 22 as the blur width L regardless of the camera shake level K.

The analyzing means 220a obtains the camera shake level K and blur width L in this way, and transmits them with the blur level N and blur direction as the blur information Q to the parameter setting means 230a.

The image processing apparatus A according to the present embodiment is a system for implementing image correction according to the unsharpness masking method (USM). The parameter setting means 230a sets a one-dimensional correction mask M1 that will act on the bur direction based on the blur width L and blur direction such that the greater the blur width L, the greater the size of the correction mask, and a two-dimensional correction mask M2 for isotropic correction based on the blur width L such that the greater the blur width L, the greater the size of the correction mask. Here, the two-dimensional masks corresponding to respective blur widths and one-dimensional mask corresponding to respective blur widths and directions are stored in the storage means 250a as a database (mask database). The parameter setting means 230a obtains a one-dimensional correction mask M1 based on the blur width L and direction, and two-dimensional correction mask M2 based on the blur width L from the mask database, and sets a one-dimensional correction parameter W1 for directional correction and two-dimensional correction parameter W2 for isotropic correction based on the following formula (4).

$$W1 = N \times K \times M1$$
$$W2 = N \times (1-K) \times M2 \tag{4}$$

where,
W1: one-dimensional correction parameter
W2: two-dimensional correction parameter
N: blur level
K: camera shake level
M1: one-dimensional correction mask
M2: two-dimensional correction mask That is, the parameter setting means 230a sets the correction parameters W1 and W2 (collectively referred to as parameter E0) such that the greater the blur level N, the greater the isotropic and directional correction levels, and the greater the camera shake level K, the heavier the weighting of the directional correction.

Here, the parameter setting means 230a performs adjustments to the blur level N, camera shake level K, correction masks M1 and M2 for the parameter E0. Then, it obtains a plurality of correction parameters E1, E2 and so on, which are different from the correction parameter E0, in accordance with the formula (4) using the adjusted blur levels N, camera shake levels K, correction masks M1 and M2.

Thereafter, the parameter setting means 230 outputs correction parameters E (E0, E1, E2 and so on) so obtained to the correcting means 240a.

The correcting means 240a performs image correction on the image D by applying each of the parameters E0, E1, E2 and so on to obtain the corrected images D'0, D'1, D'2 and so on, each corresponding to each of the correction parameters E0, E1, E2 and so on.

The determining means 245a comprises a display means (not shown) for displaying each of the corrected images obtained by the correcting means 240a and an input means (not shown) for having the user to select a corrected image desired by the user among the corrected images displayed. It determines the image selected by the user from the corrected images D'0, D'1, D'2 and so on as the intended image D', and outputs it to the output means 260a.

The output means 260a outputs the image D when the information P indicating that the image D is a normal image is received from the analyzing means 220a, or outputs the intended image D' when it is received from the determining means 245a. In the present embodiment, the "outputting" by the output means 260a means printing. The output means 260a obtains a printed image by printing out a normal image D and desired image D' obtained through correcting a blurred image D. However, The output means 260a may be an output means for recording the normal image D and desired image D' on a recording medium, or transmitting them to an image storage server on the network or to the address on the network designated by the user who has made a request for the image correction.

Now, back to the condition setting means 300a shown in FIG. 29. As described above, in the image processing system A according to the present embodiment, the edge detecting conditions for the edge detecting means 212a (including the edge restricting means 214a) include the edge detecting region, edge detecting directions, threshold value T1 of edge intensity, and threshold value T2 of edge complexity which is the invalid edge discriminating condition. The discriminating conditions for the analyzing means 220a include the threshold value T2 of blur level N of the image D for discriminating whether the image D is a normal image or a blurred image, threshold values T3a and T3b of the correlation value of the least correlated pair, the threshold values T4a and T4b of the averaged edge width in one of the two directions having a greater averaged edge width in the least correlated pair, and difference in averaged edge width between the two directions in the least correlated pair. The default values for the edge detecting conditions and discriminating conditions described above are stored in the DB 350a of the condition setting means 300a. The condition adjusting means 320a sets corresponding default values if no tag information is attached to the image D, or if no imaging condition information is included in the tag information of the image D required for setting the edge detecting conditions or discriminating conditions. When the tag information is attached to the image D and imaging conditions required for setting the edge detecting conditions or discriminating conditions are included in the tag information, the condition setting means 320a adjusts the default value of each of the edge detecting conditions or discriminating conditions based on the imaging condition information. Hereinafter, the operation of the condition adjusting means 320a will be described as an example case when the F number, shutter speed, strobing, ISO sensitivity, EV value, zooming, and compression rate have been obtained as the tag information.

The condition adjusting means 320a adjusts the edge detecting region from the entire image D to the central region of the image D centered on the center thereof, corresponding to 60% of the entire image D, if the F number used is smaller than or equal to a predetermined value (e.g., 5.6), or if the image D has been obtained using a zooming function (in which case the image D is an image with a shallow depth of field). In other cases (nonzoomed image with the F number greater than 5.6), the condition adjusting means 320a sets the default value of the entire image D as the edge detecting region. The edge detecting means 212a detect edges in the region set by the condition adjusting means 320a.

Further, the condition adjusting means 320a obtains additional 8 directions indicated by the dotted lines in FIG. 22 based on the 8 directions indicated by the solid lines as the additional directions for which edges are to be detected by the edge detecting means 212a and outputs the 16 directions, that is, the original 8 directions and the additional 8 directions to the edge detecting means 212a, if the image D has been obtained with the shutter speed slower than a predetermined threshold value, strobing, ISO sensitivity smaller than a predetermined threshold value, EV value smaller than a predetermined threshold value, or with zoom function. Since such conditions described above are highly likely to induce a camera shake at the time of imaging (camera shake blur is more likely to appear in the case of the zoomed image). The edge detecting means 212a detects edges in each direction of the 16 directions outputted from the condition adjusting means 320a. Thereafter, the process of obtaining edge characteristic amounts and the process by the analyzing means 220a will be implemented for the 16 directions described above.

Further, in these cases, the condition adjusting means 320a adjusts the threshold value of edge complexity, which is the invalid edge discriminating condition, from the default value of 4 to 3 to make the invalid edge discriminating conditions more stringent, and outputs the adjusted value to the edge detecting means 212a. The edge restricting means 214a provided in the edge detecting means 212a eliminates edges with the complexity levels greater than or equal to 3 in accordance with the invalid edge discriminating conditions provided by the condition adjusting means 320a.

As for the adjustment of the discriminating conditions for the analyzing means 220a, for the image D with a high probability of shakiness, adjusts the threshold value T2 of the blur level N, which will be used for discriminating whether the image D is a normal image or a blurred image, smaller than the default value, and at the same time it adjusts the threshold values T3a, T3b, T4a, T4b, T5a and T5b, which will be used for obtaining the camera shake level K, smaller than the respective default levels. Further, the condition adjusting means 320a adjusts the threshold value of the blur level N, which has been set in accordance with the shakiness, based on the compression rate of the image D such that the greater the compression rate, the greater the threshold value of the blur level N.

The edge detecting conditions and discriminating conditions provided in this way are outputted to the edge detecting means 220a and analyzing means 220a respectively, which in turn perform respective processes using the respective conditions outputted from the condition adjusting means 320a.

Figure 30:
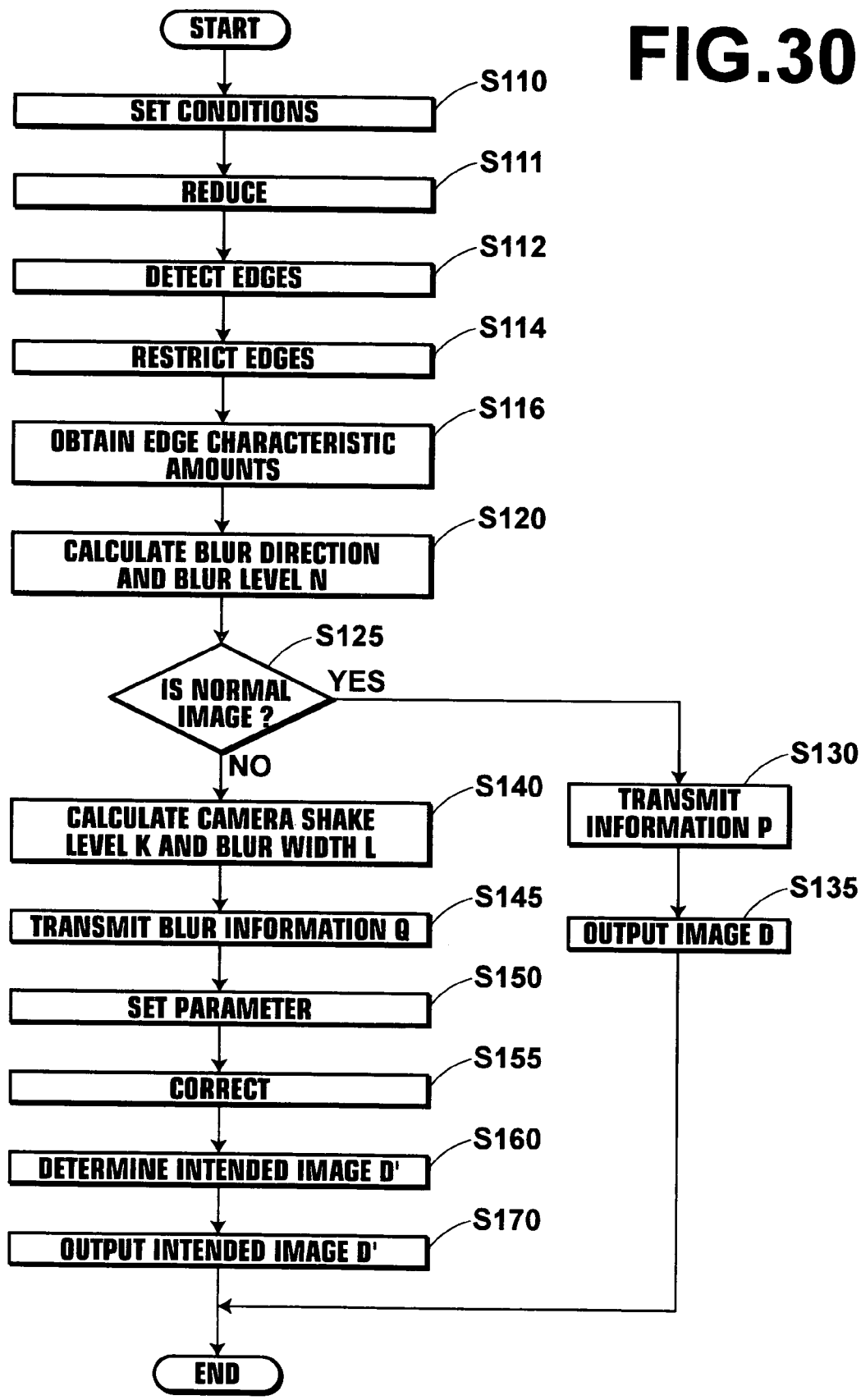
FIG. 30 is a flow chart illustrating the operation of the image processing system A according to the embodiment shown in FIG. 21.

FIG. 30 is a flow chart illustrating the operation of the image processing system A according to the present embodiment. As shown in the drawing, the edge detecting conditions and discriminating conditions are set by the condition setting means 300a for the image D read out from the recording medium 1 (S110), and the image D is reduced to a reduced image D0 by the reducing means 210a (S111). The edge detecting means 212a first detects only those edges having intensities greater than or equal to the threshold value T1 in each direction of a plurality of different directions included in the edge detecting conditions set in step S110 for the reduced image D0 to obtain the coordinates of these edges detected. Then, the edge detecting means 212a creates the edge profile as shown in FIG. 23 for each of the edges detected using the image D based on the coordinates of each of the edges in each direction (S112). The edge restricting means 214a provided in the edge detecting means 212a eliminates invalid edges based on the threshold value of edge complexity, which is the invalid edge discriminating condition, included in the edge discriminating conditions set in step S110, and outputs the profiles of the remaining edges to the edge characteristic amount obtaining means 216a (S114). The edge characteristic amount obtaining means 216a obtains the width of each edge based on the profile of each edge transmitted from the edge restricting means 214a and creates the histogram of edge widths in each direction. Then, it outputs the width of each edge and the histogram of edge widths of each direction as the edge characteristic amount S for the image D to the analyzing means 220a (S116). The analyzing means 220a calculates the blur direction and blur level N of the image D using the edge characteristic amounts S (S120), and discriminates whether the image D is a blurred image or a normal image based on the threshold value T2 of the blur level N for discriminating whether the image D is a normal image or a blurred image included in the discriminating conditions set in step 110 (S125). If the image D is a normal image (S125=YES), the analyzing means 220a outputs information P indicating that the image D is a normal image to the output means 260a (S130), and the output means 260a obtains a printed image by printing out the image D when the information P is received (S135).

On the other hand, if the image D is discriminated to be a blurred image in step 125 (S125=NO), the analyzing means 220a further calculates camera shake level K and blur width L of the image D based on the threshold values, T3a and T3b, of the correlation value of the least correlated pair, the threshold values, T4a and T4b, of the averaged edge width in one of the two directions having a greater averaged edge width in the least correlated pair, and the threshold values, T5a and T5b, of the difference in averaged edge width between the two directions in the least correlated pair included in the discriminating conditions set in step S110 (S140). Then, it outputs them to the parameter setting means 230a together with the blur level N and blur direction that have been obtained in step 120 as the blur information Q (S145). The parameter setting means 230a obtains a one-dimensional correction parameter W1 and two-dimensional parameter W2 based on the blur information Q from the analyzing means 220a. Here, the pair of correction parameters W1 and W2 so obtained is referred to as the correction parameter E0. The parameter setting means 230a further performs adjustments to the blur level N, camera shake level K, mask size of the correction masks M1 and M2, and so on to obtain correction parameters E1, E2 and so on, and outputs them to the correcting means 240a (S150).

The correcting means 240a performs image correction on the image D by applying each of the correction parameters E0, E1, E2 and so on to obtain corrected images D'0, D'1, D'2 and so on, each corresponding to each of the correction parameters (S155).

The determining means 245a controls the display means (not shown) to display each of the corrected images obtained by the correcting means 240a, and determines one of the corrected images selected by the user through the input means (not shown) as the intended image D' and outputs it to the output means 260a (S160).

The output means 260a obtained a printed image by printing out the intended image D' sent from the determining means 245a (S170).

In this way, in order to implement the image correction for blurs for digital photograph images in an efficient manner, the image processing apparatus A of the present embodiment obtains imaging condition information that indicates the conditions used for obtaining the image D, and adjusts the edge detecting conditions for discriminating the blur, conditions for discriminating whether the image D is a normal image or a blurred image, and conditions for calculating the camera shake level that indicates the magnitude of the camera shake based on the shakiness of the image D (probability that image D has a camera shake blur) reflected by the imaging conditions, when implementing image corrections for blurs for digital photograph images by obtaining the blur information through discriminating the blur and setting the correction parameters based on the blur information. Thus, the image processing apparatus A is capable of discriminating the blurs more accurately with enhanced image correction effects.

Further, the image processing apparatus A is capable of discriminating the blur with high accuracy for the image having a shallow depth of field by limiting the edge detecting region to the central area of the image in which the main subject is highly likely to be located for the images having a shallow depth of field based on the depth of field of the image reflected by the imaging condition information.

Still further, the image processing apparatus A may prevent the noise from being distinguishable for the images with high compression rates after they are corrected by adjusting the threshold value for discriminating whether the image is a normal image or a blurred image based on the image compression rate such that the greater the compression rate, the greater the threshold value.

Figure 31:
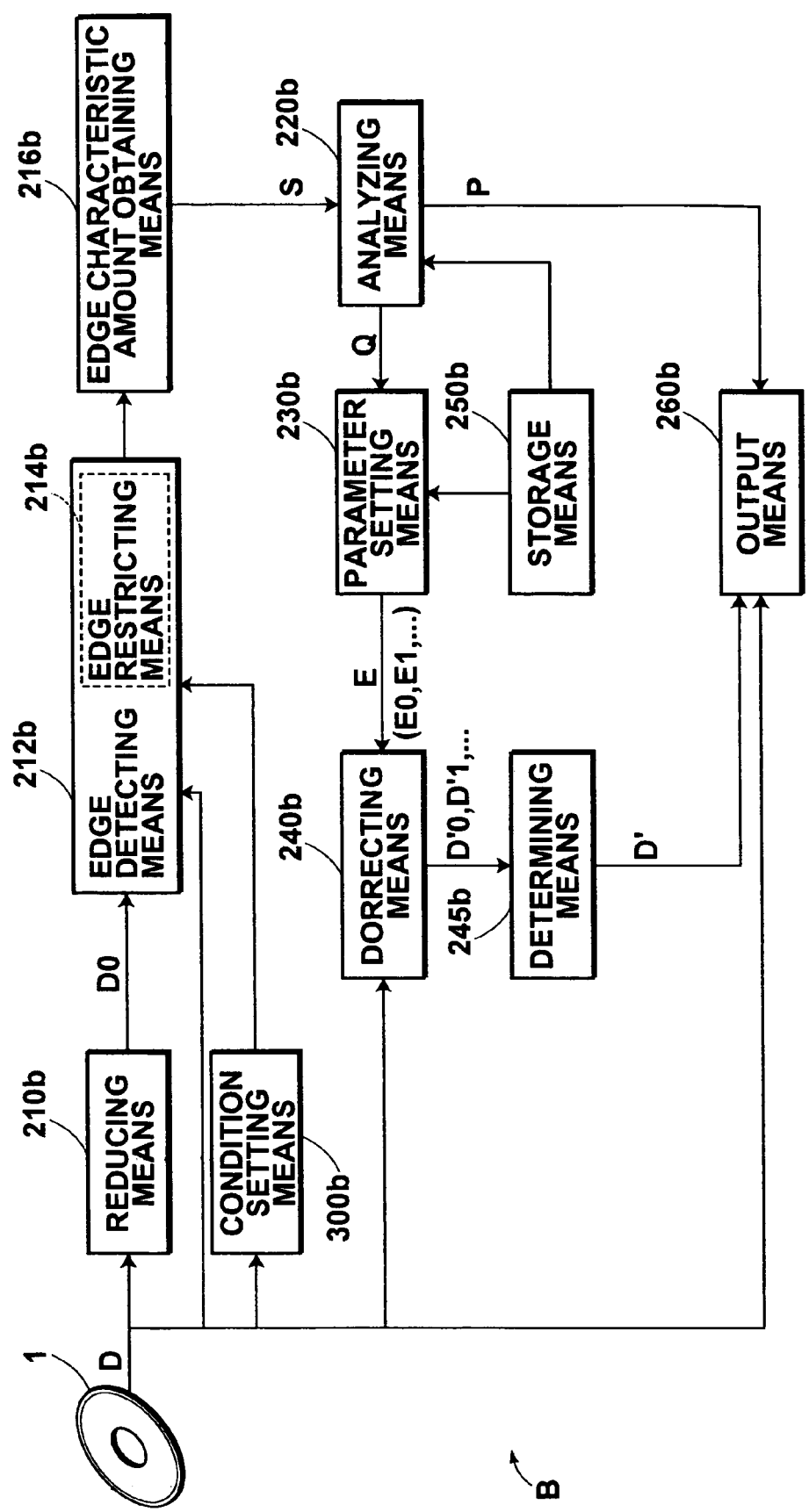
FIG. 31 is a block diagram illustrating the configuration of an image processing system B according to a fourth embodiment of the present invention.

FIG. 31 is a block diagram illustrating the configuration of an image processing system B according to a fourth embodiment of the present invention. In the image processing apparatus B according to the present embodiment, the image D is an image obtained by the auxiliary digital camera of a mobile phone. As shown in the drawing, the image processing system B according to the present embodiment comprises: a condition setting means 300b for setting edge detecting conditions, and transmitting them to an edge detecting means 212b, to be described later; a reducing means 210b for reducing the image D read out from the recording medium 1 to obtain a reduced image D0 of the image D; an edge detecting means 212b for detecting edges in each direction of a plurality of different directions included in the edge detecting conditions set by the condition setting means 300b using the reduced image D0 and image D; an edge characteristic amount obtaining means 216b for obtaining characteristic amounts S for the edges obtained by the edge detecting means 212b; an analyzing means 220b for discriminating whether the image D is a blurred image or a normal image by calculating the bur direction and blur level N using the edge characteristic amounts S, and transmitting information P indicating that the image D is a normal image to an output means 260b, to be described later, if the image D is discriminated to be a normal image and thereafter terminating the step, or further calculating a camera shake level K and a blur width L if the image D is discriminated to be a blurred image, and transmitting them with the blur level N and blur direction as blur information Q to a parameter setting means 230b, to be described later; a parameter setting means 230b for setting a plurality of parameters E (E0, E1, E2 and so on) for correcting the blurred image D based on the blur information Q from the analyzing means 220b; a correcting means 240b for correcting the image D using the parameters E0, E1, E2 and so on to obtain corrected images D'0, D'1, D'2 and so on, each corresponding to each correction parameter; a determining means 245b for determining the intended image D' from among the corrected images D'0, D'1, D'2 and so on, and outputting the intended image D' to the output means 260b; a storage means 250 containing various databases for the analyzing means 220b and parameter setting means 230b; and an output means 260b for outputting image D when the information P indicating that the image D is a normal image is received from the analyzing means 220b, or outputting the intended image D' when the intended image D' is received from the determining means 245b. The edge detecting means 212b comprises an edge restricting means 214b for eliminating invalid edges.

Figure 32:
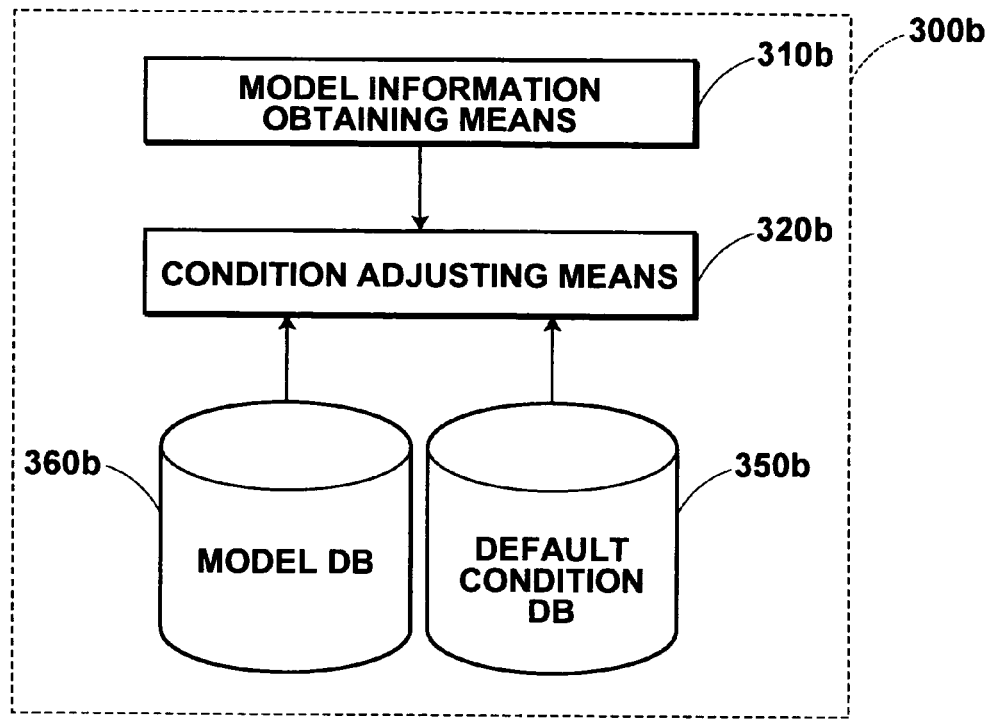
FIG. 32 is a block diagram illustrating the configuration of a condition setting means 300b of the image processing system B.

FIG. 32 is a block diagram illustrating the configuration of condition setting means 300b of the image processing system B according to the embodiment shown in FIG. 31. As shown in the drawing, the condition setting means 300b comprises: a model DB 360b having information stored therein that indicates the relationship between the mobile phone models and the shakiness thereof; a default condition DB 350b having default conditions of the edge detecting conditions stored therein for the edge detecting means 212b; a model information obtaining means 310b for obtaining information the indicates the model of the mobile phone that has obtained the image D; and condition adjusting means 320b for setting the edge detecting conditions by obtaining the camera shake inducing direction information for the mobile phone used to obtain the image D by referring to the model DB 360b based on the model information attached to the image D and adjusting the default conditions stored in the DB 350b, and transmitting them to the edge detecting means 212b. If no model information related to the model of the mobile phone used to obtain the image D, the condition adjusting means 320b will set default edge detecting conditions.

The details of the condition setting means 300b will be described later. Here, the configuration of the image processing system B without the condition setting means 300b will be described under the default edge detecting conditions as an example.

In the present embodiment, the edge detecting conditions include the direction for detecting edges, threshold value of edge intensities in each direction, invalid edge discriminating conditions for each direction. The default edge detecting conditions include 8 directions indicated by the solid lines in FIG. 33 as for the edge detecting directions, threshold values t1 for 8 directions, which are similar in value with each other, as for the threshold value of edge intensity, threshold value of edge complexity for 8 directions, which are similar in value with each other (e.g., 4), as for the invalid edge discriminating conditions. First, the edge detecting means 212b detects edges having intensities greater than or equal to the threshold value t1 in each direction of 8 directions indicated in solid lines shown in FIG. 33 using the reduced image D0 to obtain the coordinates of the edges. Then, it creates an edge profile as shown in FIG. 23 for each of the edges using the image D based on the coordinates of each of the edges detected in each direction.

The edge restricting means 214b of the edge detecting means 212b eliminates edges having complicated shapes based on the edge profiles created before and outputs the profiles of the remaining edges to the edge characteristic amount obtaining means 216b. More specifically, it obtains the number of peak positions in the edge profile obtained (in an example shown FIG. 24, the number is six indicated by the six bullets). If the bullet count is 1, the complexity level is defined as 1, and if it is 2, the complexity level is defined as 2, and so on, and edges with complexity level greater than or equal to 4 are eliminated as invalid edges.

Figure 33:
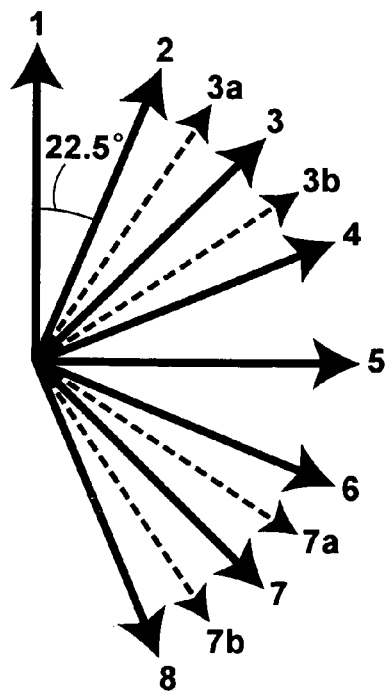
FIG. 33 is a drawing illustrating directions used for detecting edges.

The edge characteristic amount obtaining means 216b obtains an edge width as shown in FIG. 23 for each of the edges based on the edge profiles outputted from the edge restricting means 214b, creates a histogram of edge widths as shown in FIG. 25 for each direction of the 8 directions shown in FIG. 33, and outputs the histograms together with the edge widths as edge characteristic amounts S to the analyzing means 220b.

The basic function or operation of the analyzing means 220b is similar to that of the analyzing means 220a in the image processing system shown in FIG. 21. However, the threshold value T2 of the blur level N for discriminating whether the image is a normal image or a blurred image, and each of the threshold values for obtaining the camera shake level (thresholds T3a, T3b, T4a, T4b, T5a and T5b shown in FIG. 28) are not set by the condition setting means 300b; instead fixed values stored in the DB 350b are used.

The function or operation of the parameter setting means 230b, correcting means 240b, determining means 245b, and output means 260b is similar to that of the corresponding means of the image processing system A according to the embodiment shown in FIG. 21, and will not be elaborated upon further here.

Now, back to the condition setting means 300b shown in FIG. 32. As described above, in the image processing system B according to the present embodiment, the edge detecting conditions for the edge detecting means 212b (including the edge restricting means 214b) include the edge detecting directions, threshold value t1 of edge intensity for each direction, and threshold value of edge complexity which the invalid edge discriminating condition, and the default values for the edge detecting conditions are stored in the DB 350b of the condition setting means 300b. The condition adjusting means 320b sets corresponding default values if no model information of the mobile phone used for obtaining the image D is available. When the model information of the mobile phone is available, the condition setting means 320b obtains the camera shake inducing direction information that indicates the direction to which the camera shake is likely to occur on the image D based on the model information, and adjusts the default value of each of the edge detecting conditions based on the camera shake inducing direction information.

In the present embodiment, the model DB 360b contains information that relates mobile phone models and their directions prone to camera shake in which the vertical direction (direction illustrated by the direction 1 in FIG. 33) is assigned to the models of vertical imaging, and oblique direction (direction illustrated by the direction 7 in FIG. 33) to the models of horizontal imaging as the camera shake inducing direction information.

The model information obtaining means 310b may be a means for obtaining the model information related to the mobile phone used to obtain the image D from the tag information to the image D, or it may be an input means for having the user to manually input the model information.

The condition adjusting means 320b obtains the camera shake inducing direction information on the image D, which is the vertical or oblique direction described above, based on the information related to the model of the mobile phone used to obtain the image D obtained by the model information obtaining means 310b, and sets the number of directions for detecting edges such that the closer the region is to the camera shake inducing direction, the greater the number of the directions. More specifically, if the camera shake inducing direction is, for example, the oblique direction 7 on the image D, two directions are added (directions 7a and 7b indicated by the dotted lines), one of which is between the direction 7 and one of the two directions that sandwich the direction 7 (directions 6), and the other of which is between the direction 7 and the other of the two directions that sandwich the direction 7 (directions 8), in addition to the directions indicated by the solid lines in FIG. 33. Further, two other directions which are orthogonal to the direction 7a and 7b respectively (direction 3a for direction 7a, and direction 3b for direction 7b) are added for the process of discriminating the blur at a later stage.

In addition to the directions for detecting edges, the condition adjusting means 320b adjusts the threshold values t1 of edge intensity, each corresponding to each direction, and the threshold value of edge complexity which is the invalid edge detecting condition. More specifically, the threshold values t1 of edge intensity for the directions closer to the camera shake inducing direction (directions 6, 7a, 7b and 8 if the camera shake inducing direction is direction 7 in FIG. 33) and the threshold value of the edge complexity for these directions are lowered.

The edge detecting conditions provided in this way are outputted to the edge detecting means 220b, which in turn detects edges using the edge detecting conditions outputted from the condition adjusting means 320b.

Figure 34:
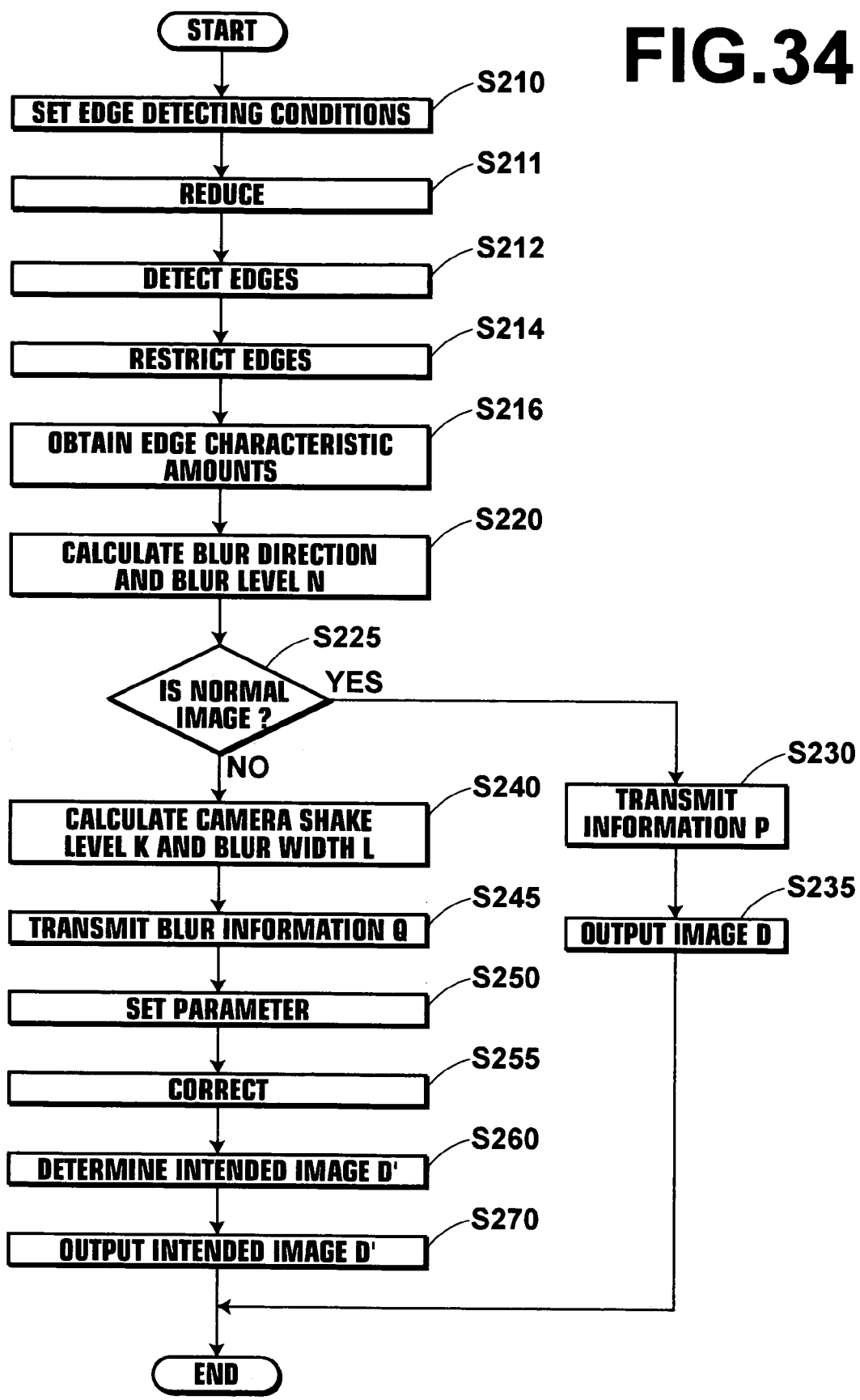
FIG. 34 is a flow chart illustrating the operation of the image processing system B.

FIG. 34 is a flow chart illustrating the operation of the image processing system B according to the present embodiment. As shown in the drawing, the edge detecting conditions are set by the condition setting means 300b for the image D obtained by the auxiliary digital camera of a mobile phone (S210), and the image D is reduced to a reduced image D0 by the reducing means 210b (S211). The edge detecting means 212b first detects edges having the intensity level greater than or equal to the threshold value t1 in each direction of a plurality of different directions included in the edge detecting conditions set in step S210 for the reduced image D0. Then, the edge detecting means 212b creates the edge profile as shown in FIG. 23 for each of the edges detected using the image D based on the coordinates of each of the edges in each direction (S212). The edge restricting means 214b provided in the edge detecting means 212b eliminates invalid edges based on the threshold value of edge complexity, which is the invalid edge discriminating condition, included in the edge discriminating conditions set in step S210, and outputs the profiles of the remaining edges to the edge characteristic amount obtaining means 216b (S214). The edge characteristic amount obtaining means 216b obtains the width of each edge based on the profile of each edge transmitted from the edge restricting means 214b and creates the histogram of edge widths in each direction. Then, it outputs the width of each edge and the histogram of edge widths of each direction as the edge characteristic amount S for the image D to the analyzing means 220b (S216). The analyzing means 220b calculates the blur direction and blur level N of the image D using the edge characteristic amounts S (S220), and discriminates whether the image D is a blurred image or a normal image (S225). If the image D is a normal image (S225=YES), the analyzing means 220b outputs information P indicating that the image D is a normal image to the output means 260b (S230), and the output means 260b obtains a printed image by printing out the image D when the information P is received (S235).

On the other hand, if the image D is discriminated to be a blurred image in step 225 (S225=NO), the analyzing means 220b further calculates camera shake level K and blur width L of the image D (S240). Then, it outputs them to the parameter setting means 230b together with the blur level N and blur direction that have been obtained in step 220 as the blur information Q (S245). The parameter setting means 230b obtains a one-dimensional correction parameter W1 and two-dimensional parameter W2 based on the blur information Q from the analyzing means 220b. Here, the pair of correction parameters W1 and W2 so obtained is referred to as the correction parameter E0. The parameter setting means 230b further performs adjustments to the blur level N, camera shake level K, mask size of the correction masks M1 and M2, and so on to obtain correction parameters E1, E2 and so on, and outputs them to the correcting means 240b (S250).

The correcting means 240b performs image correction on the image D by applying each of the correction parameters E0, E1, E2 and so on to obtain corrected images D'0, D'1, D'2 and so on, each corresponding to each of the correction parameters (S255).

The determining means 245b controls the display means (not shown) to display each of the corrected images obtained by the correcting means 240b, and determines one of the corrected images selected by the user through the input means (not shown) as the intended image D' and outputs it to the output means 260b (S260).

The output means 260b obtained a printed image by printing out the intended image D' sent from the determining means 245b (S270).

In this way, in order to implement the image correction for blurs for digital photograph images obtained by the auxiliary digital cameras of mobile phones in an efficient manner, the image processing apparatus B of the present embodiment obtains model information of the mobile phone used to obtain the image D in order to obtain the camera shake inducing direction of the mobile phone, and adjusts the edge detecting conditions such that the closer the region is to the camera shake inducing direction, the greater the number of directions for detecting edges, when implementing image corrections for blurs for digital photograph images by obtaining the blur information through discriminating the blur and setting the correction parameters based on the blur information. Thus, the image processing apparatus B is capable of discriminating the blurs more accurately with enhanced image correction effects.

So far the preferred embodiments of the present invention have been described. But the image processing method, apparatus, and program therefore is not limited to the embodiments described above, and additions, subtractions, or modifications may be made to these embodiments as long as they are within the spirit of the present invention.

For example, in the image processing system according to the embodiments described above, edges are detected in each direction of a plurality of different directions to obtain the edge characteristic amount for each direction, and the blurred state of the image including the blur direction is discriminated based on the edge characteristic amounts. The image processing method of the present invention does not necessarily require to detecting edges in each direction of a plurality of different directions to determine the blur direction. For example, the image processing method of the present invention may be a method in which the blurred state (blur information) of digital photograph images is discriminated by detecting edges having intensity level greater than or equal to a predetermined threshold value, and discriminating the level of the blur based on the edge characteristic amount, which is the averaged edge width of the detected edges. In this case, more accurate information related to blurs on digital photograph images may be obtained by setting the edge detecting conditions, conditions for discriminating the blurred state, and the like, based on the imaging condition information.

Setting image correction parameters including the appropriate size of the correction filter and the like, when image correction for blur is implemented at a later stage, may provide the satisfactory result of image correction effects.

Further, in the image processing system B shown in FIG. 31, for example, the condition setting means 300b adjusts only the edge detecting conditions. The condition setting means 300b may be a means for further obtaining the shakiness of the mobile phone used to obtain the image based on the mobile phone model information, and adjusting not only the edge detecting conditions but also the discriminating conditions for the analyzing means 220b based on the shakiness information.

Further, in the image processing system according to the embodiments described above, the parameter setting means sets a plurality of correction parameters, and the correcting means performs image correction using the plurality of parameters to obtain the plurality of corrected images, and the determining means determines one of the corrected images selected by the user as the intended image. The system may further comprises a correction control means and confirming means, wherein only a single parameter is set first by the parameter setting means, in turn only a single corrected image is obtained by the correcting means at a time, and the corrected image is confirmed by the user through the confirming means, thereafter the processes of resetting the correction parameter by the parameter setting means, image correction by the correcting means using the parameter reset by the parameter setting means to obtain a corrected image, confirmation by the user through the confirming means are repeated until the corrected image has been confirmed by the user as the intended image through the control of the correction control means. Further, aforementioned system may be adapted to have the user to confirm the corrected image and to cancel the image correction, that is, the correction is not implemented, if the corrected image is not satisfactory to the user at the confirmation stage.

Further, in the image processing system according to the embodiments described above, the blur direction is deemed to be one of the two directions having a greater averaged edge width than the other in the least correlated pair. Alternatively, however, the blur direction may be obtained, for example, in the following manner. Calculate each of the camera shake levels for the least correlated pair (direction pair having the smallest correlation value) and the pair having the second smallest correlation value. Obtain two blur direction candidates, each having a greater averaged edge width than the other in each of the two direction pairs. Then, based on the two blur direction candidates, obtain the blur direction by weighting the two candidates such that the greater the levels of camera shake of the candidate, the heavier the weighting of that candidate. In this case, the blur width may also be obtained by weighting the two averaged edge widths of the two blur direction candidates such that the greater the camera shake level of the candidate, the heavier the weighting of the averaged edge width of that candidate.

Further, the image processing system according to the embodiments described above deems one of the two directions having a greater averaged edge width than the other in the least correlated pair to be the blur direction regardless of whether or not a blur is included in the image, then calculates the blur level based on the blur direction and discriminates if the image is a normal image or a blurred image based on the blur level, and further obtains the camera shake level for the image discriminated to be a blurred image for setting the correction parameter.

Alternatively, the system may be, for example, a system in which the blur level of an image having a "nondirectional" blur is obtained, wherein the blur is deemed to be "nondirectional" (i.e., a normal image or defocused image) if the correlation value for the least correlated pair is greater than or equal to a predetermined threshold value Ta, and the image having the blur level smaller than a predetermined threshold value Tb is deemed to be a normal image to which no correction is implemented and the image having the blur level greater than or equal to the predetermined threshold value Tb is deemed to be an image having a defocus blur to which image correction is implemented using only the isotropic correction parameter, while the image with a correlation value for the least correlated pair which is smaller than the predetermined threshold value Ta is deemed to be an image with a camera shake blur and one of the directions of the least correlated pair is discriminated to be the blur direction. In setting the correction parameter for the image with camera shake blur, the system may be adapted to set only the directional correction parameter that will act on the blur direction, or to further obtain the level and set the correction parameter through the weighting addition of the isotropic correction parameter and directional correction parameter based on the camera shake level.

Further, in the image processing system according to the embodiment described above, the digital photograph image is first discriminated whether it is a normal image or a blurred image, and the parameter setting and image correction are implemented by calculating the camera shake level and width only for the images discriminated to be blurred images in order to improving the efficiency of the processing. Alternatively, the system may be adapted to calculate the blur level, blur width, and camera shake level as the blur information for all of the images to be processed, and image correction is implemented by setting the parameter based on the blur information without discriminating whether the image is a normal image or a blurred image. In this case, the correction parameter set for a normal image is a parameter for small correction or not to implement the correction, since the normal image has a small blur level, and the weighting of the directional correction parameter is small or zero in obtaining the correction parameter for a defocused image through the weighting addition of the isotropic correction parameter and directional correction parameter in accordance with the camera shake level, since camera shake level of the defocused image is small.

Further, in the embodiments described above, the analyzing means obtains the camera shake level based on the three elements described above (FIGS. 28A, 28B and 28C), but the number of elements for obtaining the camera shake level may be varied. For example, only the two elements among the three elements described above may be used, or the number of the elements may be increased to include the difference in the correlation value between the least correlated pair and the pair shifted the most from the least correlated pair (for the direction pairs shown in FIG. 2, the pairs shifted 45° with each other) for obtaining the camera shake level.

Further, the condition setting means may be adapted to adjust the number of elements instead of adjusting each element shown in FIGS. 28A, 28B and 28C. For example, the number of elements for obtaining the camera shake level may be adjusted such that the greater the shakiness of the image, the less number of elements (i.e., adjusting the number of the elements for obtaining the camera shake level). Taking the FIGS. 28A, 28B and 28C as an example, only FIGS. 28A and 28B may be used in obtaining camera shake levels for the images with high shakiness.

Further, in eliminating invalid edges, the edges exposed to direct light from a light source may be deemed as invalid edges. The edges exposed to direct light from a light source may be, for example, the edges having brightness levels greater than or equal to a predetermined threshold value. Here, in setting edge detecting conditions, the threshold value of edge intensity may be set such that the greater the shakiness of the image, the smaller the threshold value in order to increase the number of edges to be detected. At the same time, the invalid edge discriminating conditions may be set more stringent by lowering the threshold value of the brightness.

Further, in the image processing system according to the embodiment described above, the analyzing means 220 obtains the camera shake level for the image D, which has been discriminated to be a blurred image, without discriminating whether the blur is the defocus or camera shake blur, and the image correction is implemented by obtaining the correction parameter through the weighting addition of the isotropic correction parameter and directional correction parameter using the weighting factor which corresponds to the camera shake level (the camera shake level itself for the image processing system according to the present embodiment). The system may be adapted to determine the blurred image having the camera shake level smaller than a predetermined threshold value to be a defocused image, and to set only the isotropic correction parameter and implement the correction for the defocused image.

Further, the image processing system according to the embodiment described above discriminates all the digital photograph images to be processed whether each of the images is a normal image or a blurred image on the assumption that each of the images to be processed is not known whether it is a normal image or a blurred image. However, in the image processing system intended for use only for blurred images, such as those for implementing image correction only for the images designated as blurred images by the customers or operators, the discrimination if the image is a normal image or a blurred image is not necessarily required.

Further, in the image processing system according to the embodiments described above, all of the processes from the image reduction to the outputting of the intended image are implemented in a single unit, but the present invention is not limited to this. For example, the image processing system may be divided into an analyzing unit and a processing unit. The analyzing unit may be adapted to implement the processes from the beginning to the correction parameter setting, and to record the correction parameter on a recording medium as the tag information attached to the image. The processing unit may be adapted to read out the image from the recording medium, and to implement the image correction using the correction parameter, which is the tag information attached to the image.

Further, in such an embodiment, the analyzing unit may be adapted to implement the processes from the beginning to the obtaining of the blur information, and to record the blur information on a recording medium as the tag information attached to the image. The processing unit may be adapted to read out the blur information from the recording medium, and set the correction parameter or implement correction based on the blur information, which is the tag information attached to the image.

Further, the image processing system according to the embodiments described above may further comprise a correction instructing means, wherein the processes are implemented from the beginning to the obtaining of the blur information or the correction parameter setting, but the correction is not implemented until the instruction to implement the correction is given by the correction instructing means, and the correction is implemented after the instruction to implement the correction has been given.

Further, the image processing system according to the embodiments described above implements image correction for the images read out from recording media. But the present invention may be applied to those systems having any means for receiving images as inputs, including the means for receiving images through networks.

Figure 35:
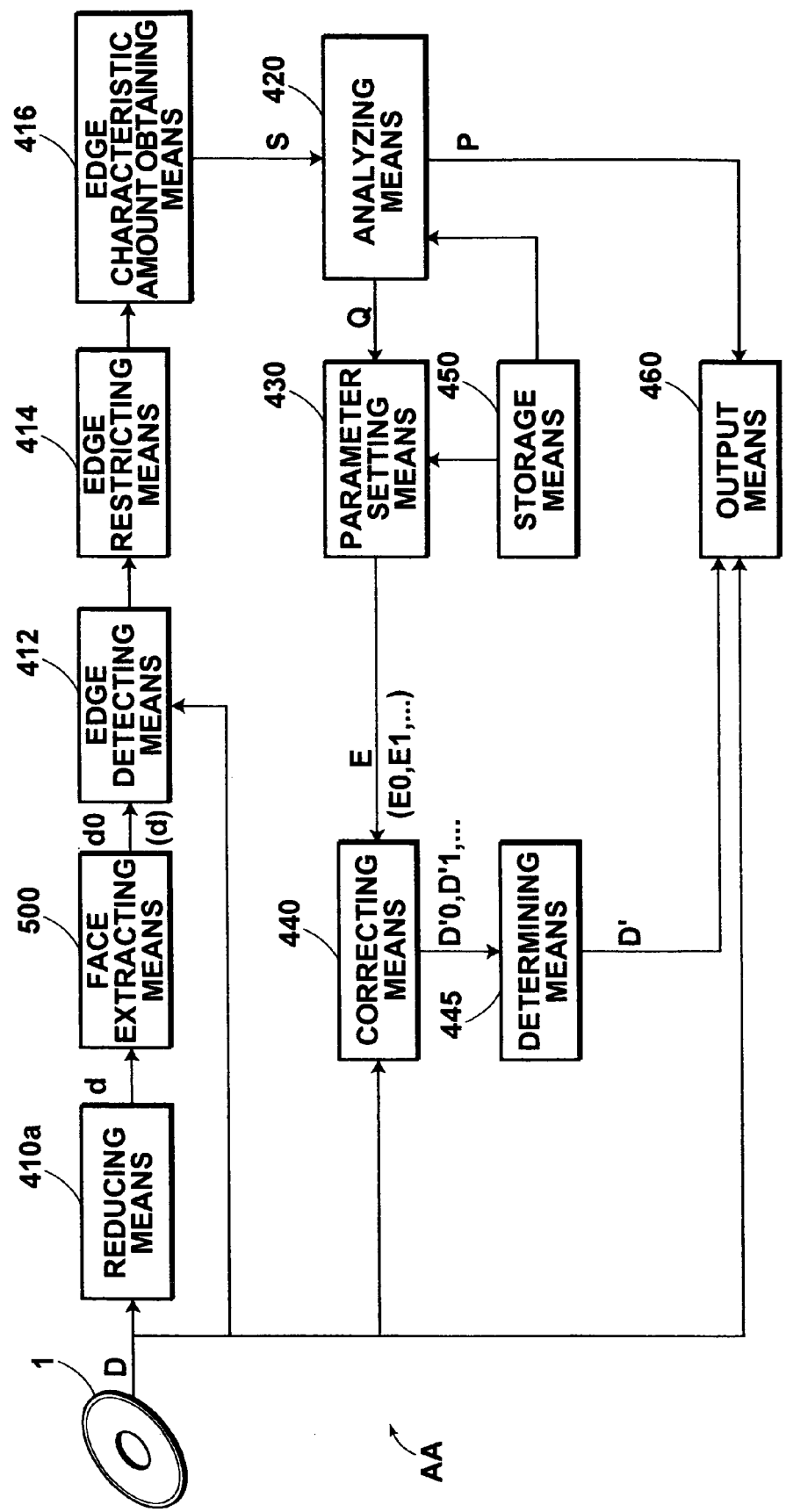
FIG. 35 is a block diagram illustrating the configuration of an image processing system AA according to a fifth embodiment of the present invention.

FIG. 35 is a block diagram of an image processing system AA according to a fifth embodiment of the present invention. The image processing system AA shown in FIG. 35 is a system for implementing the image processing by reading out photograph images (images) from a recording medium 1 that contains images obtained by auxiliary digital cameras of mobile phones (mobile cameras). The recording medium 1 contains groups of images, each comprising a number of images. Here, the description will be made taking a single image D as an example.

Figure 38:
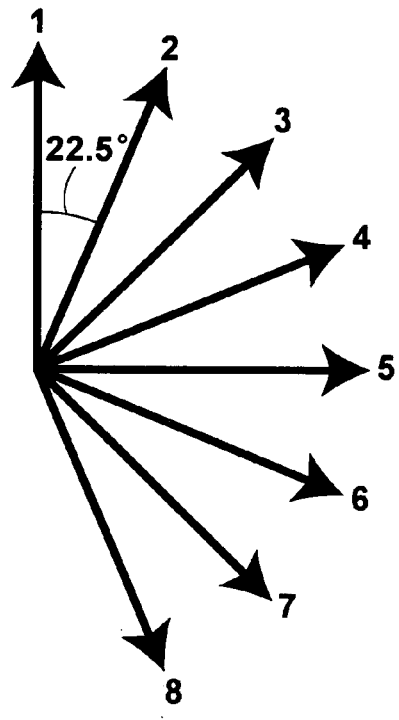
FIG. 38 is a drawing illustrating directions used for detecting edges.

As shown in the drawing, the image processing system AA according to the present embodiment comprises: a reducing means 410*a* for reducing the image D read out from the recording medium 1 with a reduction ratio of, for example, ⅛ to obtain a reduced image d of the image D; a face extracting means 500 for detecting a main subject (a face as an example) on the reduced image d, and outputting a face portion image d0 if a face is detected (here, a reduced face portion image, but hereinafter, the reduced face portion image is distinguished from the face portion image by way of the reference numerals, and both are referred to as the face image), or the reduced image d if no face is detected to an edge detecting means 412 to be described later; an edge detecting means 412 for detecting edges in each direction of 8 different directions shown in FIG. 38 using the face image d0 from the face extracting means 500 and an image D0 that corresponds to the face image d0 on the image D, or the reduced image d and image D; an edge restricting means 414 for eliminating invalid edges from among those detected by the edge detecting means 412; an edge characteristic amount obtaining means 416 for obtaining characteristic amounts S for the edges obtained by the edge restricting means 414; an analyzing means 420 for discriminating whether the image D is a blurred image or a normal image by calculating a bur direction and blur level N using the edge characteristic amounts S, and transmitting information P indicating that the image D is a normal image to an output means 260, to be described later if the image D is discriminated to be a normal image and thereafter terminating the step, or further calculating a camera shake level K and blur width L and transmitting them with the blur level N and blur direction as blur information Q to a parameter setting means 430, to be described later, if the image D is discriminated to be a blurred image; a parameter setting means 430 for setting a plurality of parameters E (E0, E1, E2 and so on) for correcting the blurred image D based on the blur information Q outputted from the analyzing means 420; a correcting means 440 for correcting the image D using the parameters E0, E1, E2 and so on to obtain corrected images D'0, D'1, D'2 and so on, each corresponding to each correction parameter; a determining means 445 for determining the intended image D' from among the corrected images D'0, D'1, D'2 and so on, and outputting the intended image D' to the output means 260; a storage means 450 containing various databases for the analyzing means 420 and parameter setting means 430; and an output means 260 for outputting the image D when the information P indicating that the image D is a normal image is received from the analyzing means 420, or outputting the intended image D' when the intended image D' is received from the determining means 445.

Hereinafter the configuration of each component of the image processing system AA shown in FIG. 35 will be described.

First, the face extracting means 500 will be described.

FIG. 44 is a block diagram illustrating the detailed configuration of the face extracting means 500. As shown in the drawing, the face extracting means 500 comprises: a characteristic amount calculating means 510 for calculating characteristic amounts C0 from the image d; a reference database 515 comprising reference data H0, to be described later; a face detecting means 520 for discriminating whether a face is included in the image D based on the characteristic amounts C0 calculated by the characteristic amount calculating means 510 and the reference data H0 contained in the database 515, and cutting out a face image d0 if a face is included in the image D and outputting it to the edge detecting means 412, or outputting the reduced image d to the edge detecting means 412 if a face is not included in the image D.

The characteristic amount calculating means 510 of the face extracting means 500 calculates characteristic amounts C0 used for discriminating a face from a reduced image d. More specifically, it calculates gradient vectors (i.e., changing direction in the density and magnitude for each of the pixels on the image D) as the characteristic amounts C0. Hereinafter, calculation of the gradient vectors will be described. First, the characteristic amount calculating means 510 detects edges in the horizontal direction within the reduced image d by administering a filtering process with a horizontal edge detecting filter as shown in FIG. 45A. The characteristic amount calculating means 510 also detects edges in the vertical direction within the reduced image d by administering a filtering process with a vertical edge detecting filter as shown in FIG. 45B. Then, gradient vector K for each pixel of the reduced image d is calculated from the size H of horizontal edge and the size V of the vertical edge as illustrated in FIG. 46.

Figure 47A:
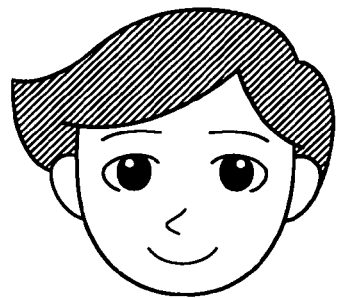
FIG. 47A is a drawing illustrating the face of a person.
Figure 47B:
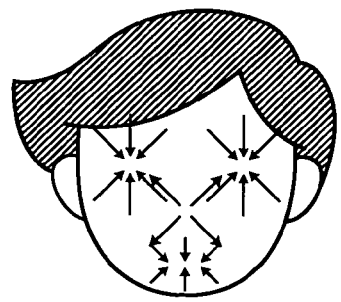
FIG. 47B is a drawing illustrating gradient vectors in the vicinity of the eyes and mouth of the face of the person shown in FIG. 47A.

In the case that an image pictures a human face therein such as that illustrated in FIG. 47A, the gradient vectors K, which are calculated in the manner described above, are directed toward the centers of eyes and mouths, which are dark, and are directed away from noses, which are bright, as illustrated in FIG. 47B. In addition, the magnitudes of the gradient vectors K are greater for the mouth than for the eyes, because changes in density are greater for the mouth than for the eyes.

The direction and magnitude of the gradient vector K is defined as the characteristic amount C0. The direction of the gradient vector K may form an angle between 0° and 359° with a predetermined direction (e.g. X direction in FIG. 10).

Figure 48A:
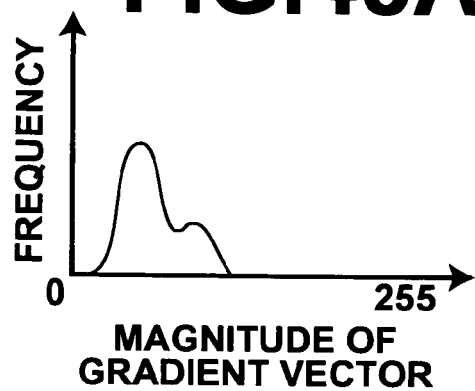
FIG. 48A is a drawing illustrating a histogram of magnitudes of gradient vectors before normalization.
Figure 48B:
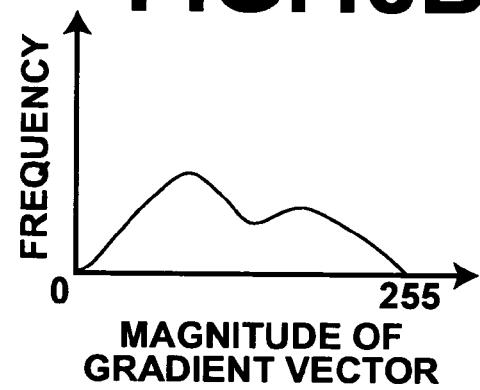
FIG. 48B is a drawing illustrating a histogram of magnitudes of gradient vectors after normalization.
Figure 48C:
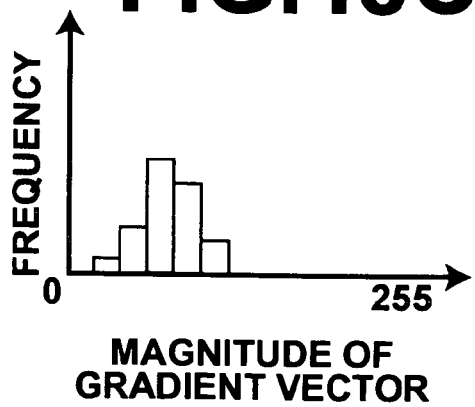
FIG. 48C is a drawing illustrating a histogram of quinarized magnitudes of gradient vectors.
Figure 48D:
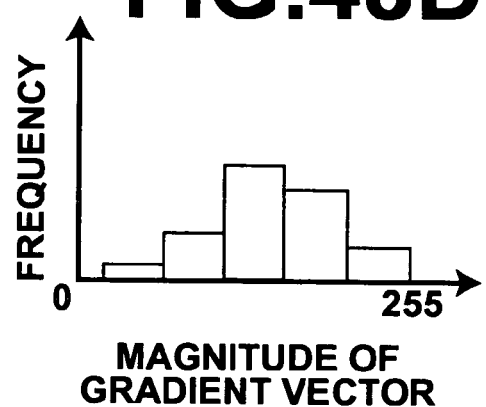
FIG. 48D is a drawing illustrating a histogram of quinarized magnitudes of gradient vectors after normalization.

Here, the magnitudes of the gradient vectors K are normalized. The normalization is performed in the following manner. First, a histogram that represents the magnitudes of the gradient vectors K of all of the pixels within the reduced image d is derived. Then, the magnitudes of the gradient vectors K are corrected, by flattening the histogram so that the distribution of the magnitudes is evenly distributed across the range of values assumable by each pixel of the reduced image d (0 through 255 in the case that the image data is 8 bit data). For example, in the case that the magnitudes of the gradient vectors K are small and concentrated at the low value side of the histogram as illustrated in FIG. 48A, the histogram is redistributed so that the magnitudes are distributed across the entire range from 0 through 255, as illustrated in FIG. 48B. Note that, in order to reduce the amount of calculations, it is preferable that the distribution range of the gradient vectors K in a histogram be divided, for example, into five as illustrated in FIG. 48C. Then, the gradient vectors K are normalized by redistributing the histogram such that the frequency distribution, which has been divided into five, is distributed across the entire range of values from 0 through 255, as illustrated in FIG. 48D.

The reference data H0 stored in the database 115 defines discriminating conditions for the combination of the characteristic amounts C0 for each of the pixels comprising each of a plurality of types of pixel groups, each comprising combination of a plurality of pixels selected from sample images, to be described later.

The combinations of characteristic amounts C0 for each of the pixels comprising each group of pixels and discriminating conditions are predetermined through learning from a group of sample images comprising a plurality of sample images, which are known to be of faces, and a plurality of sample images, which are known to not be of faces.

Figure 49:
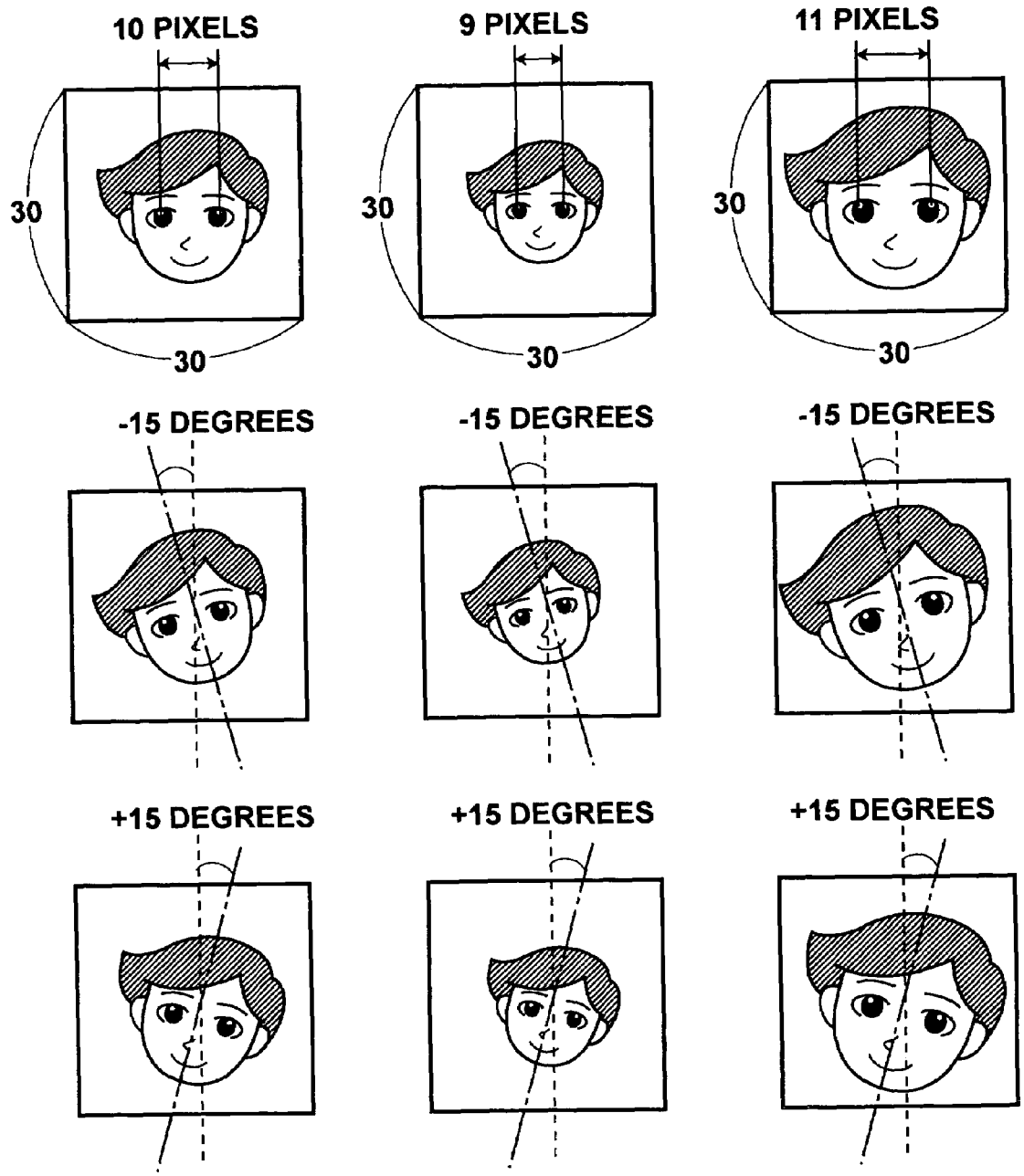
FIG. 49 a drawing illustrating an example of sample image which has been known as the face used for learning reference data.

Note that in the present embodiment, the sample images, which are known to be of faces, have the following specifications. That is, the sample images are of a 30×30 pixel size, the distances between the centers of the eyes of each face within the images are one of 9, 10, or 11 pixels, and the faces are rotated stepwise in three level increments within the range of ±15 levels from the vertical (i.e., the rotational angles of −15°, −12°, −9°, −6°, −3°, 0°, +3°, +6°, +9°, +12°, +15°) as shown in FIG. 49. Accordingly, 33 sample images (3×11) are prepared for each face. Note that only sample images which are rotated −15°, 0°, and 15° are illustrated in FIG. 49. Here, in the sample images with the distance of 10 pixels between the centers of the eyes, the center locations of the eyes are the same, which are defined as (x1, y1) and (x2, y2) in the coordinates with the coordinate origin at the upper left corner of the sample images. The positions of the eyes in the vertical direction (i.e., y1, y2), in the state that the face is vertically oriented are the same for all of the sample images.

Arbitrary images of a size of 30×30 pixels are employed as the sample images which are known to not be of faces.

Consider a case in which sample images, in which the distance between the eyes are 10 pixels and the rotational angle is 0 levels (that is, the faces are in the vertical orientation) are employed exclusively to perform learning. In this case, only those faces, in which the distance between the eyes are 10 pixels and which are not rotated at all, would be discriminated by referring to the reference data H0. The sizes of the faces, which are possibly included in the reduced images d are not uniform in size. Therefore, during discrimination regarding whether a face is included in the reduced image d, the reduced image d is enlarged or reduced to enable discrimination of a face of a size that matches that of the sample images. However, in order to maintain the distance between the centers of the eyes accurately at ten pixels, it is necessary to enlarge or reduce the reduced image d in a stepwise manner with magnification rates in 1.1 units, thereby causing the amount of calculations to be great.

Figures 50A, 50B, 50C, 51:
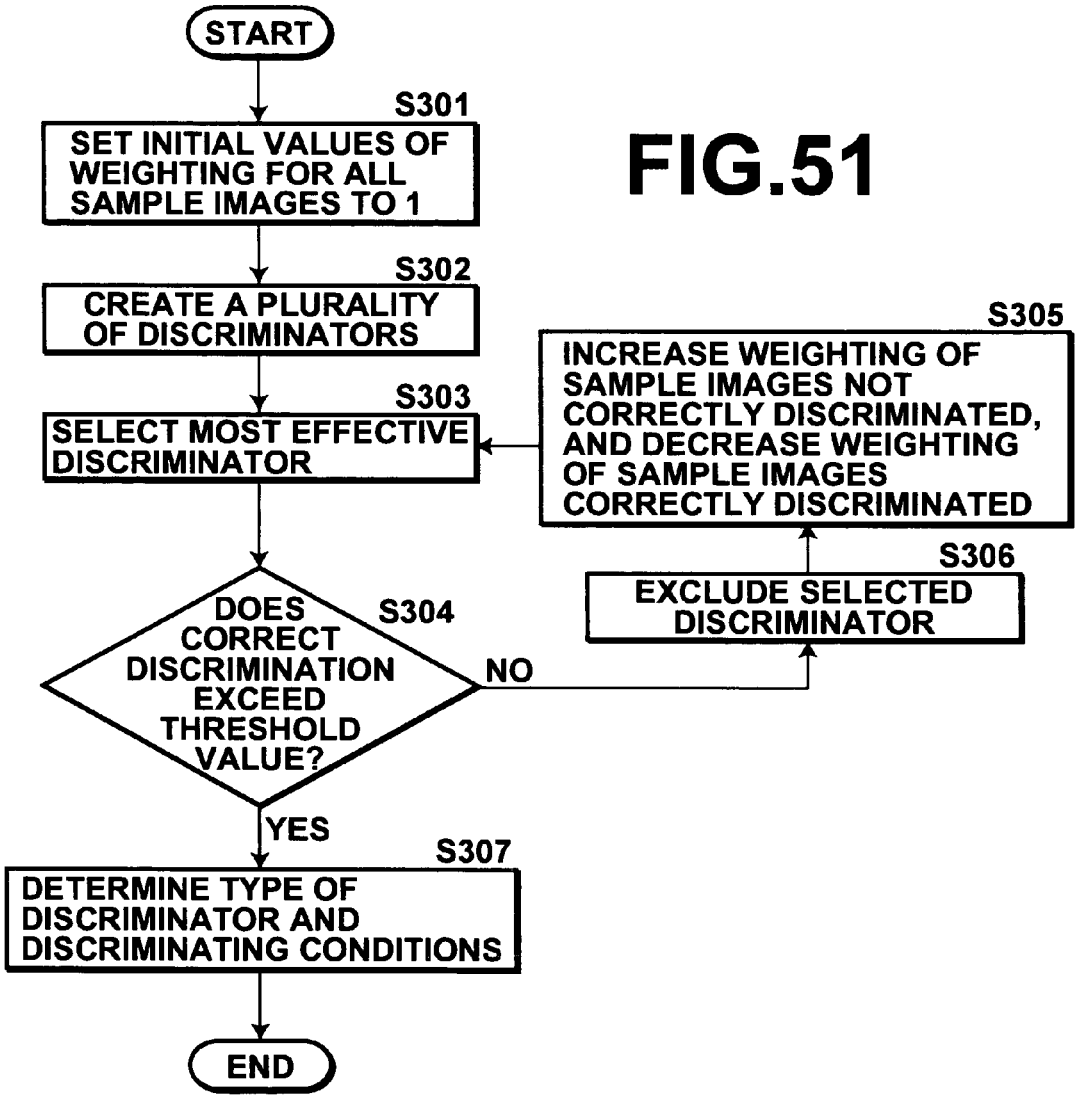
FIG. 50A is a drawing for describing the rotation of a face.
FIG. 50B is a drawing for describing the rotation of a face.
FIG. 50C is a drawing for describing the rotation of a face.
FIG. 51 is a flow chart illustrating a learning method for reference data.

In addition, faces, which are possibly included in the reduced images d, are not only those which have rotational angles of 0°, as that illustrated in FIG. 50A. There are cases in which the faces in the reduced images d are rotated, as illustrated in FIGS. 50B and 50C. However, in the case that sample images, in which the distance between the eyes is 10 pixels and the rotational angle is 0°, are employed exclusively to perform learning, rotated faces such as those illustrated in FIGS. 50B and 50C would not be discriminated as faces.

For these reasons, the present embodiment imparts an allowable range to the reference data H0. This is accomplished by employing sample images, which are known to be of faces, in which the distances between the centers of the eyes are 9, 10, and 11 pixels, and which are rotated in a stepwise manner in three level increments within the range of ±15 levels. Thereby, at the face detecting means 520, to be described later, the reduced image d may be enlarged or reduced in a stepwise manner with magnification rates in 11/9 units, which enables reduction of the time required for calculations, compared with a case in which the intended image S0 is enlarged or reduced with magnification rates in 1.1 units. In addition, rotated faces, such as those illustrated in FIGS. 50B and 50C are also enabled to be discriminated.

Hereinafter, an example of a learning technique employing the sample images will be described with reference to the flow chart of FIG. 51.

The sample images, which are the subject of learning, comprise a plurality of sample images which are known to be of faces, and a plurality of sample images which are known to not be of faces. Note that the in sample images, which are known to be of faces, the distances between the centers of the eyes of each face within the images are one of 9, 10, or 11 pixels, and the faces are rotated stepwise in three level increments within the range of ±15° from the vertical. Each sample image is weighted, that is, is assigned a level of importance. First, the initial values of weighting for all the sample images are set equally to 1 (S301).

Next, discriminators are generated for each of the different types of pixel groups of the sample images (step S302). Here, each discriminator has a function of providing a reference to discriminate images of faces from those not of faces, by employing combinations of the characteristic amounts C0 for each pixel that constitutes a single pixel group. In the present embodiment, histograms of combinations of the characteristic amounts C0 for each pixel that constitutes a single pixel group are utilized as the discriminators.

Figure 52:
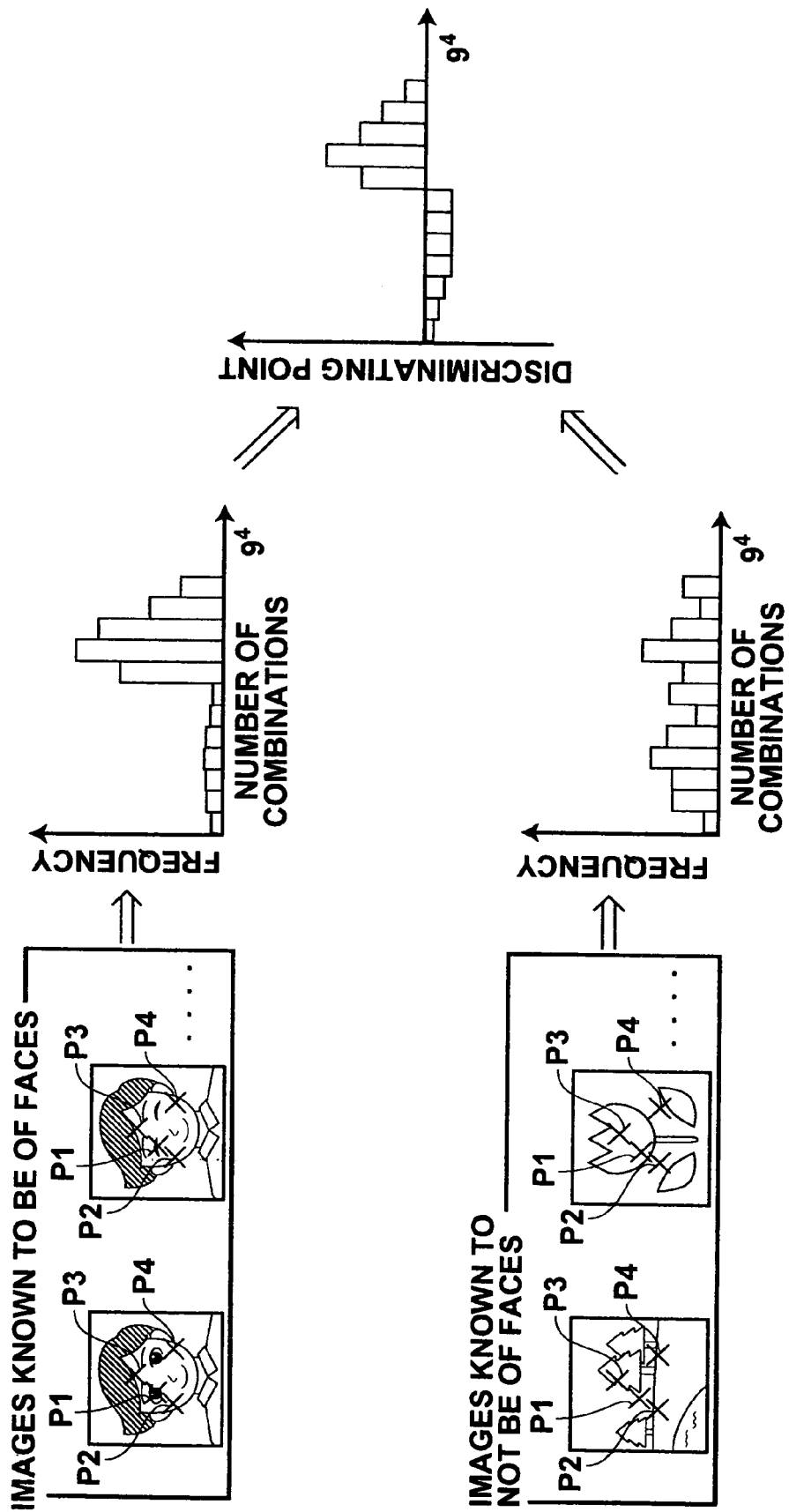
FIG. 52 is a drawing for describing the extraction method for an identifier.

The generation of a discriminator will be described with reference to FIG. 52. As illustrated in the sample images at the left side of FIG. 52, the pixels that constitute the pixel group for generating the discriminator are: a pixel P1 at the center of the right eye; a pixel P2 within the right cheek; a pixel P3 within the forehead; and a pixel P4 within the left cheek, of the sample images which are known to be of faces. Combinations of the characteristic amounts C0 for the pixels P1 through P4 are obtained for all of the sample images, which are known to be of faces, and histograms thereof are generated. Here, the characteristic amounts C0 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360 \times 256)^4$, which would require a huge number of samples, time and memory space for the learning. For this reason, in the present embodiment, directions of the gradient vector are quaternarized, that is, set so that values of 0 through 44 and values of 315 through 359 are converted to the right direction value (value j), values of 45 through 134 are converted to the upward direction value (value 1), values of 135 to 224 are converted to the left direction value (value 2), and values of 225 to 314 are converted to the downward direction value (value 3), and the sizes of the gradient vector are ternarized (0 to 2). Then, the combination values are calculated according to the following formulae.

Combination value 0 (if magnitude of the gradient vector=0)

Combination value=((direction of the gradient vector+ 1)×magnitude of the gradient vector)(if the magnitude of the gradient vector>0)

The number of combinations becomes $9^4$ by this; thereby the amount of data related to the characteristic amounts may be reduced.

In a similar manner, histograms are generated for the plurality of sample images, which are known to not be of faces. Note that in the sample images, which are known to not be of faces, pixels (denoted by the same reference numerals P1 through P4) at positions corresponding to the pixels P1 through P4 of the sample images, which are known to be of faces, are employed. Logarithms of the ratios of the frequencies in the two histograms are represented by the rightmost histogram illustrated in FIG. 52, which is employed as the discriminator. Hereinafter, the each of the values indicated by the vertical axis is referred to as the discriminating point. According to the discriminator, images that have distributions of the characteristic amounts corresponding to positive discriminating points therein are highly likely to be of faces. The likelihood that an image is of a face increases with an increase in the absolute values of the discriminating points. On the other hand, images that have distributions of the characteristic amounts C0 corresponding to negative discriminating points of the discriminator are highly likely to not be of faces. Again, the likelihood that an image is not of a face increases with an increase in the absolute values of the negative discriminating points. In step S302, a plurality of discriminators in histogram format regarding combinations of the characteristic amounts of each pixel of the plurality of types of pixel groups, which are utilized during discrimination are generated.

Thereafter, a discriminator, which is most effective in discriminating whether an image is of a face, is selected from the plurality of discriminators generated in step S302. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step S303). At the first step S301, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step S305, to be described later. Thereafter, the process returns to step S303. Therefore, at the second step S303, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S303's, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step S304). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is completed. In the case that the percentage of correct discriminations is less than or equal to the predetermined threshold value, the process proceeds to step S306, to select an additional discriminator, to be employed in combination with the discriminators which have been selected thus far.

The discriminator, which has been selected at the immediately preceding step S303, is excluded from selection in step S306, so that it is not selected again.

Next, the weighting of sample images, which were not correctly discriminated by the discriminator selected at the immediately preceding step S303, is increased, and the weighting of sample images, which were correctly discriminated, is decreased (step S305). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step S303, and another effective discriminator is selected, using the weighted percentages of correct discriminations as a reference.

The above steps S303 through S306 are repeated to select discriminators corresponding to combinations of the characteristic amounts C0 for each pixel that constitutes specific pixel groups, which are suited for discriminating whether faces are included in images. If the percentages of correct discriminations, which are evaluated at step S304, exceed the threshold value, the type of discriminator and discriminating conditions, which are to be employed in discrimination regarding whether images include faces, are discriminated (step S7), and the learning of the reference data H0 is completed.

Note that in the case that the learning technique described above is applied, the discriminators are not limited to those in the histogram format. The discriminators may be of any format, as long as they provide references to discriminate between images of faces and other images by employing combinations of the characteristic amounts C0 for each pixel that constitutes specific pixel groups. Examples of alternative discriminators are: binary data, threshold values, functions, and the like. As a further alternative, a histogram that represents the distribution of difference values between the two histograms illustrated in the center of FIG. 52 may be employed, in the case that the discriminators are of the histogram format.

The learning technique is not limited to that which has been described above. Other machine learning techniques, such as a neural network technique, may be employed.

The face detecting means 520 obtains each discriminating point of the combination of characteristic amounts C0 for each pixel constituting each group of pixels by referring to the discriminating conditions which have been learned by the reference data H0 for all of the combinations of the characteristic amounts for each pixel constituting the plurality of types of pixel groups. Then it integrates all the discriminating points to determine whether the reduced image d contains a face. In this case, the directions of the gradient vectors K and the magnitudes thereof, which constitute characteristic amounts C0, are quaternarize and ternarized respectively. In the present embodiment, discrimination is performed based on whether the sum of all of the discriminating points is positive or negative. For example, in the case that the total sum of the discriminating points is positive, it is judged that a face is contained in the reduced image d. In the case that the total sum of the discriminating points is negative, it is judged that a face is not contained in the reduced image d.

Figure 53:
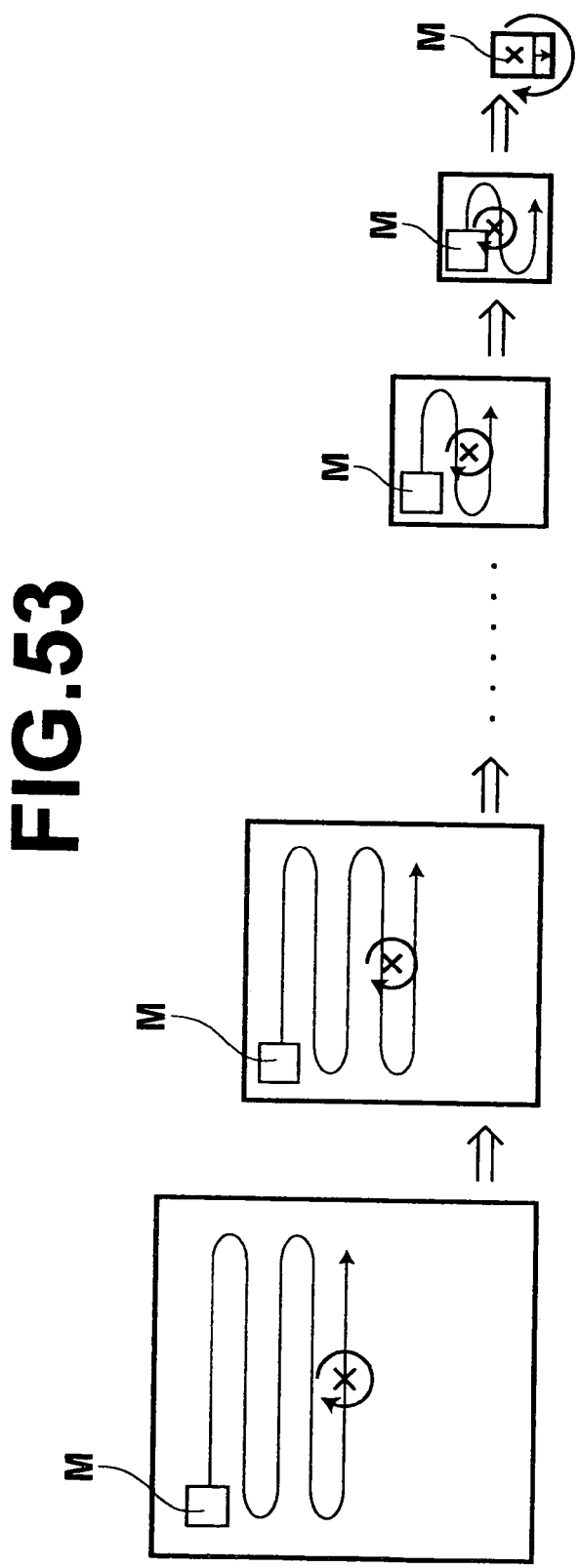
FIG. 53 a drawing for describing the gradual transformation of a subject image for identification.

Here, the sizes of the reduced images are varied, unlike the sample images, which are 30×30 pixels. In addition, in the case that a face is included in the reduced image d, the face is not necessarily in the vertical orientation. For these reasons, the face detecting means 520 enlarges or reduces the reduced image d in a stepwise manner (FIG. 53 illustrates a reduction process), so that the size thereof becomes 30 pixels either in the vertical or horizontal direction. In addition, the reduced image d is rotated in a stepwise manner over 360 levels. A mask M, which is 30×30 pixels large, is set on the reduced image d, at every stepwise increment of the enlargement or reduction. The mask M is moved one pixel at a time on the reduced image d, and whether a face is included in the reduced image d is discriminated by discriminating whether the image within the mask is that of a face.

Discrimination regarding whether a face is included in the reduced image d is performed at every step in the stepwise enlargement or reduction and rotational deformation thereof. In the case that a face is discriminated once, the reduced image d is judged to include a face, and the face detecting means 520 extracts the 30×30 pixel region that corresponds to the position of the mask M where the face is discriminated as the face image d0 from the reduced image d having the size and rotational angle of those when the face is discriminated to be included, and outputs it to the edge detecting means 412. In the case that a face has never been discriminated, the reduced image d is judged not to include a face, and the face detecting means 520 outputs the reduced image d as it is.

Note that during learning of the reference data H0, sample images are utilized, in which the distances between the centers of the eyes are one of 9, 10, and 11 pixels. Therefore, the magnification rate during enlargement or reduction of the image D may be set to be 11/9. In addition, during learning of the reference data H0, sample images are utilized, in which faces are rotated within a range of ±15°. Therefore, the image D may be rotated over 360° in 30 level increments.

Here, the characteristic amount calculating means 510 calculates the characteristic amounts C0 from the reduced image d at each step of their stepwise enlargement or reduction and rotational deformation.

In the manner described above, the face detecting means 500 performs discrimination whether a face is included in the reduced image d (i.e., in the image D) and outputs the extracted face image d0 if a face is included, or outputs the reduced image d as it is to the edge detecting means 412.

Figure 36:
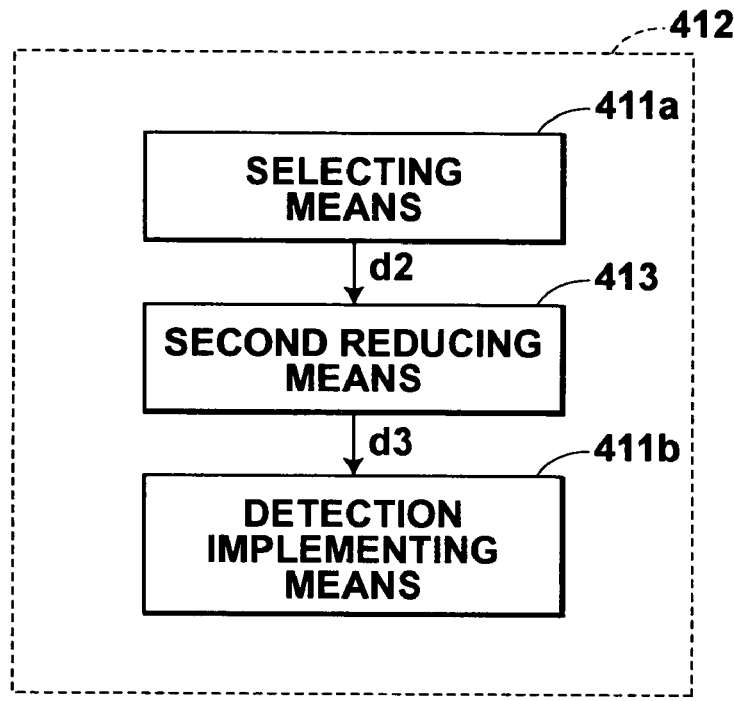
FIG. 36 is a block diagram illustrating the configuration of an edge detecting means 412 of the image processing system AA shown in FIG. 35.

FIG. 36 is a block diagram illustrating the configuration of the edge detecting means 412. As shown in the drawing, the edge detecting means 412 comprises a selecting means 411*a*, a second reducing means 413, and a detection implementing means 411*b*.

The selecting means 411*a* is a means for selecting a face image used for extracting edges, wherein if only a single image (a single face image d0 or the reduced image d) is outputted from the face detecting means 500, it outputs it to the second reducing means 413 as it is, while if a plurality of images (face images d0) are outputted from the face detecting means 500, it selects a single image from among the plurality of face images d0 and outputs it to the second reducing means 413. The selecting means 411*a* of the edge detecting means 412 according to the present invention checks the number of pixels for each of the plurality of face images d0 and selects the face image d0 having the greatest number of pixels among the plurality of the face images d0. Hereinafter, the image outputted from the selecting means 411*a* to the second reducing means 413 is referred to as the image d2.

Figure 37:
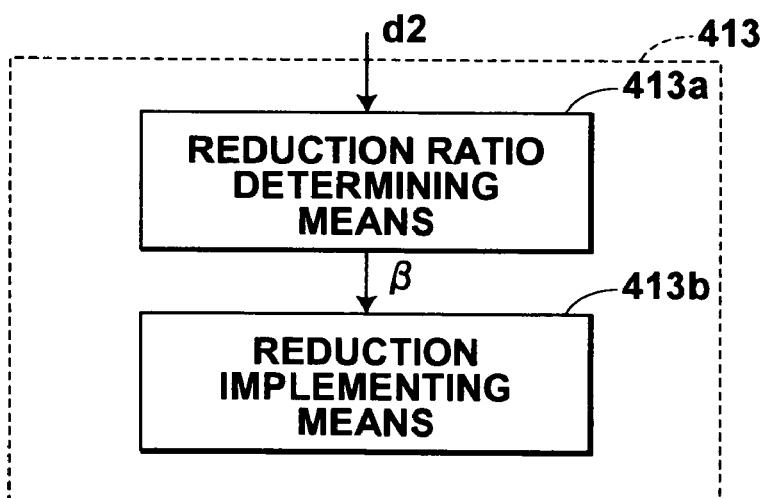
FIG. 37 is a block diagram illustrating the configuration of a second reducing means 413 of the edge detecting means 412 shown in FIG. 36.

FIG. 37 is a block diagram illustrating the configuration of the second reducing means 413 of the edge detecting means 412. As shown in the drawing, the second reducing means 413 comprises a reduction ratio determining means 413a for determining a reduction ratio β, and a reduction implementing means 413b for implementing a reduction process using the reduction ratio β.

The images d2 outputted to the second reducing means 413 are categorized into three types, namely, a reduced image d outputted from the face detecting means 500, a single face image d0 outputted from the face detecting means 500, and a single face image d0 selected by the selecting means 411a from among a plurality of face images d0. The reduction ratio determining means 413a determines the reduction ratio based on the number of pixels of the non-reduced image (image D for reduced image d, image region on the image D that corresponds to the face image d0) that corresponds to the image d2 received thereby as follows.

1. If the number of pixels is less than or equal to a million pixels, the reduction ratio β is set to 1, that is, it determines not to reduce the image d2.
2. If the number of pixels is greater than a million pixels and smaller than or equal to two million pixels, the reduction ratio β is set to ½.
3. If the number of pixels is greater than two million pixels and smaller than or equal to three million pixels, the reduction ratio β is set to ¼.
4. If the number of pixels is greater than three million pixels and smaller than or equal to four million pixels, the reduction ratio β is set to ⅛.
5. If the number of pixels is greater than four million pixels and smaller than or equal to six million pixels, the reduction ratio β is set to 1/16.
6. If the number of pixels is greater than six million pixels, the reduction ratio β is set to 1/32.

The reduction ratio determining means 413a outputs the reduction ratio β determined in this way to the reduction implementing means 413b.

The reduction implementing means 413b reduces the non-reduced image that corresponds to the relevant image d2 (as described above, image D for reduced image d, image region on the image D that corresponds to the face image d0) to obtain a reduced image d3, and outputs it to the detection implementing means 411b.

The detection implementing means 411b first detects edges having intensities greater than or equal to a predetermined threshold value in each direction of 8 directions shown in FIG. 38 using the reduced image d3 to obtain the coordinates of the edges. Then, the detection implementing means 411b creates an edge profile as shown in FIG. 39 for each of the edges using the non-reduced image that corresponds to the reduced image d3 (hereinafter referred to as the object image) based on the coordinates of each of the edges detected in each direction, and outputs the profiles to the edge restricting means 414.

The edge restricting means 414 eliminates invalid edges such as those having complicated shapes or those exposed to direct light from a light source (more specifically, for example, those having brightness greater than or equal to a certain brightness) based on the edge profiles outputted from the edge detecting means 412 (more specifically, the detection implementing means 411), and outputs the profiles of the remaining edges to the edge characteristic amount obtaining means 416.

Figure 39:
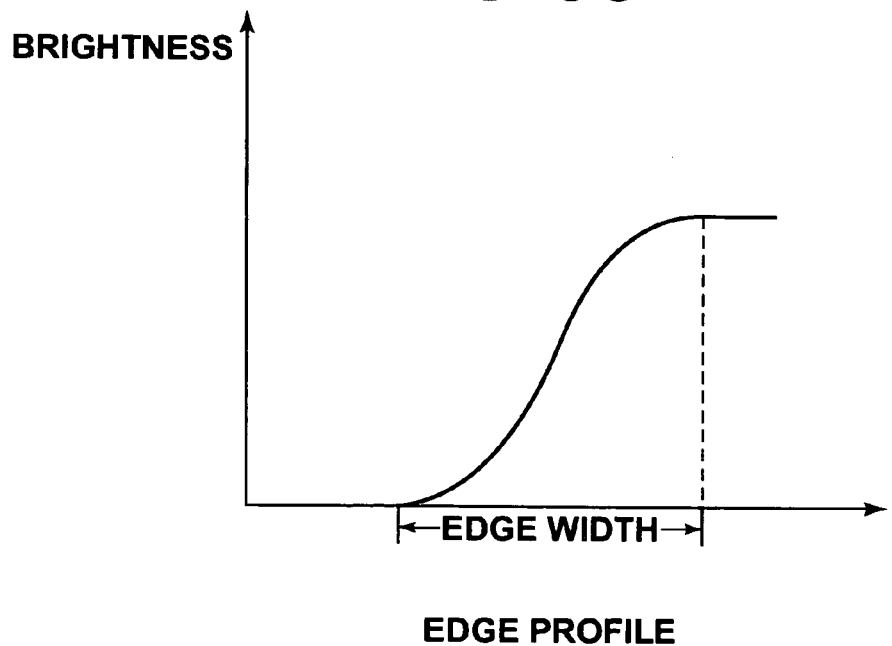
FIG. 39 is a drawing illustrating an edge profile.

The edge characteristic amount obtaining means 416 obtains an edge width as shown in FIG. 39 for each of the edges based on the edge profiles outputted from the edge restricting means 414, creates a histogram of edge widths as shown in FIG. 40 for each direction of the 8 directions shown in FIG. 38, and outputs the histograms together with the edge widths as edge characteristic amounts S to the analyzing means 420.

The analyzing means 420 mainly performs the following two processes.

1. Discriminates whether the object image is a blurred image or a normal image by calculating the blur direction and blur level N of the object image.
2. Calculates blur width L and camera shake level K if the object image is discriminated to be a blurred image.

Here, the first process will be described first.

The analyzing means 420 obtains a correlation value between the two histograms of edge widths (histograms) in each pair of directions which are orthogonal to each other in the 8 directions shown in FIG. 38 (1-5, 2-6, 3-7, 4-8) in order to obtain a blur direction on the object image. A variety of correlation values may be available depending on the method. They may be roughly categorized into two types: one in which the greater the correlation value, the less the strength of the correlation, and the other in which the correlation value is proportional to the strength of the correlation, that is, the greater the correlation value, the greater the strength of the correlation. In the present embodiment, a correlation value which is proportional to the strength of the correlation is used as an example. As shown in FIG. 41A, for the image with a camera shake blur, the correlation between the histogram of the direction of the camera shake blur and that of the direction which is orthogonal to the direction of the camera shake blur is small, whereas the correlation between the histograms of a set of orthogonal directions having no relation to the camera shake or between those of a set of orthogonal directions for an image without any camera shake blur (image without any blur or with defocus blur) is large as shown in FIG. 41B. Based on this fact, the analyzing means 420 of the image processing system AA according to the present embodiment is adapted to obtain the correlation value between the two histograms in each of the four direction pairs to find out two directions of the direction pair having the smallest correlation value between the two histograms thereof. If the image D has a camera shake blur, one of these two directions may be regarded as the direction which is closest to the direction of the camera shake blur among the 8 directions shown in FIG. 38.

FIG. 41C is a histogram of edge widths in the camera shake direction for the images of the same subject with a camera shake blur, with a defocus blur, and without any blur (defocus and camera shake blurs). As shown in FIG. 41C, the normal image without any blur has the smallest averaged edge width, that is, one of the two directions having a greater averaged edge width should be the direction closest to the direction of the camera shake.

In this way, the analyzing means 420 finds out a pair of directions having the smallest correlation, and discriminates one of the directions having a greater averaged edge width to be the blur direction.

Figure 42:
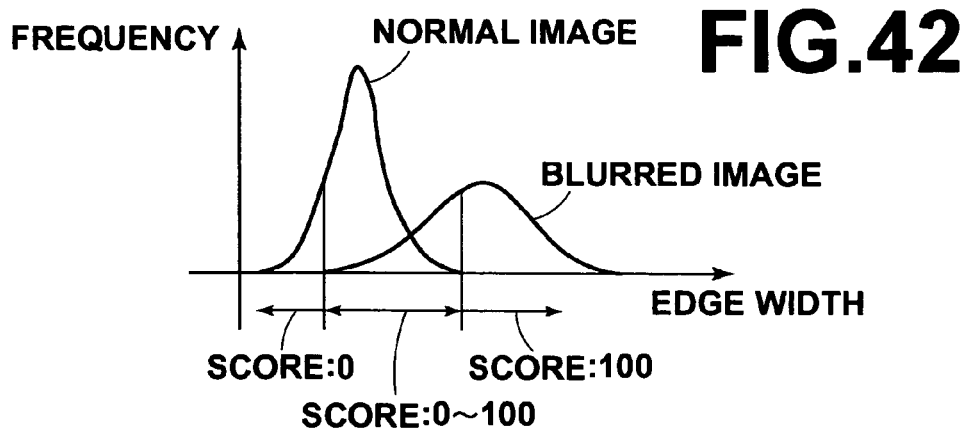
FIG. 42 is a drawing for describing how to calculate a blur level.

Then, the analyzing means 420 obtains the blur level N of the object image. The blur level of an image indicates the blurred level in the image. For example, the averaged edge width in the most heavily blurred direction (here, the blur direction obtained by the analyzing means 420 described above) may be used. Here, in the present embodiment, however, the blur level N is obtained more accurately by using each edge width of each of the edges in the blur direction and the database which is based on the FIG. 42. FIG. 42 shows the histograms of edge width distributions of blurred and normal images in the most heavily blurred direction (for the normal image, the direction corresponding to this direction is desirable, but any direction may be used) created based on a database of normal images for learning and that of blurred images, with the ratio of frequency (vertical axis in the FIG. 42) between the blurred and normal images for each edge width illustrated as the evaluated value (score in FIG. 42). A database of correlated edge widths with scores (score database) is created and stored in the storage means 450.

The analyzing means 420 obtains the score for each of the edges in the blur direction based on the edge width by referring to the database created based on FIG. 42 and stored in the storage means 450, and calculates the blur level N of the object image by averaging the scores of all the edges in the blur direction. If the blur level N so obtained is smaller than a predetermined threshold value T, the analyzing means 420 discriminates the object image to be a normal image and terminates its process after outputting information P indicating that the image D which is the original image of the object image is a normal image to the output means 460.

On the other hand, if the blur level N is greater than or equal to a predetermined threshold value T, the analyzing means 420 discriminates the object image to be a blurred image, and initiates the second process described above.

As the second process, the analyzing means 420 first obtains a camera shake level K of the object image. The camera shake level K that indicates the magnitude of the camera shake of the blur of the blurred image may be obtained based on the following elements.

1. The correlation value of the direction pair having the smallest correlation (the least correlated pair): the smaller the correlation value, the greater the camera shake level.

Figure 43A:
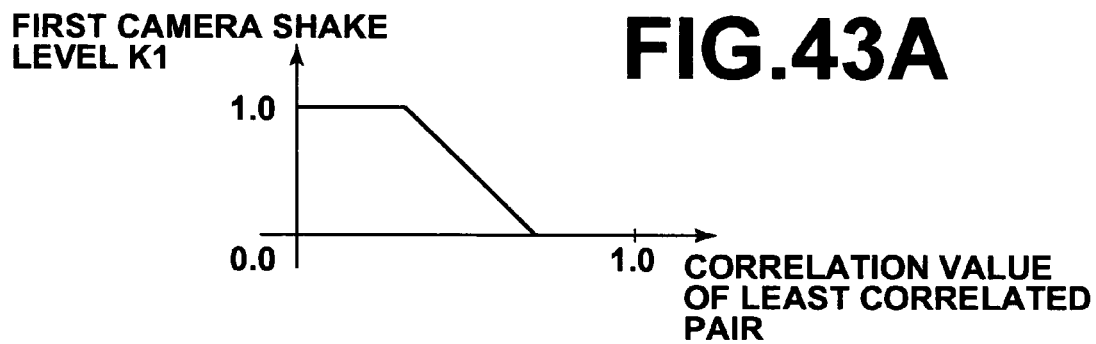
FIG. 43A is a drawing for describing how to calculate a camera shake level.

Focusing attention on this, the analyzing means 420 obtains a first camera shake level K1 based on the curve shown in FIG. 43A. Here, a loop-up table (LUT) based on the curve shown in FIG. 43A has already been stored in the storage means 450, and the analyzing means 420 obtains the first camera shake level K1 corresponding to the correlation value of the least correlated pair by reading it out from the storage means 450.

2. Averaged edge width in one of the directions having a greater averaged edge width in the least correlated pair: the greater the averaged edge width, the greater the camera shake level.

Figure 43B:
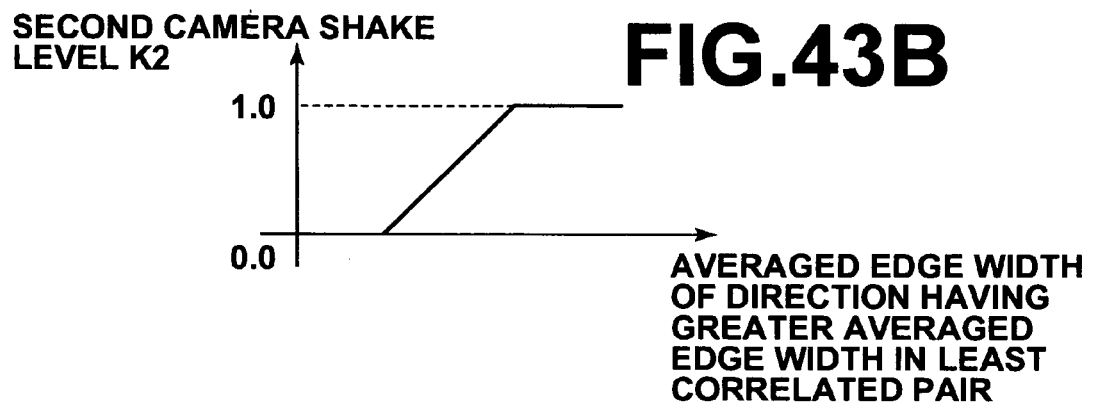
FIG. 43B is a drawing for describing how to calculate a camera shake level.

Focusing attention on this, the analyzing means 420 obtains a second camera shake level K2 based on the curve shown in FIG. 43B. Here, a loop-up table (LUT) based on the curve shown in FIG. 43B has already been stored in the storage means 450, and the analyzing means 420 obtains the second camera shake level K2 corresponding to the averaged edge width in one of the directions having a greater averaged edge width in the least correlated pair by reading it out from the storage means 450.

3. Difference in averaged edge width between the two directions in the least correlated pair: the greater the difference, the greater the camera shake level.

Figure 43C:
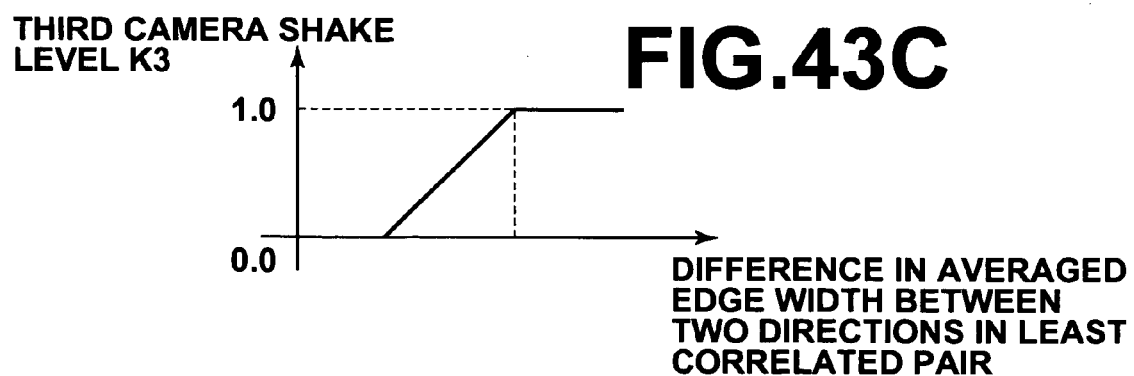
FIG. 43C is a drawing for describing how to calculate a camera shake level.

Focusing attention on this, the analyzing means 420 obtains a third camera shake level K3 based on the curve shown in FIG. 43C. Here, a loop-up table (LUT) based on the curve shown in FIG. 43C has already been stored in the storage means 450, and the analyzing means 420 obtains the third camera shake level K3 corresponding to the difference in averaged edge width between the two directions of the least correlated pair by reading it out from the storage means 450.

The analyzing means 420 obtains the first camera shake level K1, second camera shake level K2, and third camera shake level K3 in this way, and then obtains the camera shake level K of the blurred object image in accordance with the following formula using the values of K1, K2 and K3.

$$K = K1 \times K2 \times K3 \quad (5)$$

Where,
K: camera shake level
K1: first camera shake level
K2: second camera shake level
K3: third camera shake level Then, the analyzing means 420 obtains the blur width L of the blurred object image. Here, the analyzing means 420 may be adapted to obtain the averaged edge width in the blur direction or to obtain the averaged edge width in the 8 directions shown in FIG. 38 as the blur width L regardless of camera shake level K.

The analyzing means 420 transmits the camera shake level K and blur width L obtained in this way for the object image together with the blur level N and blur direction as the blur information Q to the parameter setting means 430.

The image processing system AA according to the present embodiment is a system for implementing image correction according to the unsharpness masking method (USM). The parameter setting means 430 sets a one-dimensional correction mask M1 that will act on the bur direction based on the blur width L and blur direction such that the greater the blur width L, the greater the size of the correction mask, and a two-dimensional correction mask M2 for isotropic correction based on the blur width L such that the greater the blur width L, the greater the size of the correction mask. Here, the two-dimensional masks corresponding to respective blur widths and one-dimensional mask corresponding to respective blur widths and directions are stored in the storage means 450 as a database (mask database). The parameter setting means 430 obtains a one-dimensional correction mask M1 based on the blur width L and direction, and two-dimensional correction mask M2 based on the blur width L from the mask database.

Next, the parameter setting means 430 sets a one-dimensional correction parameter W1 for directional correction and two-dimensional correction parameter W2 for isotropic correction based on the following formula.

$$W1 = N \times K \times M1$$

$$W2 = N \times (1-K) \times M2 \quad (6)$$

where,
W1: one-dimensional correction parameter
W2: two-dimensional correction parameter
N: blur level
K: camera shake level
M1: one-dimensional correction mask
M2: two-dimensional correction mask That is, the parameter setting means 430 sets the correction parameters W1 and W2 (collectively referred to as parameter E0) such that the greater the blur level N, the greater the isotropic and directional correction levels, and the greater the camera shake level K, the heavier the weighting of the directional correction.

Here, the parameter setting means 430 performs adjustments to the blur level N, camera shake level K, correction masks M1 and M2 for the parameter E0. Then, it obtains a plurality of correction parameters E1, E2, and so on, which are different from the correction parameter E0, in accordance with the formula (6) using the adjusted blur levels N, camera shake levels K, correction masks M1 and M2.

Thereafter, the parameter setting means 430 outputs correction parameters E (E0, E1, E2 and so on) so obtained to the correcting means 440.

The correcting means 440 performs image correction on the image D by applying each of the parameters E0, E1, E2 and so on to obtain the corrected images D'0, D'1, D'2 and so on, each corresponding to each of the correction parameters E0, E1, E2 and so on.

The determining means 445 comprises a display means (not shown) for displaying each of the corrected images obtained by the correcting means 440 and an input means (not shown) for having the user to select a corrected image desired by the user among the corrected images displayed. It determines the image selected by the user from the corrected images D'0, D'1, D'2 and so on as the intended image D', and outputs it to the output means 460.

The output means 460 outputs the image D when the information P indicating that the image D is a normal image is received from the analyzing means 420, or outputs the intended image D' when it is received from the determining means 445. In the image processing system according to the present embodiment, "outputting" by the output means 460 means printing. The output means 460 obtains a printed image by printing out a normal image D and desired image D' obtained through correcting a blurred image D. However, The output means 460 may be a means for recording the normal image D and desired image D' on a recording medium, or transmitting them to an image storage server on the network or to the address on the network designated by the user who has made a request for the image correction.

Figure 54:
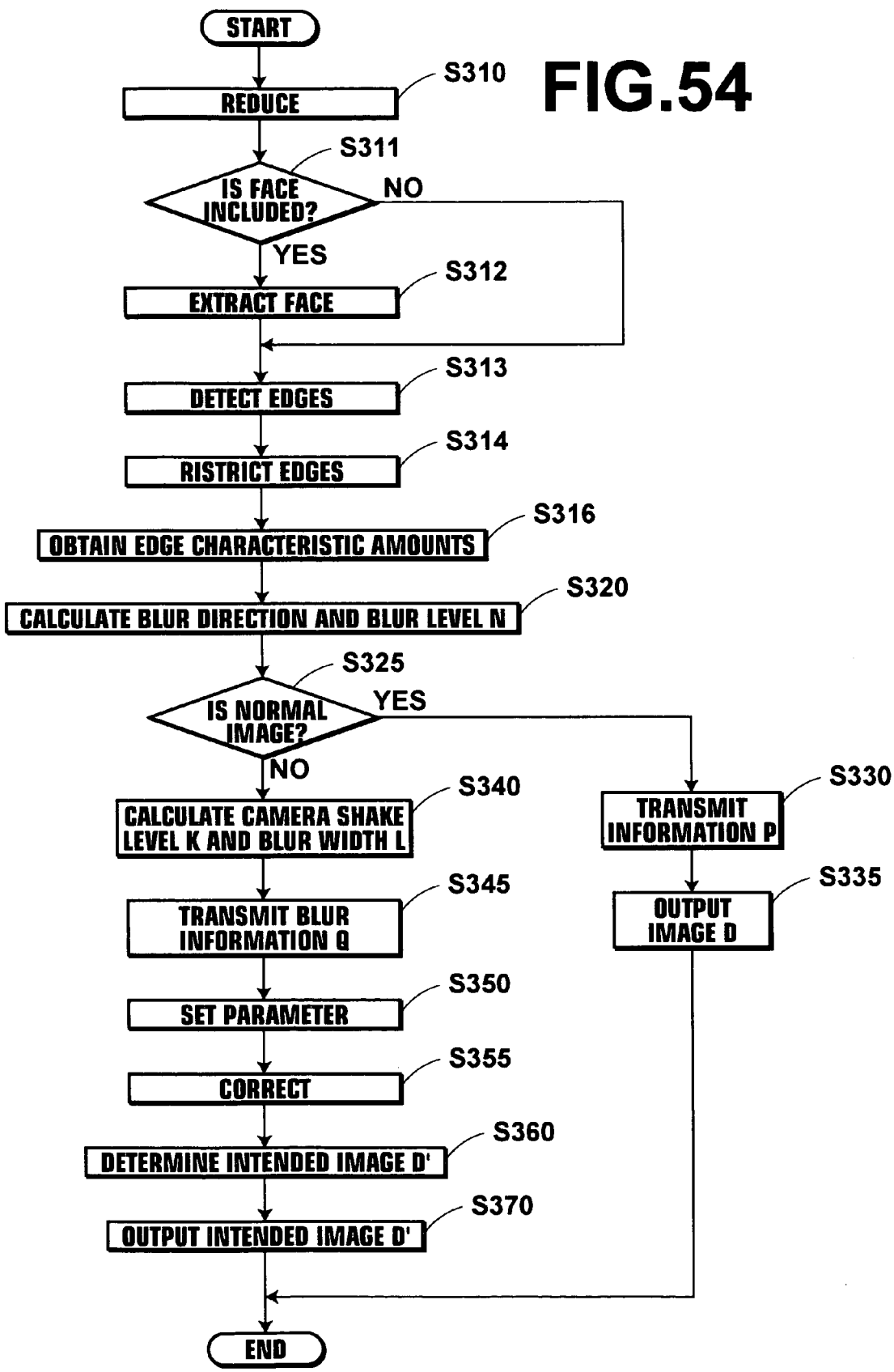
FIG. 54 is a flow chart illustrating the operation of the image processing system AA according to the embodiment shown in FIG. 35.

FIG. 54 is a flow chart illustrating the operation of the image processing system AA according to the present embodiment. As shown in the drawing, the image D read out from the recording medium 1 is first reduced with a reduction ratio of, for example, ⅛ to obtain a reduced image d of the image D by the reducing means 410a (S310). The face discriminating, means 500 perform discrimination whether the reduced image d includes a face (S311). If a face is included in the reduced image d (S311=YES), it extracts a face image d0 (or face images d0 if a plurality of faces included) and outputs it to the edge detecting means 412. If no face is detected (S311=NO), it outputs the reduced image d to the edge detecting means 412 as it is. In detecting edges, the edge detecting means 412 first selects the image d2 (the image outputted from the face extracting means if it is the only image outputted therefrom, or image d0 having the greatest number of pixels among a plurality of images if the plurality of images d0 are outputted from the face extracting means) for detecting edges, and reduces the object image (non-reduced image corresponding to the image d2) with the reduction ratio according to the number of pixels of the object image to obtain the reduced image d3. Then, the edge detecting means 412 detects edges having intensities greater than or equal to a predetermined threshold value in each direction of 8 directions shown in FIG. 38 using the reduced image d3 to obtain the coordinates of the edges. Then, the edge detecting means 412 creates an edge profile as shown in FIG. 39 for each of the edges using the object image (non-reduced image) that corresponds to the reduced image d3 based on the coordinates of each of the edges detected in each direction, and outputs the edge profiles to the edge restricting means 414 (S313). The edge restricting means 414 eliminates invalid edges based on the edge profiles outputted from the edge detecting means 412 and outputs the profiles of the remaining edges to the edge characteristic amount obtaining means 416 (S314). The edge characteristic amount obtaining means 416 obtains an edge width for each of the edges based on the edge profiles outputted from the edge restricting means 414, creates a histogram of edge widths for each direction of the 8 directions shown in FIG. 38, and outputs the histograms together with the edge widths as edge characteristic amounts S to the analyzing means 420 (S316). The analyzing means 420 first calculates the blur direction and blur level N of the object image using the edge characteristic amounts S (S320), and discriminates whether the object image is a blurred image or a normal image (S325). If the object image is a normal image (S325=YES), the analyzing means 420 outputs information P indicating that the image D which is the original image of the object image is a normal image to the output means 460 (S330), and the output means 460 obtains a printed image by printing out the image D when the information P is received (S335).

On the other hand, if the object image is discriminated to be a blurred image in step 325 (S325=NO), it further calculates the camera shake level K and blur width L of the object image (S340), and outputs them to the parameter setting means 430 together with the blur level N and blur direction that have been obtained in step 320 as the blur information Q (S345). The parameter setting means 430 obtains a one-dimensional correction parameter W1 and two-dimensional parameter W2 based on the blur information Q from the analyzing means 420. Here, the pair of correction parameters W1 and W2 so obtained is referred to as the correction parameter E0. The parameter setting means 430 further performs adjustments to the blur level N, camera shake level K, mask size of the correction masks M1 and M2, and the like to further obtain a plurality of correction parameters E1, E2 and so on, and outputs them to the correcting means 440 (S350).

The correcting means 440 performs image correction on the image D by applying each of the correction parameters E0, E1, E2 and so on to obtain corrected images D'0, D'1, D'2 and so on, each corresponding to each of the correction parameters (S355).

The determining means 445 controls the display means (not shown) to display each of the corrected images obtained by the correcting means 440, and determines one of the corrected images selected by the user through the input means (not shown) as the intended image D' and outputs it to the output means 460 (S360).

The output means 460 obtains a printed image by printing out the intended image D' sent from the determining means 445 (S370).

In this way, according to the image processing system AA of the present embodiment, image blurs are corrected by obtaining the blur information from a digital photograph image, so that the image blurs may be corrected without requiring any special device for obtaining the blur information at the time of imaging.

Further, image blurs are corrected by setting correction parameters based on the blur information, so that no cut and try process of repeating parameter setting, image correction, image valuation, and parameter resetting is required, so that the image processing system AA according to the present embodiment provides a high efficiency in performing the image correction.

Further, the blur information is obtained using only the main subject region (here, a face as an example) of the digital photograph image, so that no user involvement is required for determining the region for obtaining the blur information.

Still further, the correction parameters are set by obtaining the blur information using the image of the main subject region, so that the image correction may be implemented with high accuracy for the images with shallow depth of fields.

Figure 55:
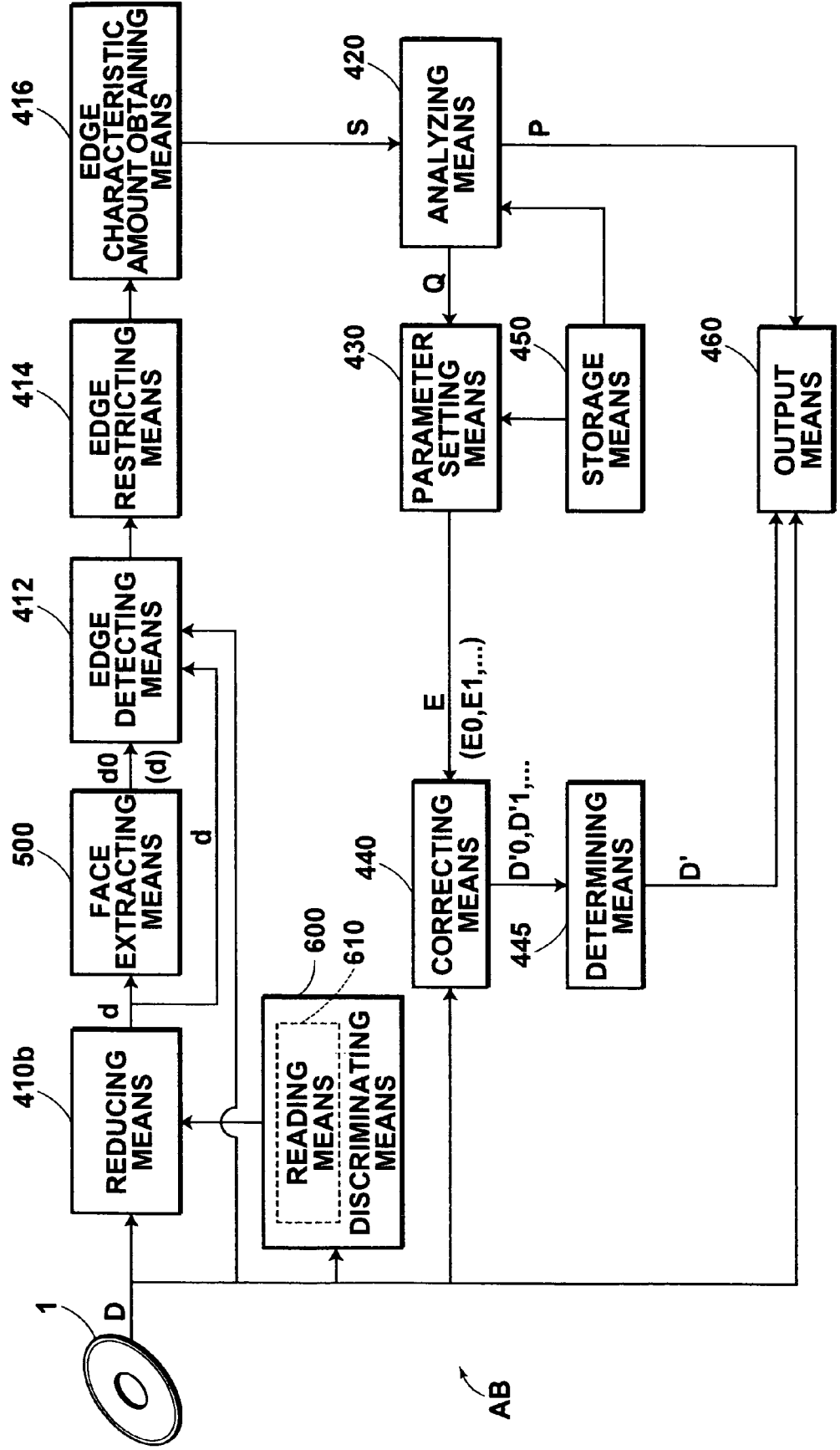
FIG. 55 is a block diagram illustrating the configuration of an image processing system AB according to a sixth embodiment of the present invention.

FIG. 55 is a block diagram of an image processing system AB according to a sixth embodiment of the present invention. As shown in the drawing, the image processing system AB according to the present invention differs from the image processing system AA shown in FIG. 35 only in that it has a reducing means 410*b* which is different from the reducing means 410*a*, and further comprises a discriminating means 600. In the FIG. 55, the identical components to those of the image processing system AA shown in FIG. 35 are given the same reference numerals, and only the reducing means 410*b* and additional discriminating means 600 will be described here.

The discriminating means 600 of the image processing system AA shown in FIG. 55 is a means for reading the tag information to the image D and discriminating whether the image D is an image with a shallow depth of field based on the tag information. More specifically, the discriminating means 600 obtains the F number of the camera used to obtain the image D by reading the tag information by a reading means 610 provided therein, discriminates the image D as an image with a shallow depth of field, if the F number is smaller than or equal to a predetermined threshold value (e.g., 5.6) or not to be an image with a shallow depth of field, if the F number is greater than the predetermined threshold value, and outputs the information indicating the discrimination results to the reducing means 410*b*. If the image D has no tag information, or if the tag information of the image D does not include the F number, the discriminating means 600 outputs the discrimination results to the reducing means 410*b* indicating that no F number is available.

The reducing means 410*b* reduces the image D with a reduction ratio of, for example, ⅛ to obtain a reduced image d of the image D, and outputs the reduced image d to the face extracting means 500 or edge detecting means according to the discrimination results provided by the discriminating means 600. More specifically, the reducing means 410*b* outputs the reduced image d of the image D to the face extracting means 500, if the determination result from the discriminating means 600 indicates that the image D is an image with a shallow depth of field or the image D has no information related to the F number. If the determination result indicates that the image D is not an image with a shallow depth of field, then it outputs the reduced image d of the image D to the edge detecting means 412.

Figure 56:
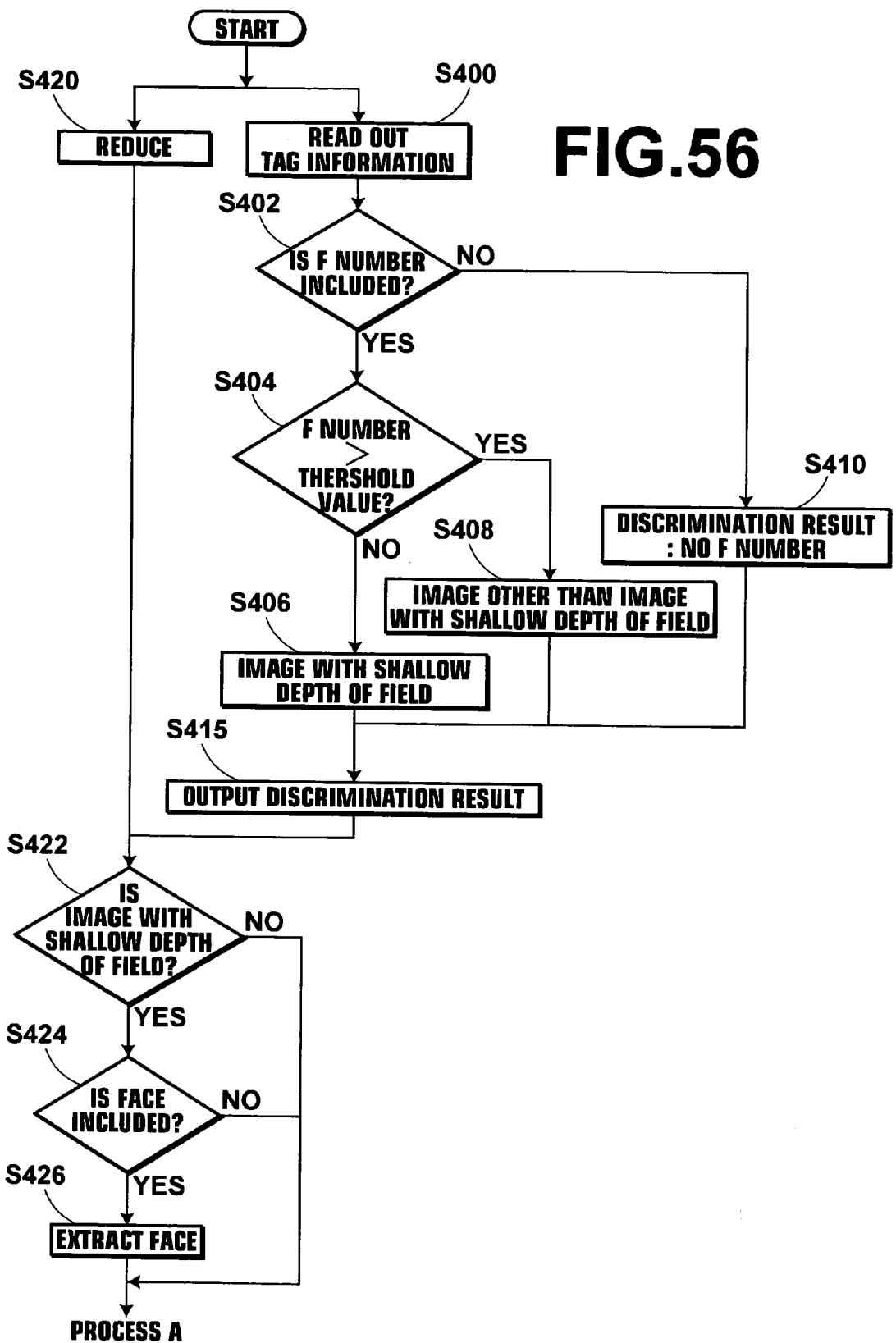
FIG. 56 is a flow chart illustrating the operation of the image processing system AB shown in FIG. 55 (part 1).
Figure 57:
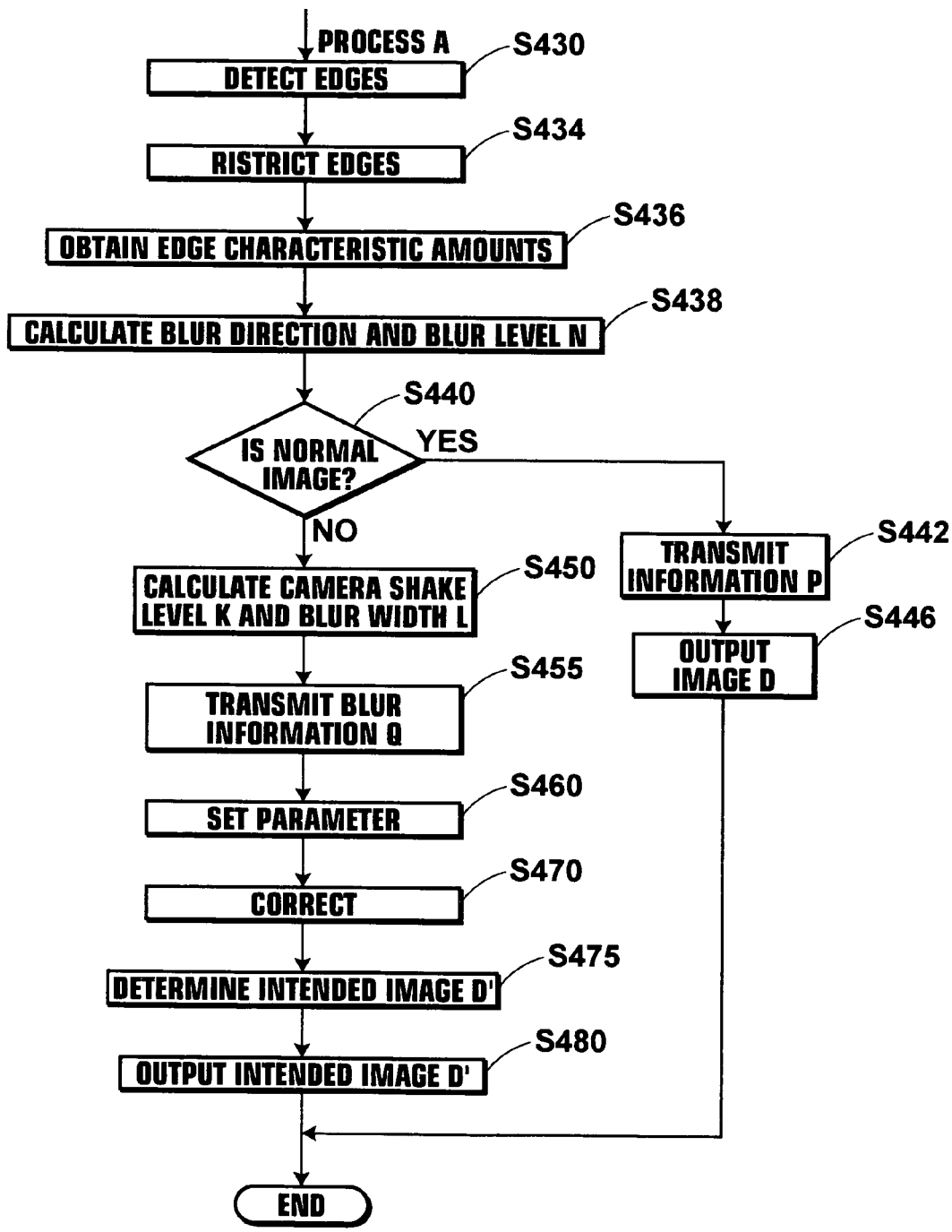
FIG. 57 is a flow chart illustrating the operation of the image processing system AB shown in FIG. 55 (part 2).

Each of FIGS. 56 and 57 is a part of a flow chart illustrating the operation of the image processing system AB according to the present embodiment shown in FIG. 55. As shown in FIG. 56, the image D read out from the recording medium 1 is first discriminated whether it is an image with a shallow depth of field by the discriminating means 600 (S400 to S415). More specifically, the reading means 610 of the discriminating means 600 checks to see if the image D has the tag information attached thereto, and if the information is attached thereto, it further checks to see if the F number of the lens of the camera used to obtain the image D is included in the information (S402). If the image D has no tag information attached thereto, or if the tag information does not include the F number (S402=NO), the discriminating means outputs the discrimination result of "no F number" to the reducing means 410*b* (S415). On the other hand, if the tag information is attached to the image D and the image D includes the F number (S402=YES), the discriminating means 600 compares the F number obtained by the reading means 610 with the threshold value described above (S404). If the F number is smaller than or equal to the threshold value (S404=NO), the discriminating means 600 discriminates the image D to be an image with a shallow depth of field (S406). If the F number is greater than the threshold value, it discriminates the image D not to be an image with a shallow depth of field (S408), and outputs the information of the discrimination results to the reducing means 410*b* (S415).

The reducing means 410*b* performs a reducing process on the image D to obtain a reduced image d. Then, based on the discrimination results from the discriminating means 600, it outputs the reduced image in the following manner. That is, if the image D is an image with a shallow depth of field, or F number information for the image D is not included (S422=YES), it outputs the reduced image d of the image D to the face extracting means 500, and if the image D is not an image with a shallow depth of field, it outputs the reduced image d to the edge detecting means 412 as it is. The face extracting means 500 discriminates whether the reduced image d includes a face (S424), and if a face is included (S424=YES), it extracts a face image d0 (or face images d0 if a plurality of faces are included) and outputs it to the edge detecting means 412. On the other hand, if no face is detected (S424=NO), it outputs the reduced image d to the edge detecting means 412 as it is. The process steps following the step 412 are continued by the referent of "process A" to the flow chart illustrated in FIG. 57.

As shown in FIG. 57, in detecting edges, the edge detecting means 412 first selects the image d2 (the image outputted from the face extracting means if it is the only image outputted therefrom, or image d0 having the greatest number of pixels among a plurality of images if the plurality of images d0 are outputted from the face extracting means) for detecting edges, and reduces the object image (non-reduced image corresponding to the image d2) with the reduction ratio according to the number of pixels of the object image to obtain the reduced image d3. Then, the edge detecting means 412 detects edges having intensities greater than or equal to a predetermined threshold value in each direction of the 8 directions shown in FIG. 38 using the reduced image d3 to obtain the coordinates of the edges. Then, the edge detecting means 412 creates an edge profile as shown in FIG. 39 for each of the edges using the object image (non-reduced image) that corresponds to the reduced image d3 based on the coordinates of each of the edges detected in each direction, and outputs the profiles to the edge restricting means 414 (S430). The edge restricting means 414 eliminates invalid edges based on the edge profiles outputted from the edge detecting means 412 and outputs the profiles of the remaining edges to the edge characteristic amount obtaining means 416 (S434). The edge characteristic amount obtaining means 416 obtains an edge width for each of the edges based on the edge profiles outputted from the edge restricting means 414, creates a histogram of edge widths for each direction of the 8 directions shown in FIG. 38, and outputs the histograms together with the edge widths as edge characteristic amounts S to the analyzing means 420 (S436). The analyzing means 420 first calculates the blur direction and blur level N of the object image using the edge characteristic amounts S (S438), and discriminates whether the object image is a blurred image or a normal image (S440). If the object image is a normal image (S440=YES), the analyzing means 420 outputs information P indicating that the image D which is the original image of the object image is a normal image to the output means 460 (S442), and the output means 460 obtains a printed image by printing out the image D when the information P is received (S446).

On the other hand, if the object image is discriminated to be a blurred image in step 440 (S440=NO), it further calculates the camera shake level K and blur width L of the object image (S450), and outputs them to the parameter setting means 430 together with the blur level N and blur direction that have been obtained in step 438 as the blur information Q (S455). The parameter setting means 430 obtains a one-dimensional correction parameter W1 and two-dimensional parameter W2 based on the blur information Q from the analyzing means 420. Here, the pair of correction parameters W1 and W2 so obtained is referred to as the correction parameter E0. The parameter setting means 430 further performs adjustments to the blur level N, camera shake level K, mask size of the correction masks M1 and M2, and the like to further obtain a plurality of correction parameters E1, E2 and so on, and outputs them to the correcting means 440 (S460).

The correcting means 440 performs image correction on the image D by applying each of the correction parameters E0, E1, E2 and so on to obtain corrected images D'0, D'1, D'2 and so on, each corresponding to each of the correction parameters (S470).

The determining means 445 controls the display means (not shown) to display each of the corrected images obtained by the correcting means 440, and determines one of the corrected images selected by the user through the input means (not shown) as the intended image D' and outputs it to the output means 460 (S475).

The output means 460 obtains a printed image by printing out the intended image D' sent from the determining means 445 (S480).

In this way, the image processing system AB of the present embodiment may provide similar image correction effect to that of the image processing system AA shown in FIG. 35. Further, in the image processing system AB, digital photograph images are first discriminated whether they are images with shallow depth of fields. Then the image correction is performed in the following manner. That is, only for the digital photograph images that have been discriminated not to be the images with shallow depth of fields, the image correction is performed by setting the correction parameters using the entire digital photograph image, and for other digital photograph images, the image correction is performed by setting the correction parameters using the image of the main subject region. Thus, the accuracy of the image correction for digital photograph images which are not the images with shallow depth of fields may be improved.

Figure 58:
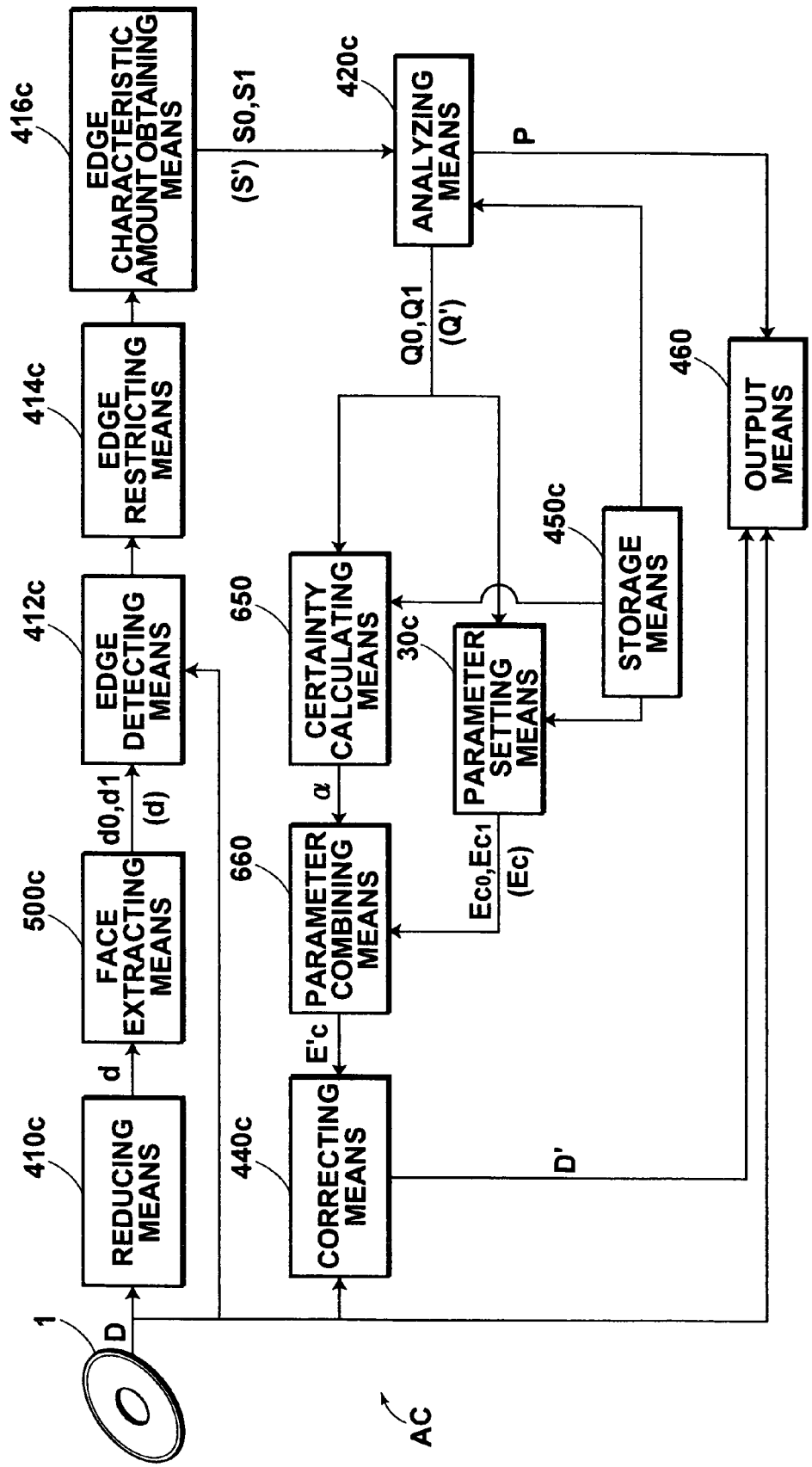
FIG. 58 is a block diagram illustrating the configuration of an image processing system AC according to a seventh embodiment of the present invention.

FIG. 58 is a block diagram of an image processing system AC according to a seventh embodiment of the present invention. As shown in the drawing, the image processing system AC according to the present embodiment comprises: a reducing means 410c for reducing the image D read out from the recording medium 1 to obtain a reduced image d of the image D; a face extracting means 500c for detecting a main subject (a face as an example) on the reduced image d, and extracting a face portion image (face image) d0 and an image d1 which is the image of other than the face portion to output them to an edge detecting means 412c to be described later, if a face is detected, or outputting the reduced image d0 to an edge detecting means 412c if no face is detected; an edge detecting means 412c for detecting edges using a reduced image for edge detection (details will be provided later) obtained based on the image outputted from the face extracting means 500c and a non-reduced image (object image) corresponding to the reduced image for edge detection; an edge restricting means 414c for eliminating invalid edges from among those detected by the edge detecting means 412c; an edge characteristic amount obtaining means for obtaining characteristic amounts (three types of S0, S1 and S', which will collectively referred to as the characteristic amounts S for the object image) for the edges obtained by the edge restricting means 414; an analyzing means 420c for discriminating whether the image D is a blurred image or a normal image by calculating a bur direction and blur level N using the edge characteristic amounts S, and transmitting information P indicating that the image D is a normal image to an output means 460 to be described later, if the image D is discriminated to be a normal image and thereafter terminating the step, or further calculating a camera shake level K and blur width L and transmitting them with the blur level N and blur direction as blur information Q to a parameter setting means 430c and a certainty factor calculating means 650, to be described later, if the image D is discriminated to be a blurred image; a parameter setting means 430c for setting parameters for correcting the blurred image D based on the blur information Q outputted from the analyzing means 420c and outputting them to a parameter combining means 660 or a correcting means 440c, to be described later; a certainty factor calculating means 650 for calculating a certainty factor α that indicates the likelihood that the image D is an image with a shallow depth of field; a parameter combining means 660 for combining the parameters outputted from the parameter setting means 430c based on the certainty factor α calculated by the certainty factor calculating means 650 to obtain a combined parameter and outputting it to a correcting means 440c; a correcting means 440c for correcting the image D using the parameters outputted from the parameter setting means 430c, or the parameter outputted from the parameter combining means 660 to obtain a corrected image and outputting it as the intended image D' to an outputting means 460; a storage means 450c containing various databases for the analyzing means 420c, parameter setting means 430c, and certainty factor calculating means 650; and an output means 460 for outputting the image D when the information P indicating that the image D is a normal image is received from the analyzing means 420c, or outputting the intended image D' when the intended image D' is received from the correcting means 440c.

The reducing means 410c is identical to the reducing means 410a of the image processing system AA shown in FIG. 35. It reduces the image D with a reduction ratio of, for example, ⅛ to obtain a reduced image d.

The face extracting means 500c is similar to the face extracting means 500 of the image processing system AA shown in FIG. 35, in that it discriminates whether a face is included in the reduced image d, and if a face is included in the reduced image d, it extracts a face image d0 (or face images d0 if a plurality of faces are included) and outputs it to the edge detecting means 412c, or if no face is included in the reduced image d, it outputs the reduced image d to the edge detecting means 412c. However, it differs from the face extracting means 500, in that it extracts not only the face image d0 but also the image d1 of other than the face portion to output them to the edge detecting means 412c, if a face is included in the reduced image d. The method of discriminating whether a face is included in the image, and the method for extracting a face if it is included in the reduced image d are identical to those employed in the image processing system AA shown in FIG. 35, and will not be elaborated upon further here.

As described above, the images to be outputted to the edge detecting means 412c are the image d0 (one or more than one) and the reduced image d1 which is the image other than the image d0 when a face is detected on the reduced image d, and if no face is detected it is the reduced image d. If a plurality of face images d0 are outputted (in this case, the reduced image d1 is also outputted) from the face extracting means 500c, the edge detecting means 412c selects the image d0 having the greatest number of pixels among the plurality of face images d0. It also obtains a new reduced image (hereinafter, the same reference numeral d1 is used to facilitate the description) by combining the face images d0, which have not been selected, with the reduced image d1 described above. Based on both of the face image d0 and reduced image d1 (if only one face image d0 is outputted to the edge detecting means 412c, that face image d0 and reduced image d1, or if a plurality of face images d0 are outputted thereto, the selected face image d0 and new reduced image d1) or reduced image d, the edge detecting means 412c reduces the non-reduced image (face image D0 and image D1 which is other than the face, or image D, which will be referred to as the object image) that corresponds to the face image d0 and reduced image d1, or reduced image d respectively with a reduction ratio according to the number of pixels of the object image to obtain a reduced image for edge detection. The method of determining the reduction ratio is identical to that employed in the reduction ratio determining means 413a of the edge detecting means 412 in the image processing system AA, and will not be elaborated upon further here. The edge detecting means 412c extracts edges using the reduced image so obtained and creates edge profiles using the object image. The operation of the edge detecting means 412c is similar to that of the edge detecting means 412 except that there are two images (face image d0 (D0) and image d1 of other than the face portion) for detecting edges, and will not be elaborated upon further here.

The same applies to the edge restricting means 414c, edge characteristic amount obtaining means 416c, and analyzing means 420c.

In this way, when a face is detected on the reduced image d, edge characteristic amounts S0 for the face image D0 and edge characteristic amounts S1 for the image D1 of other than the face portion are obtained and outputted to the analyzing means 420c, and when no face is detected on the reduced image d, the edge characteristic amounts S' for the image D is obtained and outputted to the analyzing means 420c.

When the edge characteristic amounts S0 and S1 are outputted from the edge characteristic amount obtaining means 416c, the analyzing means 420c first calculates the blur direction and blur level N for the face image D0, which corresponds to the edge characteristic amounts S0, based on the edge characteristic amounts S0. If the blur level N so obtained is smaller than a predetermined threshold value T, the analyzing means 420c discriminates the image D to be a normal image and terminates its process after outputting information P indicating that the image D is a normal image to the output means 460. If the blur level N is greater than or equal to a predetermined threshold value T, the analyzing means 420c discriminates the image D that corresponds to the face image D0 to be a blurred image, and further calculates a camera shake level K and blur width L of the face image D0, which, together with the blur direction and blur level N, are referred to as blur information Q0. It also calculates the blur direction, blur level N, camera shake level K, and blur width for the image D1, which is the image of other than the face portion using the edge characteristic amounts S1 of the image D1, which is referred to as the blur information Q of the image D1.

On the other hand, when the edge characteristic amounts S' is outputted from the edge characteristic amount obtaining means 416c, the analyzing means 420c first calculates the blur direction and blur level N for the image D based on the edge characteristic amounts S'. If the blur level N so obtained is smaller than a predetermined threshold value T, the analyzing means 420c discriminates the image D to be a normal image and terminates its process after outputting information P indicating that the image D is a normal image to the output means 460. If the blur level N is greater than or equal to the predetermined threshold value T, the analyzing means 420 discriminates the image D to be a blurred image, and further calculates a camera shake level K and blur width L of the image D, which, together with the blur direction and blur level N, are referred to as blur information Q'.

The analyzing means 420c outputs the blur information Q0 calculated based on the edge characteristic amounts S0 of the face image D0, and blur information Q1 calculated based on the edge characteristic amounts S1 of the image D1 of other than the face portion to certainty factor calculating means 650 and parameter setting means 430c. While, it outputs the blur information Q' calculated using the image D only to the parameter setting means 430c.

Like image processing system AA and image processing system AB, the image processing system AC according to the present embodiment is a system for implementing image correction for the image D using the unsharpness masking method (USM). The parameter setting means 430c sets image correction parameters for correcting the image D by referring to the storage means 450c based on the blur information Q (Q0 and Q1, or Q') outputted from analyzing means 420c as in the parameter setting means 430 of the image processing system AA and image processing system AB. When both of the blur information Q0 and Q1 are outputted from the analyzing means 420c, the parameter setting means 430c sets parameters Ec0 and Ec1 using the blur information Q0 and Q1 respectively, and outputs them to the parameter combining means 660. When only the blur information Q' is outputted from the analyzing means 420c, the parameter setting means 430c sets a parameter Ec using the blur information Q', and outputs it to the correcting means directly.

The certainty factor calculating means 650 obtains a certainty factor α that indicates the likelihood that the image D is an image with a shallow depth of field based on the blur information Q0 and Q1. The certainty factor calculating means 650 may obtain the certainty factor α using all or part of the information included in the blur information. Here, in the present embodiment, the certainty factor α is to be calculated using only the blur level N included in the blur information as an example. More specifically, if the blur level N included in the blur information Q0 is greater than that included in the blur information Q1, or if the blur level N included in the blur information Q0 is smaller than that included in the blur information Q1 and the difference between the two blur levels N (delta obtained by subtracting the blur level N included in the blur information Q0 from the blur level N included in the blur information Q1) is smaller than a first threshold value, the certainty factor α is calculated to be 0%. If the difference between the two blur levels N is greater than or equal to a second threshold value which is greater than the first threshold value, the certainty factor α is defined to be 100%. If the difference between the two blur levels N lies between the first and second threshold values, the certainty factor is calculated such that the greater the difference, the greater the certainty factor α within the range from 0% to 100%. The table that indicates the relationship between the difference in the blur level and certainty factor α is stored in the storage means 450c, and the certainty factor calculating means 650 determines the factor by referring to the table.

The parameter combining means 660 calculates a combined parameter E'c according to the following formula (3) using the parameters Ec0 and Ec1 set by the parameter setting means 430c and certainty factor α determined by the certainty factor calculating means 650, and outputs it to the correcting means 440c.

$$E'c = \alpha \times Ec0 + (1-\alpha) \times Ec1 \tag{3}$$

Where,
- E'c: combined parameter
- Ec0: parameter set using an image of a face portion
- Ec1: parameter set using an image of other than the face portion
- α: certainty factor that indicates the likelihood that the image D is an image with a shallow depth of field.

As the formula (3) indicates, the parameter combining means 660 obtains the combined parameter E'c through weighting addition of the parameter Ec0 which has been set using an image of a face portion and the parameter Ec1 which has been set using an image of other than the face portion based on the certainty factor α that indicates the likelihood that the image D is an image with a shallow depth of field such that the greater the certainty factor α, the heavier the weighting of the parameter Ec0.

The correcting means 440c performs image correction on the image D using the parameter Ec, which has been set using the entire region of the image D, outputted from the parameter setting means 430c, or the combined parameter E'c outputted from the parameter combining means 660 to obtain an corrected image D'.

The output means 460 is identical to the output means 460 employed in the image processing system AA or image processing AB, and will not be elaborated upon further here.

Figure 59:
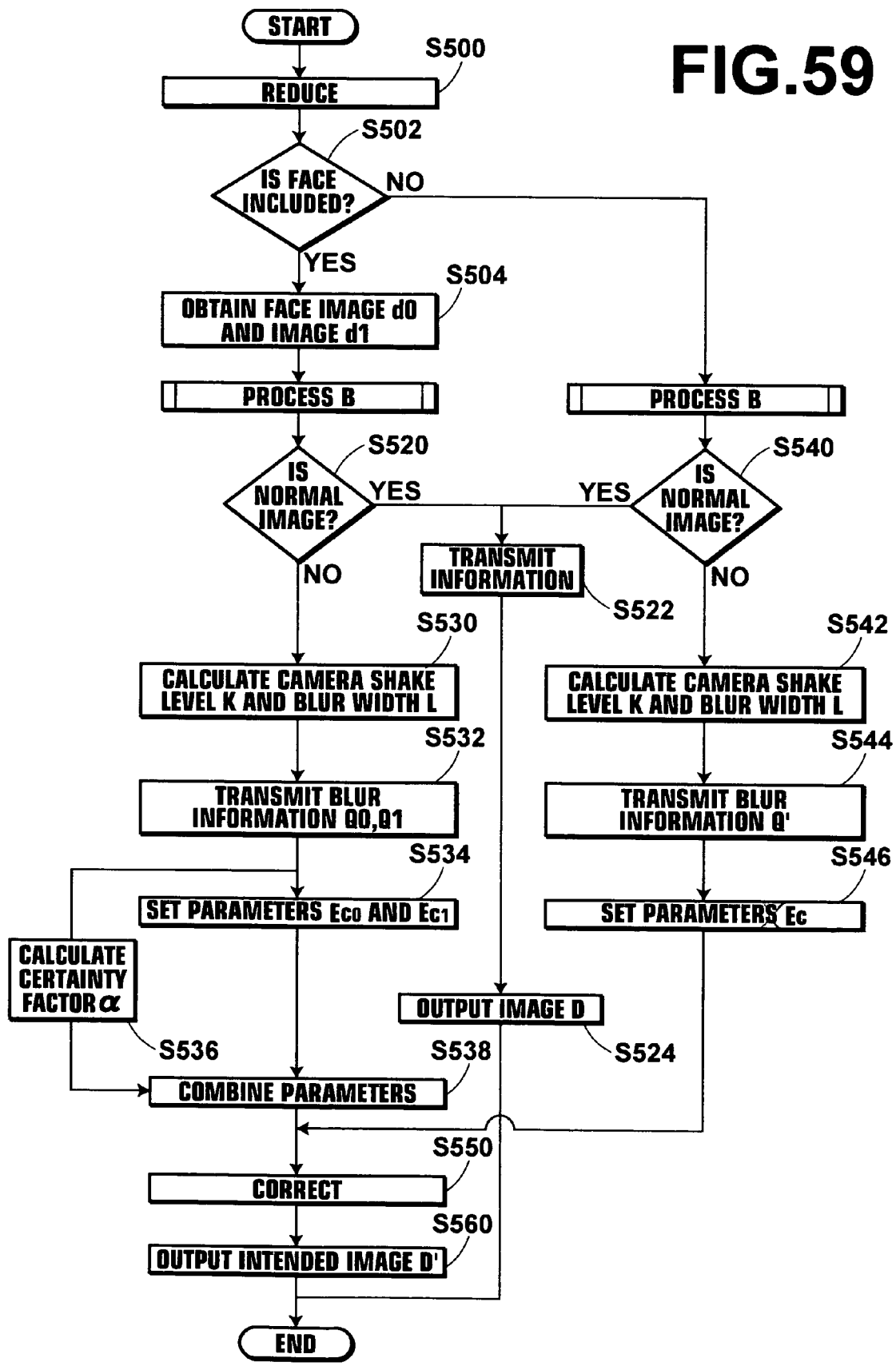
FIG. 59 is a flow chart illustrating the operation of the image processing system AC shown in FIG. 58 (part 1).
Figure 60:
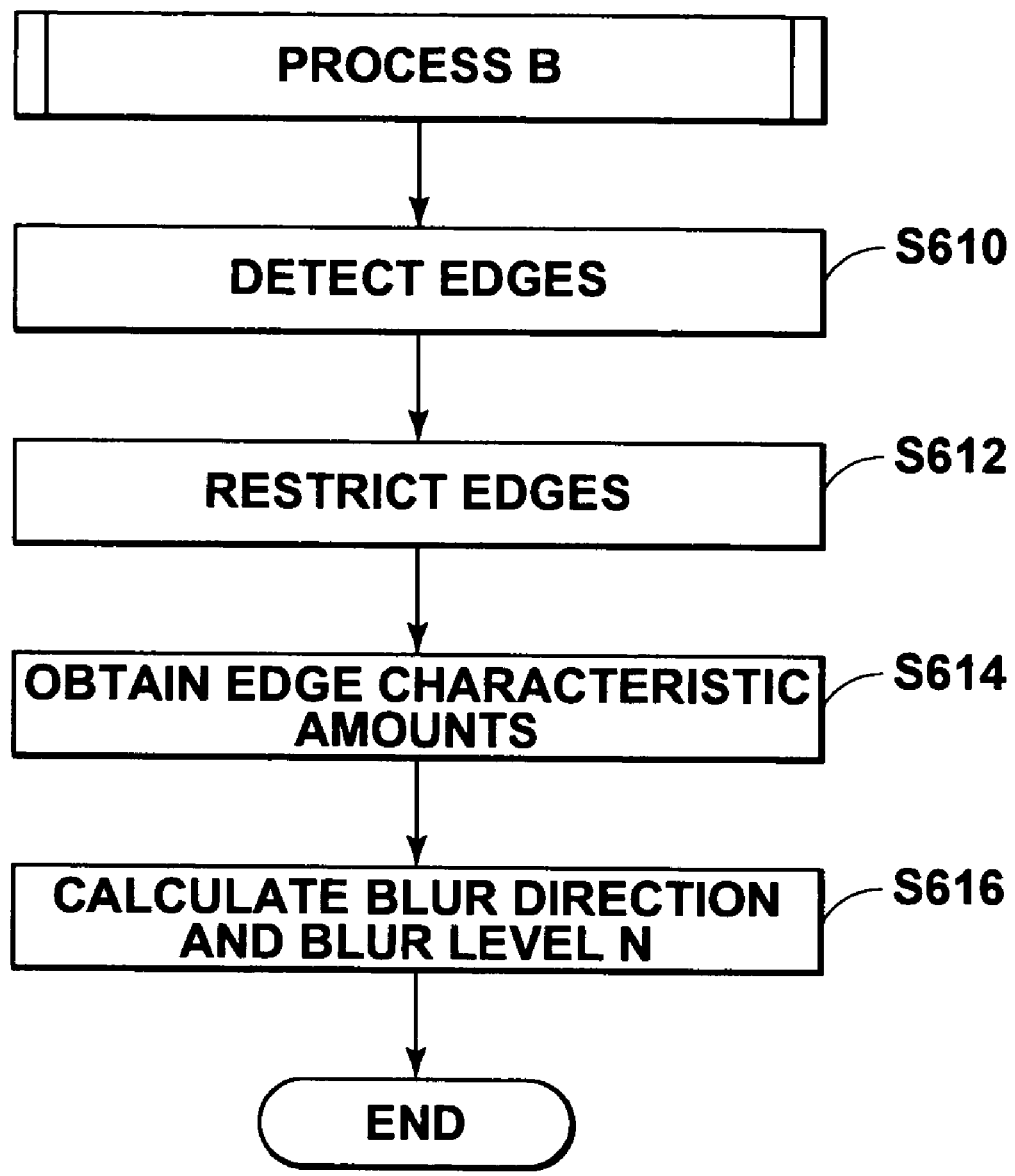
FIG. 60 is a flow chart illustrating the operation of the image processing system AC shown in FIG. 58 (part 2).

Each of FIGS. 59 and 60 is a part of a flow chart illustrating the operation of the image processing system AC according to the present embodiment shown in FIG. 58. As shown in FIG. 59, in the image processing system AC according to the present embodiment, the image D read out from the recording medium 1 is first reduced to a reduced image d by the reducing means 410c (S500). The face discriminating means 500c discriminates whether a face is included in the image d (S502), if a face is included (S502=YES), it extracts a face image d0 and a image d1 of other than the face portion from the reduced image d, and outputs them to the edge detecting means 412c, or if no face is included (S502=NO), it outputs the reduced image d to the edge detecting means 412c as it is.

The process B shown in FIG. 60 comprises the processes to be performed by the edge detecting means 412c, edge restricting means 414c, edge characteristic amount obtaining means 416c (steps 610 to 614) and a part of the process to be performed by the analyzing means 420c (step 616). As shown in FIG. 60 the process B starts with the edge detection by the edge detecting means 412c. The edge detecting means 412c detects edges having intensities greater than or equal to a predetermined threshold value in each direction of the 8 directions as shown in FIG. 38 using a new reduced image created based on the reduced image outputted from the face extracting means 500c to obtain the coordinates of the edges. Then, it creates an edge profile for each of the edges as shown in FIG. 39 using the object image (non-reduced image) that corresponds to the new reduced image described above based on the coordinates of each of the edges detected in each direction, and outputs the profiles to the edge restricting means 414c (S610). The edge restricting means 414c eliminates invalid edges based on the edge profiles outputted from the edge detecting means 412c, and outputs the profiles of the remaining edges to the edge characteristic amount obtaining means 416c (S612). The edge characteristic amount obtaining means 416c obtains an edge width for each of the edges based on the edge profiles outputted from the edge restricting means 414c, creates a histogram of edge widths for each direction of the 8 directions shown in FIG. 38, and outputs the histograms together with the edge widths as edge characteristic amounts S to the analyzing means 420c (S614). The analyzing means 420c first calculates the blur direction and blur level N of the object image using the edge characteristic amounts S (S616).

Here, if the face image d0 and image d1 of other than the face portion are outputted from the face extracting means 500c (S502=YES in the flow chart shown in FIG. 59, and S504), the process B has two object images, that is, the face image D0 and image D1 of other than the face portion. In this case, the edge characteristic amounts S0 and S1 are calculated by the edge characteristic amount obtaining means 416c, and the blur directions and blur levels N are calculated by the analyzing means 420c for the respective object images. If the reduced image d is outputted from the face extracting means 500c (S502=NO in the flow chart shown in FIG. 59), the object image for the process B is the image D only. In this case, the edge characteristic amounts S' for the image D is calculated by the edge characteristic amount obtaining means 416c, and the blur direction and blur level N of the image D are calculated by the analyzing means 420c.

Now, back to the flow chart shown in FIG. 59, the analyzing means 420c calculates the blur directions and blur levels N for the face image D0 and image D1 of other than the face portion in step S616 in the process B, then it perform discrimination whether the image D is a blurred image or a normal image using the blur level N of the face image D0 (S520). If the image D is discriminated to be a normal image (S520=YES), the analyzing means 420C terminates the process after outputting information P indicating that the image D is a normal image to an output means 460 (S522). On the other hand, if the image D is discriminated to be a blurred image (S520=NO), it further calculates the camera shake levels K and blur widths L of the face image D0 and image D1 of other than the face portion (S530), and outputs blur information Q0 and Q1, each obtained by combining the respective blur directions, blur levels N, camera shake levels K, and blur widths L of the respective object images, to the certainty factor calculating means 650 and parameter setting means 430c (S532). Using the blur information, the parameter setting means 430c sets parameters Ec0 and Ec1, each corresponding to each of the blur information Q0 and Q1, and outputs them to the parameter combining means 660 (S534). In parallel with this, the certainty factor calculating means 650 calculates the certainty factor α that indicates the likelihood that the image D is an image with a shallow depth of field, and outputs it to the parameter combining means 660 (S536). The parameter combining means 660 combines the parameters Ec0 and Ec1 using the certainty factor α, and outputs the combined parameter E'c to the correcting means 440c (S538).

In the mean time, the analyzing means 420c calculates the blur direction and blur level N of the image D in step 616 of the process B (in this case, no face has been detected by the face detecting means 500c), then it performs discrimination whether the image D is a blurred image or a normal image (S540). If the image D is discriminated to be a normal image (S540=YES), the analyzing means 420C terminates the process after outputting information P indicating that the image D is a normal image to an output means 460 (S522). On the other hand, if the image D is discriminated to be a blurred image (S540=NO), it further calculates the camera shake level K and blur width L of the image D (S542), and outputs them together with the blur direction and blur level N to the parameter setting means 430c as the blur information Q' (S544). The parameter setting means 430c sets the parameter Ec using the blur information of the image D, and outputs it to the correcting means 440c (S546).

The correcting means 440c performs image correction on the image D using the parameter E'c outputted from the parameter setting means 430c, and outputs the corrected image as the intended image (S550).

The output means 460 prints out the image D when the information P indicating that the image D is a normal image is received from the analyzing means 420c (S522) to obtain a printed image of the image D (S524), or prints out the intended image D' when it is received from the correcting means 440c to obtain a printed image of the image D' (S560).

In this way, according to the image processing system AC of the present embodiment, the certainty factor α that indicates the likelihood that the image D is an image with a shallow depth of field is calculated, and image correction is performed using the correction parameter obtained through weighting addition of the parameter Ec0 which has been set using the image of the main subject region (here, the face image d0) and the parameter Ec1 which has been set using the image D1 which is the image of than the face portion based on the certainty factor α that indicates the likelihood that the image D is an image with a shallow depth of field such that the greater the certainty factor α, the heavier the weighting of the parameter Ec0. Therefore, it may provide similar image correction effect to that of the image processing system AA, or that of the image processing system AB according to the embodiments described above. Further, it may provide satisfactory image correction effects even when there is a slight deviation in the discrimination for the depth of field.

In the image processing system AC according to the present embodiment, the parameter which is set using the image of the main subject region is added to the parameter set using the image of other than the main subject region through weighting addition. However, the parameter which has been set using the image of the main subject region may be added to the parameter which has been set using the entire region of the digital photograph image (entire region of the reduced image d in the case of the image processing system AC) through weighting addition.

In the image processing system AB, the image D is discriminated whether it is an image with a shallow depth of field based on the tag information to the image D. This discrimination may also be made by comparing the blur information of the image of the main subject region and that of the image of other than the main subject region. Likewise, in the image processing system AC according to the present embodiment, the certainty factor that indicates the likelihood that the image D is an image with a shallow depth of field may also be calculated based on the tag information to the image D.

Figure 61:
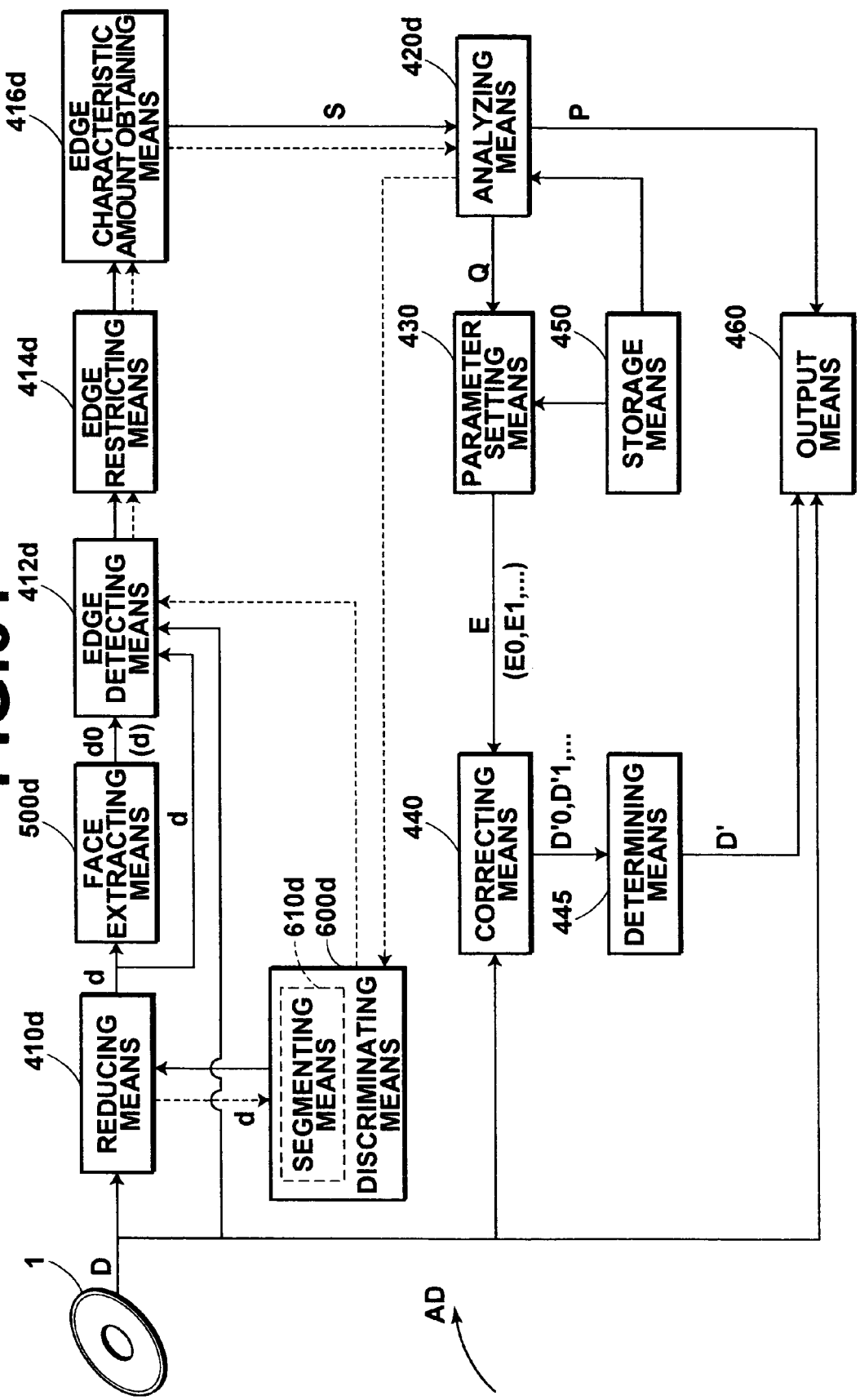
FIG. 61 is a block diagram illustrating the configuration of an image processing system AD according to an eighth embodiment of the present invention.

The method of discriminating whether the digital photograph image is an image with a shallow depth of field, or the method of calculating the certainty factor that indicates the likelihood that the digital photograph image is an image with a shallow dept of field is not limited to those used in the image processing systems AB and AC. The discrimination method or calculation method described above may include the method in which a digital photograph image is divided into a plurality of segments, and the blur information of each of the segments is compared with one another. FIG. 61 illustrates the configuration of an image processing system AD according to the embodiment that employs the method described above. The image processing system AD shown in FIG. 61 is a system that performs image correction by dividing a digital photograph image into a plurality of segments, and comparing the blur information of each of the segments with one another to discriminate whether the digital photograph image is an image with a shallow depth of field as an example. The image correction may also be performed by comparing the blur information of each of the segments with one another to obtain the certainty factor that indicates the likelihood that the digital photograph image is an image with a shallow depth of field. The image processing performed in the image processing system AD shown in FIG. 61 is similar to that performed in the image processing system AB according to the embodiment shown in FIG. 55 except for the process of discriminating whether the image D is an image with a shallow depth of field. Therefore, only the process of discriminating whether the image D is an image with a shallow depth of field will be described in detail here.

In FIG. 61, the process of discriminating whether the image D is an image with a shallow depth of field is indicated by the dotted lines. As shown in the drawing, the reduced image d of the image D obtained by the reducing means 410d is outputted also to the discriminating means 600d. The discriminating means 600d has a segmenting means 610d for dividing the reduced image d into a plurality of segments. Here, as an example, the reducing means 410d is assumed to be a means for reducing the image D to the reduced image d with the pixel size of 200×150 pixels, and the segmenting means 610d is assumed to be a means for dividing the reduced image d into 100 segments with the pixel size of 20×15 pixels. The discriminating means 600d outputs the images of 100 segments obtained by the segmenting means 610d to the edge detecting means 412d. The edge detecting means 412d first detects edges having intensities greater than or equal to a predetermined threshold value in each direction of the 8 directions shown in FIG. 38 for the images of these segments (reduced images) to obtain the coordinates of the edges. Then, the edge detecting means 412d creates an edge profile as shown in FIG. 39 for each of the edges using the partial images on the image D, each corresponding to each image of the segments based on the coordinates of each of the edges detected in each direction, and outputs the edge profiles to the edge restricting means 414d. Each of the edge profiles created by the edge detecting means 412d is processed by the edge restricting means 414d, edge characteristic amount obtaining means 416d, and analyzing means 420d in this order. Finally, the blur information for each image of each of the segments is outputted from the analyzing means 420d to the discriminating means 600d. In calculating the blur information for each image of each of the segments through the analyzing means 420d, and outputting them to the discriminating means 600d, all of the blur direction, blur levels N, camera shake level K, and blur width may be calculated. However, in order to reduce the amount of calculations and enhancing the processing speed, it is assumed here that the only the blur level N for each image of each of the segments is calculated as the blur information used for discriminating whether the image D is an image with a shallow depth of field, and outputted to the discriminating means 600d.

The discriminating means 600d compares the blur information (here, the blur information only) for each image of each of the segments to discriminate whether the image D is an image with a shallow depth of field. More specifically, it performs the discrimination in the following manner.

Step 1: It groups together each of the segments such that the segments having a difference in blur level N less than or equal to a predetermined threshold value (threshold value t1) with each other are grouped into the same group.

Step 2: If only one group is resulted in step 1, it discriminates the image D not to be an image with a shallow depth of field. If two or more groups are resulted in step 1, it extracts only those groups having four or more adjacent bocks, and proceeds to step 3 below.

Step 3: If the number of groups extracted in step 2 above is one or less, it discriminates the image D not to be an image with a shallow depth of field. If two or more groups are extracted in step 2, it calculates averaged blur level N'0 for each of the groups, and proceeds to step 4 below.

Step 4: It discriminates the group having the smallest averaged blur level N'0 (N'min) among the two or more groups extracted in step 3. Then, it calculates averaged blur level N'1 of all the segments included in these groups other than the group having the smallest averaged blur level N'0 to compare it with N'min. If the absolute value of the difference between N'1 and N'min is less than or equal to a predetermined threshold value (threshold value t2) it discriminates the image D not to be an image with a shallow depth of field. If the absolute value of the difference between N'1 and N'min is greater than the threshold value t2, it discriminates the image D to be an image with a shallow depth of field.

In this way, the discriminating means 600d perform discrimination whether the image D is an image with a shallow depth of field, and outputs the discrimination results to the reducing means 410d.

The process after the discrimination results are received by the reducing means 410d is identical to that after the discrimination results are received by the reducing means 410b from the discriminating means 600 in the image processing system AB described earlier, and will not be elaborated upon further here.

In this way, the image processing system AD according to the present embodiment performs discrimination whether the image D is an image with a shallow depth of field using a discrimination method which is different from that employed in the image processing system AB, and may provide similar image correction effect to that of the image processing system AB. Further, it may perform the discrimination in cases where no tag information is attached to the image D, or no F number is included in the tag information.

So far, the preferred embodiments of the present invention have been described. But the image processing method, apparatus, and program therefore is not limited to the embodiments described above, and additions, subtractions, or modifications may be made to these embodiments including combinations of the elements of different embodiments as long as they are within the spirit of the present invention.

For example, the method of discriminating whether a face is included in a photograph image and the method of extracting a face image are not limited to those employed in the embodiments described above, and various known techniques may be used.

Further, in the image processing system AA according to the embodiment shown in FIG. 35 and image processing system AB, a plurality of correction parameters are set by the parameter setting means 430, then a plurality of corrected images are obtained by the correcting means 440 using the plurality of correction parameters, and the corrected image selected by the user from among the plurality of corrected images are determined to be the intended image by the determining means 445. However, the image processing system may further comprise the correction control means and confirming means, and the intended image may be determined in the following manner. A single parameter is set by the parameter setting means, then a single corrected image is obtained by the correcting means at a time, and the corrected image is confirmed by the user through the confirming means. Thereafter, the correction control means controls the parameter setting means, correcting means, and confirming means to repeat the process of resetting the parameter, obtaining the corrected image by correcting the image using the parameter which has been reset by the parameter setting means, and having the user to confirm the image until the corrected image has been determined to be the intended image by the user. Alternatively, only a single corrected image is confirmed by the user, and if the user is not satisfied with the corrected image, then the original image before correction that corresponds to the corrected image may be determined to be the intended image.

Still further, in the image processing system according to the embodiments described above, the blur direction is deemed to be one of the two directions having a greater averaged edge width than the other in the least correlated pair. Alternatively, however, the blur direction may be obtained, for example, in the following manner. Calculate each of the camera shake levels for the least correlated pair (direction pair having the smallest correlation value) and the pair having the second smallest correlation value. Obtain two blur direction candidates, each having a greater averaged edge width than the other in each of the two direction pairs. Then, based on the two blur direction candidates, obtain the blur direction by weighting the two candidates such that the greater the levels of camera shake of the candidate, the heavier the weighting of that candidate. In this case, the blur width may also be obtained by weighting the two averaged edge widths of the two blur direction candidates such that the greater the camera shake level of the candidate, the heavier the weighting of the averaged edge width of that candidate.

Further, in the image processing system according to the embodiments described above, one of the two directions having a greater averaged edge width than the other in the least correlated pair is deemed to be the blur direction regardless of whether or not a blur is included in the image, then calculates the blur level based on the blur direction and discriminates whether the image is a normal image or a blurred image based on the blur level, and further obtains the camera shake level for the image discriminated to be a blurred image for setting the correction parameter. Alternatively, the system may be, for example, a system in which the blur level of an image having a "nondirectional" blur is obtained, wherein the blur is deemed to be "nondirectional" (i.e., a normal image or defocused image) if the correlation value for the least correlated pair is greater than or equal to a predetermined threshold value T1, and the image having the blur level smaller than a predetermined threshold value T2 is deemed to be a normal image to which no correction is implemented, and the image having the blur level greater than or equal to the predetermined threshold value T2 is deemed to be an image having a defocus blur to which image correction is implemented using only the isotropic correction parameter, while the image with a correlation value for the least correlated pair which is smaller than the predetermined threshold value T1 is deemed to be an image with a camera shake blur and one of the directions of the least correlated pair is discriminated to be the blur direction. In setting the correction parameter for the image with camera shake blur, the system may be adapted to set only the directional correction parameter that will act on the blur direction, or to further obtain the camera shake level and set the correction parameter through the weighting addition of the isotropic correction parameter and directional correction parameter based on the camera shake level.

Further, in the image processing system according to the embodiments described above, the digital photograph image is first discriminated whether it is a normal image or a blurred image, and the parameter setting and image correction are implemented by calculating the camera shake level and camera shake width only for the images discriminated to be blurred images in order to improving the efficiency of the processing. Alternatively, the system may be adapted to calculate the blur level, blur width, and camera shake level as the blur information for all of the images to be processed, and image correction is implemented by setting the parameter based on the blur information without discriminating whether the image is a normal image or a blurred image. In this case, the correction parameter set for a normal image is a parameter for small correction or not to implement the correction, since the normal image has a small blur level, and the weighting of the directional correction parameter is small or zero in obtaining the correction parameter for a defocused image through the weighting addition of the isotropic correction parameter and directional correction parameter in accordance with the camera shake level, since camera shake level of the defocused image is small.

Further, in the embodiments described above, the analyzing means 420, 420c and 420d obtain the camera shake level based on the three elements described above (FIGS. 43A, 43B and 43C), but the number of elements for obtaining the camera shake level may be varied. For example, only the two elements among the three elements described above may be used, or the number of the elements may be increased to include the difference in correlation value between the least correlated pair and the pair shifted the most from the least correlated pair (for the direction pairs shown in FIG. 38, the pairs shifted 45° with each other) for obtaining the camera shake level.

Further, in the image processing systems according to the embodiments described above, the analyzing means 420, 420c and 420d obtain the camera shake level for the image D, which has been discriminated to be a blurred image, without discriminating whether the blur is a defocus blur or camera shake blur, and the image correction is implemented by obtaining the correction parameter through the weighting addition of the isotropic correction parameter and directional correction parameter using the weighting factor which corresponds to the camera shake level (the camera shake level itself for the image processing systems according to the embodiments described above). The systems may be adapted to discriminate the blurred image having the camera shake level smaller than a predetermined threshold value to be a defocused image, and to set only the isotropic correction parameter and implement the correction for the defocused image.

Further, the image processing system according to the embodiment described above discriminates all the digital photograph images to be processed whether each of the images is a normal image or a blurred image on the assumption that each of the images to be processed is not known whether it is a normal image or a blurred image. However, in the image processing system intended for use only for blurred images, such as those for implementing image correction only for the images designated as blurred images by the customers or operators, the discrimination whether the image is a normal image or a blurred image is not necessarily required.

Further, in the image processing systems according to the embodiments described above, all of the processes from the image reduction to the outputting of the intended image are implemented in a single unit, but the present invention is not limited to this. For example, the image processing system may be divided into an analyzing unit and a processing unit. The analyzing unit may be adapted to implement the processes from the beginning to the correction parameter setting, and to record the correction parameter on a recording medium as the tag information attached to the image. The processing unit may be adapted to read out the image from the recording medium, and to implement the image correction using the correction parameter, which is the tag information attached to the image.

Still further, in such an embodiment, the analyzing unit may be adapted to implement the processes from the beginning to the obtaining of the blur information, and to record the blur information on a recording medium as the tag information attached to the image. The processing unit may be adapted to read out the blur information from the recording medium, and to set the correction parameter or implement correction based on the blur information, which is the tag information attached to the image.

Further, the image processing systems according to the embodiments described above may further comprise a correction instructing means, wherein the processes are implemented until the process for obtaining the blur information or for setting the correction parameter, but the correction is not implemented until the instruction to implement the correction is given by the correction instructing means, and the correction is implemented after the instruction to implement the correction has been given.

Still further, the image processing systems according to the embodiments described above are intended for digital photograph images obtained by mobile cameras. The image processing method, apparatus and program therefore is not limited to the images obtained by the mobile cameras, but it may be applied to any digital photograph images, such as those obtained by digital cameras, or those obtained by reading the photograph images printed on printing media using reading devices including scanners.

Further, in the image processing systems according to the embodiments described above, when a plurality of face images is detected from an image, the edge detecting means selects the face image having the greatest number of pixels for use in edge detection among the plurality of face images. Alternatively, the edge detecting means may be adapted to select the face image located at the place closest to the center of the image. Further, it may be adapted to select the face image designated by the user from among a plurality of face images. In this case, the plurality of detected face images may be displayed, for example, on a monitor as the candidate images, and one of the candidate images displayed on the monitor may be designated by the user through an input means such as a mouse. Alternatively, a desired position may be pointed on an image by the user before or after detecting faces, and the face image located in a place which is closest to the position pointed by the user may be selected.

Of course, all of the plurality of face images or two or more face images may be selected in stead of selecting only one face image from the plurality of face images.

What is claimed is:

1. An image processing method, comprising the steps of: using a processor performing the steps of:
   detecting edges in each direction of a plurality of different directions for a digital photograph image;
   obtaining characteristic amount for said edges in each direction of said plurality of different directions; and
   obtaining blur information of a blur of said digital photograph image including blur direction information based on said edge characteristic amounts.

2. The image processing method according to claim 1, wherein said edge characteristic amount include sharpness of said edges and distributions of said edge sharpness.

3. The image processing method according to claim 1, wherein said blur information includes the blur width of said blur.

4. The image processing method according to claim 1, further comprising the step of setting a parameter for correcting said blur based on said blur information.

5. The image processing method according to claim 4, wherein
   said blur direction information includes information that indicates whether said blur is a nondirectional defocus blur or directional camera shake blur, and if said blur is a camera shake blur, said information further includes the direction of said camera shake blur, and
   said parameter setting step sets an isotropic correction parameter for correcting said blur isotropically, if said blur is a defocus blur, or a directional correction parameter for correcting said blur directionally, if said blur is a camera shake blur in setting said parameter.

6. The image processing method according to claim 4, wherein
   said blur information includes a camera shake level that indicates the magnitude of camera shake of said blur, and
   said parameter is set through weighting addition of an isotropic correction parameter for correcting said blur isotropically and a directional correction parameter for correcting said blur directionally such that the greater said camera shake level, the heavier the weighting of said directional correction.

7. The image processing method according to claim 4, wherein
   said blur information includes a blur level that indicates the magnitude of blurring of said blur, and
   said parameter is set such that the greater said blur level, the greater the correction level.

8. The image processing method according to claim 4, wherein:
   the blur information includes a blur level that indicates the magnitude of the blur; and
   the parameter is set such that the filter for correcting the blur employs a larger filter size, the higher the blur level.

9. The image processing method according to claim 4, further comprising the step of:
   analyzing the type of image scene of said digital photograph image, wherein
   said parameter is set based on said blur information and said type of image scene obtained by said analyzing step.

10. An image processing apparatus, comprising:
    an edge detecting means for detecting edges in each direction of a plurality of different directions for a digital photograph image;
    an edge characteristic amount obtaining means for obtaining characteristic amount for said edges in each direction of said plurality of different directions; and
    a blur information obtaining means for obtaining blur information of a blur of said digital photograph image including blur direction information of said blur based on said edge characteristic amounts.

11. The image processing apparatus according to claim 10, wherein said edge characteristic amount include sharpness of said edges and distributions of said edge sharpness.

12. The image processing apparatus according to claim 10, wherein said blur information obtaining means is a means for further obtaining the blur width of said blur as said blur information.

13. The image processing apparatus according to claim 10, further comprising a parameter setting means for setting a parameter for correcting said blur based on said blur information.

14. The image processing apparatus according to claim 13, wherein
    said blur direction information includes information that indicates whether said blur is a nondirectional defocus blur or directional camera shake blur, and if said blur is a camera shake blur, said information further includes the direction of said camera shake blur, and
    said parameter setting means is a means for setting an isotropic correction parameter for correcting said blur isotropically if said blur is a defocus blur, or a directional correction parameter for correcting said blur directionally if said blur is a camera shake blur.

15. The image processing apparatus according to claim 13, wherein
    said blur information obtaining means is a means for further obtaining a camera shake level that indicates the magnitude of camera shake of said blur, and
    said parameter setting means is a means for setting said parameter through weighting addition of an isotropic correction parameter for correcting said blur isotropically and a directional correction parameter for correcting said blur directionally such that the greater said camera shake level, the heavier the weighting of said directional correction.

16. The image processing apparatus according to claim 13, wherein
    said blur information obtaining means is a means for further obtaining a blur level that indicates the magnitude of blurring of said blur, and
    said parameter setting means is a means for setting said parameter such that the greater said blur level, the greater the correction level.

17. The image processing apparatus according to claim 13, wherein
    said blur information obtaining means is a means for further obtaining a blur level that indicates the magnitude of said blur, and
    said parameter setting means is a means for setting said parameter such that the filter for correcting the blur employs a larger filter size, the higher the blur level.

18. The image processing apparatus according to claim 16, wherein said parameter setting means is a means for setting said parameter only for said digital photograph images having said blur levels greater than or equal to a predetermined threshold value.

19. The image processing apparatus according to claim 13, further comprising a scene analyzing means for analyzing the type of image scene of said digital photograph image,
    wherein said parameter setting means is a means for setting said parameter based on said blur information and said type of image scene obtained by said scene analyzing means.

20. The image processing apparatus according to claim 10, further comprising a reducing means for reducing said digital photograph image to obtain a reduced image,
    wherein said edge detecting means is a means for detecting said edges from said reduced image.

21. The image processing apparatus according to claim 10, wherein said edge detecting means is a means for detecting only those edges having intensities greater than or equal to a predetermined threshold value.

22. The image processing apparatus according to claim 10, further comprising an invalid edge eliminating means for eliminating invalid edges from among said edges detected by said edge detecting means.

23. The image processing apparatus according to claim 13 further comprising a correcting means for correcting said digital photograph image to obtain a corrected image using a parameter set by said parameter setting means.

24. The image processing apparatus according to claim 23, wherein said parameter setting means is a means for setting a plurality of said parameters, and said correcting means is a means for correcting said digital photograph image using said plurality of parameters set by said parameter setting means to obtain a plurality of corrected images, each corresponding to each of said plurality of parameters, wherein said apparatus further comprises:

a selecting means for having the user to select a desired image from among said corrected images; and an intended image determining means for determining said corrected image selected by said user to be the intended image.

25. The image processing apparatus according to claim 23, wherein said parameter setting means is a means for setting a plurality of said parameters, and said correcting means is a means for correcting said digital photograph image using said plurality of parameters set by said parameter setting means to obtain a plurality of corrected images, each corresponding to each of said plurality of parameters, wherein said apparatus further comprises:

an evaluating means for evaluating the correction effect for each of said corrected images; and an intended image determining means for determining one of said corrected images having the best correction effect to be the intended image.

26. The image processing apparatus according to claim 23, further comprising:

a confirming means for having the user to confirm whether said corrected image is to be determined to be the intended image; and a correction control means for controlling said parameter setting means to repeat resetting said parameter, and said correcting means to repeat performing said correction until said corrected image has been determined to be the intended image.

27. The image processing apparatus according to claim 10, wherein said digital photograph image is an image obtained by the auxiliary camera of a mobile phone.

28. A computer readable storage medium storing a program for causing a computer to execute the steps of:

detecting edges in each direction of a plurality of different directions for a digital photograph image;

obtaining characteristic amount for said edges in each direction of said plurality of different directions; and obtaining blur information of a blur of said digital photograph image including blur direction information based on said edge characteristic amounts.

29. The medium according to claim 28, wherein said edge characteristic amount includes sharpness of said edges and distributions of said edge sharpness.

30. The medium according to claim 28, wherein said blur information obtaining step further obtains the blur width of said blur as said blur information.

31. The medium according to claim 28, further causing said computer to execute the step of setting a parameter for correcting said blur based on said blur information.

32. The medium according to claim 31, wherein said blur direction information includes information that indicates whether said blur is a nondirectional defocus blur or directional camera shake blur, and if said blur is a camera shake blur, said information further includes the direction of said camera shake blur, and said parameter setting step sets an isotropic correction parameter for correcting said blur isotropically, if said blur is a defocus blur, or a directional correction parameter for correcting said blur directionally, if said blur is a camera shake blur.

33. The medium according to claim 31, wherein said blur information obtaining step further obtains a camera shake level that indicates the magnitude of camera shake of said blur as said blur information, and said parameter setting step sets said parameter through weighting addition of an isotropic correction parameter for correcting said blur isotropically and a directional correction parameter for correcting said blur directionally such that the greater said camera shake level, the heavier the weighting of said directional correction.

34. The medium according to claim 31, wherein said blur information obtaining step further obtains a blur level that indicates the magnitude of blurring of said blur as said blur information, and said parameter setting step sets said parameter such that the greater said blur level, the greater the correction level.

35. The medium, according to claim 31, wherein said blur information obtaining step further obtains a blur level that indicates the magnitude of said blur, as said blur information, and said parameter setting step sets said parameter such that the filter for correcting the blur employs a larger filter size, the higher the blur level.

36. The medium according to claim 31, further causing said computer to execute the step of analyzing the type of image scene of said digital photograph image, wherein said parameter setting step sets said parameter based on said blur information and said type of image scene obtained by said analyzing step.

37. A digital camera, comprising:

an imaging means; and an image processing means for obtaining blur information of a blur of a digital photograph image obtained by said imaging means including blur direction information, wherein said image processing means is an image processing apparatus according to claim 10.

38. The digital camera according to claim 37, further comprising an output means for outputting said digital photograph image with said blur information obtained by said image processing means attached thereto.

39. An image processing method, comprising the steps of: using a processor performing the steps of:

detecting edges for a digital photograph image based on predetermined edge detecting conditions;

obtaining edge characteristic amounts for said edges detected in said edge detecting step; and discriminating a blurred state of said digital photograph image based on predetermined discriminating conditions using said edge characteristic amounts obtained in said edge characteristic amount obtaining step, wherein said method further comprises the steps of:

obtaining imaging condition information that indicates imaging conditions of said digital photograph image; and setting said edge detecting conditions and/or said discriminating conditions based on said imaging condition information.

40. An image processing method according to claim 39, wherein said edge detecting step is performed in each direction of a plurality of different directions, said edge characteristic amount is obtained in each direction of said plurality of different directions, and said blurred state includes at least the direction of said blur.

41. An image processing method according to claim 39 or 40 further comprising the steps of:
a parameter setting step for setting a parameter for correcting said blur based on said discrimination results; and
a correcting step for correcting said digital photograph image using said parameter.

42. An image processing apparatus, comprising:
an edge detecting means for detecting edges for a digital photograph image based on predetermined edge detecting conditions;
an edge characteristic amount obtaining means for obtaining characteristic amounts for the edges; and
a blur discriminating means for discriminating a blurred state of said digital photograph image based on predetermined discriminating conditions using said edge characteristic amounts,
wherein said apparatus further comprises:
an imaging condition information obtaining means for obtaining imaging condition information that indicates the imaging conditions of said digital photograph image; and
a condition setting means for setting said edge detecting conditions and/or said discriminating conditions based on said imaging condition information.

43. The image processing apparatus according to claim 42, wherein
said edge detecting means is a means for detecting edges in each direction of a plurality of different directions,
said edge characteristic amount obtaining means is a means for obtaining said edge characteristic amount in each direction of said plurality of different directions, and
said blurred state includes at least the direction of said blur.

44. The image processing apparatus according to claim 43, wherein said edge characteristic amount includes sharpness of said edges and distributions of said edge sharpness.

45. The image processing apparatus according to claim 44, wherein
said imaging condition information includes shakiness information that indicates likelihood of the camera shake to occur that causes a directional blur on said digital photograph image at the time of imaging and/or said camera shake inducing direction information that indicates the direction to which said camera shake is likely to occur, and
said condition setting means is a means for setting said edge detecting conditions and/or said discriminating conditions based on said shakiness information and/or said camera shake inducing direction information.

46. The image processing apparatus according to claim 45, wherein said imaging condition information obtaining means is a means for obtaining said shakiness information and/or said camera shake inducing direction information based on tag information attached to said digital photograph image.

47. The image processing apparatus according to claim 45, wherein
said digital photograph image is an image obtained by the auxiliary digital camera of a mobile phone, and
said imaging condition information obtaining means is a means for obtaining said shakiness information and/or said camera shake inducing direction information based on the model information of said mobile phone used to obtain said digital photograph image.

48. The image processing apparatus according to claim 45, wherein
said edge detecting conditions include a predetermined threshold value of edge intensity,
said edge detecting means is a means for detecting only those edges having intensities grater than or equal to said predetermined threshold value, and
said condition setting means is a means for setting said predetermined threshold such that the greater said shakiness, the smaller said threshold value.

49. The image processing apparatus according to claim 45, wherein
said edge detecting conditions include said plurality of different directions for which edges are detected by said edge detecting means and predetermined threshold values of edge intensity, each corresponding to each of said different directions,
said edge detecting means is a means for detecting edges in each direction of said plurality of different directions only those edges having intensities greater than or equal to said predetermined threshold values, each corresponding to each direction of said plurality of different directions, and
said condition setting means is a means for setting said threshold value such that the closer said direction is to said camera shake inducing direction, the smaller said threshold value.

50. The image processing apparatus according to claim 45, wherein
said edge detecting conditions include invalid edge discriminating conditions for discriminating invalid edges,
said edge detecting means comprises an invalid edge eliminating means for eliminating edges that satisfy said invalid edge discriminating conditions from among said detected edges, and
said condition setting means is a means for setting said invalid edge discriminating conditions such that the greater said shakiness, the more stringent said invalid edge discriminating conditions.

51. The image processing apparatus according to claim 48, wherein
said edge detecting conditions include said plurality of different directions for which edges are detected by said edge detecting means and respective invalid edge discriminating conditions for respective directions of said plurality of different directions for discriminating whether said edges detected by said edge detecting means are invalid edges,
said edge detecting means comprises an edge eliminating means for eliminating edges detected in each direction that satisfy the invalid edge discriminating conditions corresponding to respective directions of said plurality of different direction as invalid edges, and
said condition setting means is a means for setting said invalid edge discriminating conditions such that the closer said direction is to said camera shake inducing direction, the more stringent said invalid edge detecting conditions corresponding to said direction.

52. The image processing apparatus according to claim 45, wherein
said edge detecting conditions include said plurality of different directions for which edges are detected by said edge detecting means, and
said condition setting means is a means for setting the number of said different directions such that the greater said shakiness, the greater said number of directions.

53. The image processing apparatus according to claim 45, wherein
said edge detecting conditions include said plurality of different directions for which edges are detected by said edge detecting means, and said condition setting means is a means for setting the number of said different directions such that the closer a region is to the camera shake inducing direction, the greater said number of directions.

54. The image processing apparatus according to claim 45, wherein
said blur discriminating means is a means for further discriminating a camera shake level that indicates the magnitude of directionality of said blur,
said discriminating conditions include camera shake level discriminating conditions for discriminating said camera shake level, and
said condition setting means is a means for setting said camera shake level discriminating conditions such that the greater said shakiness, the less stringent said camera shake level discriminating conditions.

55. The image processing apparatus according to claim 45, wherein
said blur discriminating means is a means for further discriminating a blur level that indicates the magnitude of blurring of said blur,
said discriminating conditions include blur level discriminating conditions for discriminating said blur level, and
said condition setting means is a means for setting said blur level discriminating conditions such that the greater said shakiness, the less stringent said blur level discriminating conditions.

56. The image processing apparatus according to claim 42, further comprising:
a parameter setting means for setting a parameter for correcting said blur based on the discrimination results provided by said blur discriminating means, and
a correcting means for correcting said digital photograph image using said parameter.

57. The image processing apparatus according to claim 56, wherein
said blur discriminating means is a means for further discriminating a blur level that indicates the magnitude of blurring of said blur,
said parameter setting means and said correcting means are the means for implementing said parameter setting and said correction only for said digital photograph images having said blur levels greater than or equal to a predetermined threshold value, and
said condition setting means is a means for further setting said predetermined threshold value such that the greater said shakiness, the smaller said threshold value.

58. The image processing apparatus according to claim 46, wherein
said imaging condition information includes information that indicates the F number of the lens of the imaging device used for obtaining said digital photograph image,
said edge detecting conditions include edge detecting region information that indicates the region on the digital photograph image for detecting edges,
said edge detecting means is a means for detecting said edges only within said edge detecting region, and
said condition setting means is a means for setting said edge detecting region in the central region of said digital photograph images obtained with said F numbers smaller than or equal to a predetermined threshold value.

59. The image processing apparatus according to claim 46, wherein
said imaging condition information includes information that indicates whether said digital photograph image is obtained with a zooming function,
said edge detecting conditions include edge detecting region information that indicates the region of said digital photograph image for detecting edges,
said edge detecting means is a means for detecting said edges only within said region, and
said condition setting means is a means for setting said region in the central region of said digital photograph image obtained with said zooming function.

60. The image processing apparatus according to claim 46, wherein
said imaging condition information includes information that indicates a compression rate of said digital photograph image,
said blur discriminating means is a means for further discriminating a blur level that indicates the magnitude of blurring of said blur,
said discriminating conditions include blur level discriminating conditions for discriminating said blur level, and
said condition setting means is a means for setting said discriminating conditions such that the greater said compression rate, the more stringent said blur level discriminating conditions.

61. The image processing apparatus according to claim 46, further comprising:
a parameter setting means for setting a parameter for correcting said blur based on said discrimination results provided by said blur discriminating means; and
a correcting means for correcting said digital photograph image using said parameter, wherein
said imaging condition information includes information that indicates a compression rate of said digital photograph image,
said blur discriminating means is a means for further discriminating a blur level that indicates the magnitude of blurring of said blur,
said parameter setting means and correcting means are means for implementing said parameter setting and correction only for said digital photograph images having said blur levels greater than or equal to a predetermined threshold value, and
said condition setting means is a means for further setting the predetermined threshold value such that the greater the compression rate, the greater the threshold value.

62. A computer readable storage medium storing a program for causing a computer to execute an image processing comprising the steps of:
detecting edges for a digital photograph image based on predetermined edge detecting conditions;
obtaining edge characteristic amounts for said edges detected in said edge detecting step; and
discriminating a blurred state of said digital photograph image based on predetermined discriminating conditions using said edge characteristic amounts obtained in said edge characteristic amount obtaining step,
wherein said image processing further comprises the steps of:
obtaining imaging condition information that indicates imaging conditions of said digital photograph image; and
setting said edge detecting conditions and/or said discriminating conditions based on said imaging condition information.

63. The medium according to claim 62, wherein
said edge detecting step is performed in each direction of a plurality of different directions,
said edge characteristic amount is obtained in each direction of said plurality of different directions, and said blurred state includes at least the direction of said blur.

64. The medium according to claim 62 or 63, wherein said image processing further comprises the steps of:
  setting a parameter for correcting said blur based on said discrimination results; and
  correcting said digital photograph image based on said parameter.

* * * * *